United States Patent
Gohda et al.

(10) Patent No.: US 10,766,774 B2
(45) Date of Patent: Sep. 8, 2020

(54) OXIDIZED GRAPHITE DERIVATIVE AND METHOD FOR PRODUCING SAME

(71) Applicant: NIPPON SHOKUBAI CO., LTD., Osaka-shi, Osaka (JP)

(72) Inventors: Syun Gohda, Osaka (JP); Hironobu Ono, Hyogo (JP); Osamu Konosu, Osaka (JP); Shin-ichi Okuoka, Osaka (JP)

(73) Assignee: NIPPON SHOKUBAI CO., LTD., Osaka (JP)

(*) Notice: Subject to any disclaimer, the term of this patent is extended or adjusted under 35 U.S.C. 154(b) by 0 days.

(21) Appl. No.: 15/775,526

(22) PCT Filed: Nov. 8, 2016

(86) PCT No.: PCT/JP2016/083143
§ 371 (c)(1),
(2) Date: May 11, 2018

(87) PCT Pub. No.: WO2017/082263
PCT Pub. Date: May 18, 2017

(65) Prior Publication Data
US 2018/0327269 A1    Nov. 15, 2018

(30) Foreign Application Priority Data

Nov. 12, 2015 (JP) .................. 2015-222306
Jan. 14, 2016 (JP) .................. 2016-005309
(Continued)

(51) Int. Cl.
*C01B 32/23* (2017.01)
*C01B 32/21* (2017.01)
(Continued)

(52) U.S. Cl.
CPC ............ *C01B 32/23* (2017.08); *C01B 32/198* (2017.08); *C01B 32/21* (2017.08);
(Continued)

(58) Field of Classification Search
CPC ....... C01B 32/21; C01B 32/23; C01B 32/198; C10M 103/02; C01P 2002/72; C01P 2002/82
See application file for complete search history.

(56) References Cited

U.S. PATENT DOCUMENTS

2002/0022122 A1   2/2002   Hirata et al.
2003/0186059 A1   10/2003  Hirata et al.
(Continued)

FOREIGN PATENT DOCUMENTS

CN    101935030         1/2011
CN    102431997 A   *   5/2012
(Continued)

OTHER PUBLICATIONS

Xu, Lili, et al. "C 18 functionalized graphene oxide as a novel coating for solid-phase nnicroextraction." Journal of separation science 35.12 (2012): 1531-1537.*
(Continued)

*Primary Examiner* — Richard M Rump
(74) *Attorney, Agent, or Firm* — Hamre, Schumann, Mueller & Larson, P.C.

(57) ABSTRACT

Provided are a method for producing a graphite oxide derivative capable of simply producing a high-quality graphite oxide derivative, and a high-quality graphite oxide derivative. The present invention relates to a method for producing a graphite oxide derivative, the method including the steps of oxidizing graphite; and preparing a graphite oxide derivative by reacting graphite oxide in a reaction liquid containing graphite oxide obtained in the oxidation
(Continued)

step or graphite oxide in a graphite oxide-containing composition that is separated from the reaction liquid with a compound reactive with an oxygen-containing functional group of the graphite oxide, the method not including the step of purifying and drying the graphite oxide-containing reaction liquid between the oxidation step and the graphite oxide derivative preparation step.

12 Claims, 16 Drawing Sheets

(30) Foreign Application Priority Data

Feb. 24, 2016  (JP) .................................. 2016-033326
Mar. 24, 2016  (JP) .................................. 2016-060680

(51) Int. Cl.
  *C01B 32/198*  (2017.01)
  *C10M 103/02*  (2006.01)

(52) U.S. Cl.
  CPC ...... *C01P 2002/72* (2013.01); *C01P 2002/82* (2013.01); *C10M 103/02* (2013.01)

(56) References Cited

U.S. PATENT DOCUMENTS

| | | | |
|---|---|---|---|
| 2006/0293443 | A1 | 12/2006 | Reinheimer et al. |
| 2013/0310499 | A1 | 11/2013 | Osano et al. |
| 2015/0111045 | A1 | 4/2015 | Chang et al. |

FOREIGN PATENT DOCUMENTS

| | | | | |
|---|---|---|---|---|
| JP | 2002-053313 | | 2/2002 | |
| JP | 2003-176117 | | 6/2003 | |
| JP | 2006-233017 | | 9/2006 | |
| JP | 2007-009205 | | 1/2007 | |
| JP | 2009-242209 | | 10/2009 | |
| JP | 2011-148701 | | 8/2011 | |
| JP | 4798411 | B | 10/2011 | |
| JP | 2012-153590 | | 8/2012 | |
| JP | 2013-006909 | | 1/2013 | |
| JP | 2013-079176 | | 5/2013 | |
| JP | 5234325 | B | 7/2013 | |
| WO | 2012/128114 | | 9/2012 | |
| WO | WO-2014148763 | A1 * | 9/2014 | ........... C01B 32/184 |

OTHER PUBLICATIONS

English machine translation of JP2009242209 (2009).*
Salavagione, Horacio J., Marian A. Gomez, and Gerardo Martinez. "Polymeric modification of graphene through esterification of graphite oxide and poly (vinyl alcohol)." Macromolecules 42.17 (2009): 6331-6334.*
Botas, Cristina, et al. "Graphene materials with different structures prepared from the same graphite by the Hummers and Brodie methods." Carbon 65 (2013): 156-164.*
Salavagione, Horacio J., Marian A. Gomez, and Gerardo Martinez. "Polymeric modification of graphene through esterification of graphite oxide and poly (vinyl alcohol). Supporting Information" Macromolecules 42.17 (2009).*
Yang, Xiaoming, et al. ""Clicking" graphite oxide sheets with well-defined polystyrenes: A new Strategy to control the layer thickness." Polymer 52.14 (2011): 3046-3052.*
Liu, Jincheng, et al. "Reduction of functionalized graphite oxides by trioctylphosphine in non-polar organic solvents." Carbon 48.8 (2010): 2282-2289.*
Bao, Chenlu, et al. "Poly (vinyl alcohol) nanocomposites based on graphene and graphite oxide: a comparative investigation of property and mechanism." Journal of Materials Chemistry 21.36 (2011): 13942-13950.*
Machine English translation of WO2014148763A1.*
"Triethylannine Solvent Properties" LSU. <http://macro.lsu.edu/HowTo/solvents/triethylamine.htm> Accesed Oct. 21, 2019 (2019).*
Yang, Qiang, et al. "Covalent functionalization of graphene with polysaccharides." Industrial & engineering chemistry research 51.1 (2012):310-317.*
Bourlinos, et al., "Graphite Oxide: Chemical Reduction to Graphite and Surface Modification with Primary Aliphatic Amines and Amino Acids" Langmuir 2003, 19, pp. 6050-6055.
Zhu, et al "Graphene and Graphene Oxide: Synthesis, Properties, and Applications", Adv. Mater. 2010, 22, pp. 3906-3924.
Dreyer, et al., "The chemistry of graphene oxide", Chemical Society Reviews, 2010, 39, pp. 225-240.
Stankovich, et al., "Synthesis and exfoliation of isocyanate-treated graphene oxide nanoplatelets", Carbon, 2006, 44, pp. 3342-3347.
Nlishina, "Technological development of surface modification of graphene oxide (sankagurafen no hyoumen shuushoku gijyutsu no kaihatsu)", Grant-in-Aid for Scientific Research on Innovative Areas, Science of Atomic Layers, interim report (2014) public offering project, Synthesis Group, 71-74—see pp. 2-3 of the Specification of explanation of relevance.
Dreyer, et al., "Reduction of graphite oxide using alcohols", Journal of Materials Chemistry, 2011, 21, pp. 3443-3447.
Tessonnier, et al., "Dispersion of Alkyl-Chain-Functionalized Reduced Graphene Oxide Sheets in Nonpolar Solvents", Langmuir 2012, 28, pp. 6691-6697.
Okada, et al., "Catalytic Esterification of Graphene Oxide" The Chemical Society of Japan Annual Meeting, 2014, 2E4-29—Abstract.
Chua, et al., "Chemical reduction of graphene oxide: a synthetic chemistry viewpoint", Chem. Soc. Rev., 2014, 43, pp. 291-312.
Fan, et al., "Deoxygenation of Exfoliated Alkaline Conditions: A Green Route to Graphene Preparation", Advanced Materials, Graphite Oxide under 2008, 20, pp. 4490-4493.
Hummers, et al., "Preparation of Graphitic Oxide", J. Am. Chem. Soc., Mar. 20, 1958, 80(6), pp. 1339.
Ceriotti, et al., "Rapid method for the purification of graphene oxide", RSC Adv., 2015, 5, pp. 50365-50371.
Ceriotti, et al., Rapid Method for the Purification of Graphene Oxide (Supporting Information), Nanoscale, 2015, 00, SI, pp. 1-8.

* cited by examiner

OXIDIZED GRAPHITE DERIVATIVE AND METHOD FOR PRODUCING SAME

TECHNICAL FIELD

The present invention relates to a method for producing a graphite oxide derivative, specifically relates to a method for producing a graphite oxide derivative that is suitable for catalysts, electrode active materials for cells and capacitors, thermoelectric conversion materials, conductive materials, light emitting materials, lubricant additives (additives for machine lubricating oil), additives for polymers (additives for resin), permeable membrane materials, antimicrobial materials, water repellent materials, and adsorption materials.

BACKGROUND ART

Graphite oxide provided with an oxygen-containing functional group is prepared by oxidizing graphite, which has a layered structure in which carbon atoms are bonded to each other through $sp^2$ bonding and arranged in planes. Many studies have been conducted on graphite oxide for its unique structure and properties. Graphite oxide is expected to be used as catalysts, electrode active materials for cells and capacitors, thermoelectric conversion materials, conductive materials, light emitting materials, lubricant additives, additives for polymers, permeable membrane materials, antimicrobial materials, water repellent materials, and adsorption materials. For example, graphite oxide is desirably dispersed in oil to be used as an additive for machine lubricating oil.

Such graphite oxide may be derivatized to obtain additional desired functions. Graphite oxide is, for example, desirably dispersed in oil to be used as a lubricant additive or used in the form of a composite with resin such as a polymer. However, hydrophilic graphite oxide as it is cannot be sufficiently dispersed in a non- or low-polar dispersion medium such as oil or resin (hydrophobic dispersion medium). Therefore, graphite oxide is treated to be made dispersible. Specifically, a hydrophilic oxygen-containing functional group is reduced by heating or chemical reaction, or graphite oxide is modified with a hydrophobic substituent. There are some reports on reduction reaction of graphite oxide or modification (introduction) reaction of a substituent (see Patent Documents 1 to 3, Non-Patent Documents 1 to 8). In particular, in Non-Patent Document 3, examination is conducted for enhancement of the dispersibility of graphite oxide in a non-polar dispersion medium, but purification and drying are performed as pretreatment, reduction treatment is performed to aggressively remove reactive oxygen, and a strongly basic reagent is used to perform treatment before reaction.

As a method for producing graphite oxide, a method in which graphite oxide is synthesized by reacting graphite with a strong oxidant in an acid solvent and the resulting graphite oxide is purified from the solution is generally used, and the Hummers method is known in which sulfuric acid and potassium permanganate are used as oxidants (see Non-Patent Document 9, Patent Documents 4 to 6). In addition to this method, the Brodie method in which nitric acid and potassium chlorate are used and the Staudenmaier method in which sulfuric acid, nitric acid, and potassium chlorate are used as oxidants are known. After oxidation of graphite, graphite oxide is generally separated and purified from the reaction liquid containing graphite oxide by centrifuging or filtering the reaction liquid. Filtering under gas pressure has been reported as a method for efficiently separating and purifying graphite oxide (see Non-Patent Documents 10 and 11).

CITATION LIST

Patent Document

Patent Document 1: JP 5234325 B
Patent Document 2: CN 101935030 B
Patent Document 3: WO 2012/128114
Patent Document 4: JP 2002-53313 A
Patent Document 5: JP 2011-148701 A
Patent Document 6: JP 4798411 B

Non-Patent Document

Non-Patent Document 1: Yuta Nishina, "Technological development of surface modification of graphene oxide (sankagurafen no hyoumen shuushoku gijyutsu no kaihatsu)", Grant-in-Aid for Scientific Research on Innovative Areas, "Science of Atomic Layers", interim report (2014) public offering project, Synthesis Group, 71-74
Non-Patent Document 2: Daniel R. Dreyer, et al., "Reduction of graphite oxide using alcohols" J. Mater. Chem., 2011, 21, 3443-3447
Non-Patent Document 3: Jean-Philippe, et al., Langmuir, 2012, 28. 6691-6697
Non-Patent Document 4: Yuki Okada and one other person, "Catalytic Esterification of Graphene Oxide", The Chemical Society of Japan Annual Meeting, 2014, 2E4-29
Non-Patent Document 5: Chun Kiang Chua, et al., Chem. Soc. Rev., 2014, 43, 291-312
Non-Patent Document 6: Xiaobin Fan, et al., Adv. Mater., 2008, 20, 4490-4493 and Supporting Information
Non-Patent Document 7: Daniel R. Dreyer, et al., "Reduction of graphite oxide using alcohols" J. Mater. Chem., 2011, 21, 3443-3447
Non-Patent Document 8: Daniel R. Dreyer, et al., Chem. Soc. Rev., 2010, 39, 228-240
Non-Patent Document 9: William S. Hummers, et al., Journal of American Chemical Society, 1958, 80, 1339
Non-Patent Document 10: Gabriel Ceriotti, et al., RSC Advances, 2015, 5, 50365
Non-Patent Document 11: Gabriel Ceriotti, et al., Nanoscale, 2015, 00, SI, pp. 1-8

SUMMARY OF INVENTION

Technical Problem

As described above, various methods are known as a method for producing graphite oxide. However, in these methods, when graphite oxide is separated from a reaction liquid containing graphite oxide by centrifugation after oxidation of graphite, repetition of centrifugation takes extra time and effort and increases the amount of spent liquor. Further, as described below, when purification reaches a certain level, a filter may be clogged during filtration of a reaction liquid even under pressure, which inhibits efficient production of graphite oxide and its derivative. It is almost impossible to produce graphite oxide and its derivative on an industrial scale at present.

In order to provide graphite oxide with sufficient effects as an additive for machinery lubricant oil, graphite oxide needs to have sufficient dispersibility in oil. Therefore, graphite oxide having good dispersibility in a non-polar dispersion medium is demanded. In addition, in order to provide graphite oxide with sufficient effects as, for example, an additive for various resins, graphite oxide with high dispersibility in an amphiphilic dispersion medium is demanded.

The present invention has been made in view of the current state of the art described above, and aims to provide graphite oxide having high dispersibility in non-polar dispersion mediums or amphiphilic dispersion mediums.

The present invention has been made in view of the current state of the art described above, and aims to provide a method for producing a graphite oxide derivative capable of simply producing a high-quality graphite oxide derivative, and to provide a high-quality graphite oxide derivative.

Solution to Problem

The present inventors examined various methods for simply producing a high-quality graphite oxide derivative, and further examined various methods for enhancing the dispersibility of graphite oxide in non-polar dispersion mediums or amphiphilic dispersion mediums. As a result, the above-mentioned problems have been admirably solved, leading to completion of the present invention.

That is, the present invention relates to a method for producing a graphite oxide derivative, the method including the steps of:

oxidizing graphite; and preparing a graphite oxide derivative by reacting graphite oxide in a graphite oxide-containing composition obtained in the oxidation step with a compound reactive with an oxygen-containing functional group of the graphite oxide, the method not including the step of purifying and drying the graphite oxide-containing composition between the oxidation step and the graphite oxide derivative preparation step.

The present invention also relates to a graphite oxide derivative containing an alkyl group and having a sensitivity grade of 8 determined by a drop hammer test set forth in JIS K 4810.

The present invention also relates to a graphite oxide derivative which has a functional group having a hydrocarbon group that contains 13 or more carbon atoms.

The present invention also relates to a graphite oxide derivative which has a functional group having a C6-C10 hydrocarbon group.

Advantageous Effects of Invention

The method for producing a graphite oxide derivative of the present invention can simply produce a high-quality graphite oxide derivative. The graphite oxide derivative of the present invention is sufficiently dispersed in a non-polar dispersion medium when it has a functional group having a hydrocarbon group that contains 13 or more carbon atoms or sufficiently dispersed in an amphiphilic dispersion medium when it has a functional group having a C6-C10 hydrocarbon group.

DESCRIPTION OF EMBODIMENTS

Figure 1:
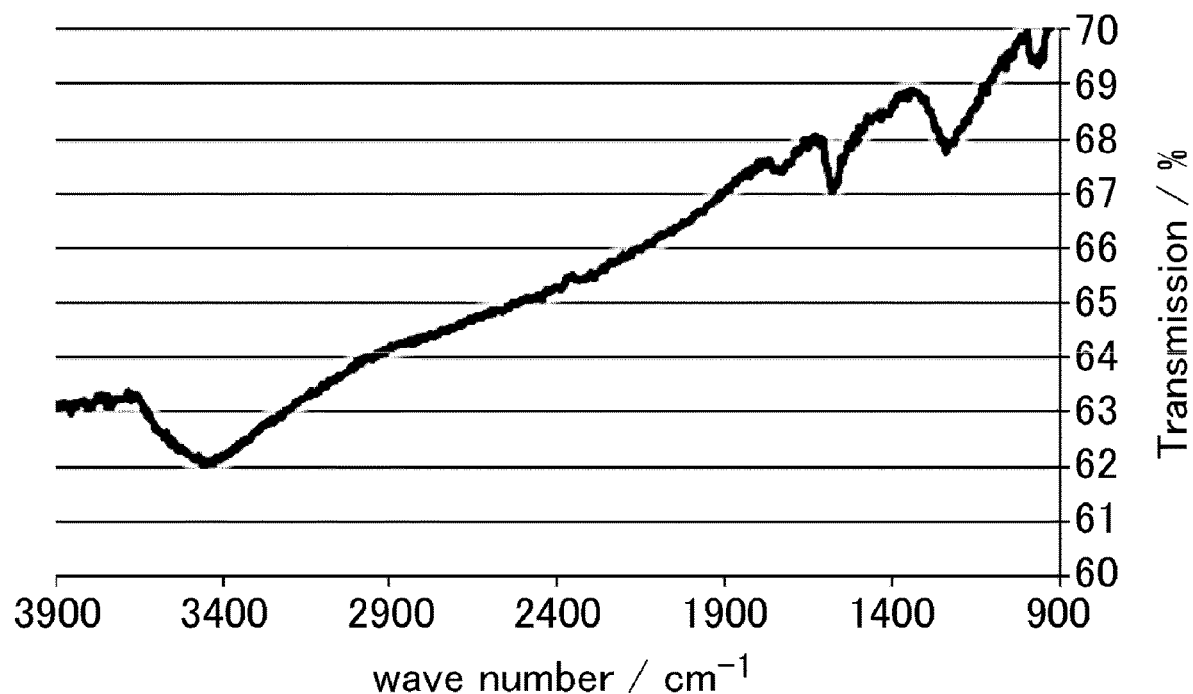
FIG. 1 is a FT-IR chart of the graphite oxide prepared in Preparation Example 1-2.

The present invention is described in detail below.

The following describes preferred features of the present invention in the respective paragraphs, and the embodiments of any combinations of two or more of the preferred features are also preferred embodiments of the present invention.

When graphite oxide is purified, dried, reduced, and treated with a strongly basic reagent before reaction as disclosed in Non-Patent Document 3, reactive oxygen is removed from the graphite oxide, and the modification reaction does not sufficiently proceed, presumably leading to poor dispersibility of the graphite oxide. On the other hand, the method of the present invention can provide a graphite oxide derivative having good dispersibility in ethanol or decane in which the graphite oxide derivative obtained according to Non-Patent Document 3 has not been sufficiently dispersed.

When a cation of a cationic organic compound is used in pretreatment as disclosed in Patent Document 1, a component derived from the cation strongly bonds as impurities to a graphite oxide derivative, and is therefore hardly removed.

(Graphite Oxide Derivative)

Graphite oxide is a substance prepared by oxidizing a graphitic carbon material such as graphene or graphite so that oxygen is bonded (oxygen is bonded to the carbon material). The oxygen is contained in the graphitic carbon material in the form of a substituent such as a carboxyl group, carbonyl group, hydroxyl group, or epoxy group.

The graphite oxide is preferably graphene oxide in which oxygen is bonded to the carbon of graphene.

Generally, graphene refers to a sheet in which carbon atoms are bonded to each other through $sp^2$ bonding and arranged in a planar single layer, and a laminate of a large number of such graphene sheets refers to graphite. The graphene oxide in the present invention encompasses not only a sheet consisting of a single layer of carbon atoms, but also a laminate of about 2 to 100 layers. The graphene oxide is preferably in the form of a sheet consisting of a single layer of carbon atoms or in the form of a laminate of about 2 to 20 layers.

Also, the graphite oxide may contain a functional group such as a sulfur-containing group or a nitrogen-containing group, and the amount of carbon, hydrogen, and oxygen contained as constituent elements is preferably 97 mol % or more, more preferably 99 mol % or more of all the constituent elements. The graphite oxide still more preferably consists of only carbon, hydrogen, and oxygen as constituent elements.

Also, the graphite oxide derivative of the present invention has a structure in which a functional group that contains a group derived from a compound reactive with an oxygen-containing functional group of the graphite oxide is bonded to a carbon atom of the graphite oxide. For example, it is one embodiment of the graphite oxide derivative of the present invention that the graphite oxide derivative has a structure in which a functional group having a hydrocarbon group that contains 13 or more carbon atoms or a functional group having a C6-C10 hydrocarbon group is bonded to a carbon atom of the graphite oxide. Further, in a preferred embodiment of the method for producing a graphite oxide derivative of the present invention, the graphite oxide derivative of the present invention also has a structure in which a functional group that contains a group derived from a compound reactive with an oxygen-containing functional group of the graphite oxide is bonded to a carbon atom of the graphene oxide.

The graphite oxide derivative may further contain any other functional group such as a sulfur-containing group or a nitrogen-containing group. Still, it is more preferred that the graphite oxide derivative consists of only carbon, hydrogen, and oxygen or consists of only carbon, hydrogen, oxygen, and nitrogen. Preferred examples of the graphite oxide derivative are described below.

The properties of the graphite oxide derivative of the present invention are analyzed by, for example, mass spectrometry or the FT-IR method. The mass spectrometry can easily observe ionized fragments. For example, since the graphite oxide derivative of the present invention contains a hydrocarbon group at an end, for example, the mass spectrometry can easily observe ionized fragments. Since the graphite oxide itself has a large mass, ions thereof are not detected by the mass spectrometry. That is, only a moiety derived from the compound introduced into the graphite oxide is observed.

As described in the examples below, the FT-IR method can easily analyze the graphite oxide derivative having a hydrocarbon group as a terminal group because a C—H peak derived from the hydrocarbon group (in the vicinity of 2900 $cm^{-1}$) appears.

It is one preferred embodiment of the method for producing a graphite oxide derivative of the present invention (also referred to as a first preferred embodiment) that the method includes the steps of oxidizing graphite and preparing a graphite oxide derivative, and does not include the step of purifying and drying a graphite oxide-containing composition between the step of oxidizing graphite and the step of preparing a graphite oxide derivative.

That is, the first preferred embodiment of the production method of the present invention may be an embodiment in which the graphite oxide-containing composition is not purified or dried or the graphite oxide-containing composition is purified or dried between the oxidation step and the graphite oxide derivative preparation step. The above-described phrase "not include the step of purifying and drying a graphite oxide-containing composition" means that the graphite oxide-containing composition is one not purified and not dried before the graphite oxide-containing composition is used in the reaction in the graphite oxide derivative preparation step. The present inventors found that when the graphite oxide from the graphite oxide-containing composition is purified and dried, a reactive oxygen-containing functional group of the graphite oxide is reduced and/or inactivated. The present inventors also found that the number of reactive oxygen-containing functional groups of the graphite oxide in the graphite oxide-containing composition can be sufficiently maintained by skipping one or both of purification and drying, and such graphite oxide can be applied to the reaction in the graphite oxide derivative preparation step (modification reaction). As a result, a high-quality graphite oxide derivative can be efficiently produced into which a sufficient number of groups having a desired functional group is introduced by the modification reaction. In addition, since one or both of purification and drying are skipped, the production process is more simplified and advantageous in terms of steps.

Herein, the step of purifying the graphite oxide-containing composition refers to a step including removing solid impurities (e.g. oxidant such as permanganate) and/or solvents used in the oxidation reaction (e.g. strong acid such as sulfuric acid) from the graphite oxide-containing composition, thereby forming the graphite oxide-containing composition into a graphite oxide aqueous dispersion.

The role and meaning of the purification is to, for example, prepare graphite oxide or a graphite oxide aqueous dispersion by reducing the sulfuric acid concentration to 1% by mass or less of the graphite oxide in the graphite oxide-containing composition. It is known that when graphite oxide or a graphite oxide aqueous dispersion is diluted with water (for example, a 1% to 10% aqueous dispersion of the graphite oxide is prepared) according to Patent Document 6, the total ion concentration (mostly, sulfuric acid concentration) falls below the threshold of the concentration disclosed in Patent Document 6, ionization of the graphite oxide itself is promoted, and the graphite oxide strongly interacts with water molecules, leading to great enhancement of the dispersibility of the graphite oxide. When the purification reaches such a level, the enhanced dispersibility causes considerable deterioration of the filterability. It is also known that when graphite oxide is used as a raw material, the dispersibility has a great effect on the physical properties. That is, a purification step is essential to sufficiently develop the physical properties of graphite oxide alone, and many examinations have been performed thereon. However, as the case of in the present invention, when a derivative obtained by chemical reaction such as modification is used as a raw material instead of graphite oxide itself, the reactivity of the graphite oxide itself is more important than the dispersibility of the graphite oxide. The present inventors found that at such a total ion concentration (sulfuric acid concentration) as disclosed in Patent Document 6, ionization of graphite oxide is accompanied by ionization or decomposition of a highly active oxygen substituent, causing disadvantages in the subsequent modification reaction. In the present invention, only the step of separating the graphite oxide-containing composition with an appropriate sulfuric acid concentration from the reaction liquid after the oxidation step may be performed as the purification step, but it is preferable not to perform a higher level of purification step. In other words, a high-level purification step which may be skipped in the present invention refers to decreasing the acidity, promoting ionization or dissociation of the graphite oxide, and increasing the dispersibility in water as disclosed in Patent Document 6. That is, the purification step which may be skipped in the present invention refers to the step of reducing sulfuric acid to less than 1% by mass of the mass of the graphite oxide.

When the step of separating the graphite oxide-containing composition in the present invention is performed, the separation step has only to be separation of a graphite oxide-containing composition from the reaction composition so as to be suitable for the subsequent reaction step as described below to the extent that does not correspond to the step of purifying and drying the reaction composition containing graphite oxide. The separation step may be performed by one or two or more of techniques such as washing with water and centrifugation and filtration of a solution of solid impurities dissolved in water. Further, a flocculant such as a surfactant or an organic solvent may be added, for example, for the filtration described below. The separation step may be performed in the air or in an inert gas atmosphere, such as in a nitrogen, helium, or argon atmosphere. In the separation step, part of the solvent such as sulfuric acid or water may be removed.

In particular, preferably, the production method of the present invention does not include the step of purifying the graphite oxide-containing composition between the oxidation step and the graphite oxide derivative preparation step. In such a case, graphite oxide having a more sufficient number of reactive oxygen-containing functional groups can be used in modification reaction, and a high-quality graphite oxide derivative can be obtained in which a group having a desired functional group is sufficiently introduced. Further, the production method of the present invention is remarkably simplified.

That is, the first preferred embodiment of the production method of the present invention is more preferably a method for producing a graphite oxide derivative, the method including the steps of oxidizing graphite and preparing a graphite oxide derivative by reacting graphite oxide in a graphite oxide-containing composition obtained in the oxidation step and a compound reactive with an oxygen-containing functional group of the graphite oxide, the method not including the step of purifying the graphite oxide-containing composition between the oxidation step and the graphite oxide derivative preparation step, the step of purifying the graphite oxide-containing composition being a step of reducing sulfuric acid to less than 1% by mass of the mass of the graphite oxide in the graphite oxide-containing composition.

The step of drying the graphite oxide-containing composition refers to the step of preparing a dried substance by removing volatile solvents such as water used at least in the oxidation step from the graphite oxide-containing composition.

The present inventors further found that if the concentration of water is reduced to at least less than 3% by mass of the graphite oxide in the graphite oxide-containing composition, water coordinated to the highly active oxygen functional group of the graphite oxide is also removed, and then the stably coordinated oxygen functional group is removed, leading to disadvantages in the subsequent modification reaction. In other words, when the concentration of water in the graphite oxide-containing composition is maintained at 3% by mass or higher of the graphite oxide, an active oxygen functional group advantageous to the modification reaction can be stably maintained. In other words, the drying step which may be skipped in the present invention refers to the step of reducing water to less than 3% by mass of the mass of the graphite oxide.

In the case where the step of drying the graphite oxide-containing composition is performed, the drying step may be performed by one or two or more of techniques such as centrifugation, filtration, and evaporation. A flocculant such as a surfactant or an organic solvent may be added, for example, in the filtration.

The evaporation may be performed, for example, under reduced pressure or heating conditions, and is preferably performed under reduced pressure and heating conditions. The centrifugation and filtration may be performed in the air or in an inert gas atmosphere, such as in a nitrogen, helium, or argon atmosphere.

Also the first preferred embodiment of the production method of the present invention may be a method for producing a graphite oxide derivative, the method including the steps of oxidizing graphite and preparing a graphite oxide derivative by reacting graphite oxide in a graphite oxide-containing composition obtained in the oxidation step and a compound reactive with an oxygen-containing functional group of the graphite oxide, the method not including the step of drying the graphite oxide-containing composition between the oxidation step and the graphite oxide derivative preparation step, the step of drying the graphite oxide-containing composition being a step of reducing water to less than 3% by mass of the mass of the graphite oxide in the graphite oxide-containing composition.

In particular, preferably, the production method of the present invention does not include the step of purifying or the step of drying the graphite oxide-containing composition. This enables remarkable achievement of the effects of the present invention, and a high-quality graphite oxide derivative can be simply obtained.

That is, the first preferred embodiment of the production method of the present invention is still more preferably a method for producing a graphite oxide derivative, the method including the steps of oxidizing graphite (oxidation step) and preparing a graphite oxide derivative by reacting graphite oxide in a graphite oxide-containing composition obtained in the oxidation step and a compound reactive with an oxygen-containing functional group of the graphite oxide, the method not including the step of purifying the graphite oxide-containing composition or the step of drying the graphite oxide-containing reaction liquid between the oxidation step and the graphite oxide derivative preparation step, the step of purifying the graphite oxide-containing composition being a step of reducing sulfuric acid to less than 1% by mass of the mass of the graphite oxide in the graphite oxide-containing composition, the step of drying the graphite oxide-containing composition being a step of reducing water to less than 3% by mass of the mass of the graphite oxide in the graphite oxide-containing composition.

(Step of Concentrating Graphite Oxide-Containing Composition)

The production method of the present invention preferably includes the step of removing part of sulfuric acid or the solvent from the reaction composition (concentration step). The production method of the present invention more preferably includes the step of concentrating the graphite oxide-containing composition between the oxidation step and the graphite oxide derivative preparation step. The concentration step in the present invention is a step of preparing a graphite oxide-containing composition by removing part of sulfuric acid or water from the reaction composition, and means a step of leaving in the composition sulfuric acid in an amount of 1% by mass or more of the mass of the graphite oxide and/or water in an amount of 3% by mass or more of the mass of the graphite oxide. For example, in the case where the amount of the acid in the reaction composition immediately after the oxidation step is excessive relative to the amount of the raw material compound in the graphite oxide derivative preparation step, the amount of the acid relative to the amount of the raw material compound may be controlled to fall within the below-described preferred range by appropriately removing the acid through the concentration step. Thus, the modification reaction can highly efficiently proceed.

The graphite oxide-containing composition for use in the reaction in the graphite oxide derivative preparation step separated through, for example, the concentration step preferably contains water in an amount of 3% to 10000% by mass for 100% by mass of the graphite oxide in the composition. The composition containing 3% by mass or more of water allows an active oxygen functional group to coordinate, to be stable, and to efficiently react in the subsequent modification reaction. Also, 10000% by mass or less of water may not inhibit the modification reaction.

The amount of water is more preferably 5% by mass or more, still more preferably 10% by mass or more, particularly preferably 50% by mass or more. The amount of water is more preferably 5000% by mass or less, still more preferably 3000% by mass or less, further preferably 2000% by mass or less, particularly preferably 1000% by mass or less, most preferably 500% by mass or less.

Usually, an excessive amount of the acid is present relative to the graphite oxide (for example, about 2000% to 5000% by mass of the sulfuric acid for 100% by mass of the graphite oxide) immediately after the oxidation step, and an excessive amount of water is present relative to the graphite oxide (for example, about 500% to 10000% by mass for 100% by mass of the graphite oxide) immediately after the termination of the reaction.

It is preferred that acid and water are concentrated in the concentration step to control the amount of water to fall within the above range. In this case, the reactive oxygen is stably maintained before the graphite oxide derivative preparation step, and the composition can be efficiently used in the modification reaction.

When a permanganate is used as the oxidant in the oxidation step as described below, the graphite oxide-containing composition after the concentration step may contain 0.01% by mass or more of manganese.

Further, when potassium permanganate is used as the oxidant in the oxidation step as described below, the graphite oxide-containing composition after the concentration step may contain 0.01% by mass or more of potassium.

The concentration step in the present invention is a step of controlling, for example, the amount of water in the graphite oxide-containing composition, and may be performed by, for example, centrifugation, redispersion by adding water, filtration, filtration using a flocculant, or vacuum concentration as long as the amount of water is not reduced below the above-described lower limit. The concentration step may be performed by repeating these methods, but is preferably completed in a single step without repetition. The flocculant used for concentration is not particularly limited, and is preferably one that does not inhibit the subsequent modification reaction. Examples of the flocculant include polymeric flocculants that are not reactive with, for example, an oxygen functional group of graphite oxide or sulfuric acid, and volatile flocculants that can be easily removed at the reaction temperature.

(Separation Step)

The production method of the present invention preferably includes the step of separating a graphite oxide-containing composition, typically a graphite oxide-containing composition from a reaction liquid containing graphite oxide obtained in the oxidation step, or typically a graphite oxide-containing composition that contains a higher concentration of graphite oxide. That is, in another preferred embodiment of the method for producing a graphite oxide derivative of the present invention, the method includes the step of adding a solvent that has a solubility in water of 0.01% or higher and is not arbitrarily miscible with water (miscible at any ratio with water) to the reaction composition and then separating the graphite oxide-containing composition between the oxidation step and the graphite oxide derivative preparation step. The present invention also relates to a method for producing a graphite oxide derivative, the method including the steps of oxidizing graphite and preparing a graphite oxide derivative by reacting graphite oxide in a graphite oxide-containing composition obtained in the oxidation step and a compound reactive with an oxygen-containing functional group of the graphite oxide, the method further including, between the oxidation step and the graphite oxide derivative preparation step, the step of separating a graphite oxide-containing composition, typically a graphite oxide-containing composition after adding a solvent that has a solubility in water of 0.01% or higher and is not arbitrarily miscible with water to the reaction liquid containing graphite oxide obtained in the oxidation step, or typically a graphite oxide-containing composition that contains a higher concentration of graphite oxide. This production method may include the step of purifying and drying the graphite oxide-containing composition, but preferably does not include the step of purifying and drying the graphite oxide-containing composition, more preferably does not include the step of purifying the graphite oxide-containing composition.

When a solvent that is not completely separated from a water phase when added to water and is not completely miscible with water is added to the reaction liquid containing graphite oxide, the solvent added exerts the affinity to the graphite oxide in the reaction liquid, and adheres to the graphite oxide particles. The graphite oxide particles to which the solvent adheres tend to aggregate. As a result of the solvent added acting as a flocculant to aggregate the graphite oxide particles, the separation between the graphite oxide particles and the reaction liquid is promoted in the reaction liquid, leading to more efficient separation of graphite oxide.

Usually, the graphite oxide-containing composition is separated from, for example, the reaction liquid containing graphite oxide by repetition of centrifugation or filtration of the reaction liquid under pressure. The former method has problems of complicating the process and increasing the amount of spent liquor, and therefore has room for improvement in terms of more efficient production. In the case of the latter method, a filter may be clogged and a longer time may be needed. Therefore, the latter method also has room for improvement in terms of more efficient production.

The present inventors found that the production method of the present invention including the separation step is capable of more efficiently producing a graphite oxide-containing composition or a graphite oxide derivative, and is also capable of preparing high-quality graphite oxide or a graphite oxide derivative into which a group having a desired functional group is sufficiently introduced.

Thus, it is also a preferred embodiment of the present invention (also referred to as a second preferred embodiment) that the method for producing graphite oxide or a graphite oxide derivative includes the steps of adding a solvent that has a solubility in water of 0.01% or higher and is not arbitrarily miscible with water to, for example, the reaction liquid containing graphite oxide and then separating the graphite oxide.

The first preferred embodiment of the production method of the present invention more preferably includes the steps of adding a solvent that has a solubility in water of 0.01% or higher and is not arbitrarily miscible with water to the reaction liquid containing graphite oxide and then separating the graphite oxide-containing composition.

In the separation step, the solvent to be added to, for example, the reaction liquid containing graphite oxide has only to be a solvent that has a solubility in water of 0.01% or higher and is not arbitrarily miscible with water. The solvent preferably has a solubility in water of 0.5% or higher. The solvent with such a solubility is moderately miscible with water to sufficiently aggregate graphite oxide. The solubility of the solvent in water is more preferably 0.7% or higher, still more preferably 1% or higher, particularly preferably 1.5% or higher. The solubility of the solvent is preferably 30% or lower, more preferably 20% or lower, still more preferably 15% or lower, particularly preferably 10% or lower.

The solubility of the solvent in water may be measured by a solution precipitation method.

The phrase "a solubility in water of 0.01% or higher" means that 0.01% by mass or more of the solvent is dissolved in 100% by mass of water, in other words, 0.01 g or more of the solvent is dissolved in 100 g of water.

In the separation step, the amount of the solvent to be added to, for example, the reaction liquid containing graphite oxide may be appropriately set, and is preferably 1% to 1000% by mass for 100% by mass of the graphite oxide in, for example, the reaction liquid containing graphite oxide. The addition of such an amount of the solvent leads to more sufficient aggregation and more efficient separation of the graphite oxide. The amount of the solvent is more preferably 1% to 950% by mass, still more preferably 10% to 900% by mass, particularly preferably 100% to 800% by mass for 100% by mass of the graphite oxide in the reaction liquid containing graphite oxide.

Examples of the solvent that has a solubility in water of 0.01% or higher and is not arbitrarily miscible with water include cycloalkanones such as cyclopentanone and cyclohexanone; C4-C7 alcohols such as butanol, pentanol, hexanol, and heptanol; and ketones such as acetyl acetone, methyl ethyl ketone, methyl propyl ketone, and methyl butyl ketone. One or two or more of these may be used.

The method of separating the graphite oxide-containing composition after adding a solvent with a predetermined solubility to, for example, the reaction liquid containing the graphite oxide in the separation step may be any method that separates the graphite oxide-containing composition from the reaction liquid. Preferably, the composition is separated by any of filtration, decantation, centrifugation, and separation extraction. These methods lead to efficient separation of the graphite oxide-containing composition from the reaction liquid. When the separation step is performed by any of these methods, the method may be performed once or multiple times. Further, one of these methods may be performed alone or two or more of these may be performed in combination. Note that even if the composition is prepared by subjecting, for example, the reaction liquid containing graphite oxide to these methods, it may not be regarded as a purified composition as long as 1% by mass or more of sulfuric acid is left relative to the mass of the graphite oxide, and it may not be regarded as a dried composition as long as 3% by mass or more of water is left relative to the mass of the graphite oxide. Usually, 3% by mass or more of water and 1% by mass or more of sulfuric acid relative to the mass of the graphite oxide are left in the composition prepared by subjecting, for example, the reaction liquid containing graphite oxide to only these methods, and such a composition is not regarded as a purified composition or a dried composition.

Among these separation methods, filtration or separation extraction is more preferred, and filtration is most preferred.

Filtration is the simplest method among the separation methods. However, in conventional methods for producing graphite oxide or its derivative, a filter tends to be clogged with graphite oxide to cause a problem of taking a long time. On the other hand, in the above separation step, aggregation of the graphite oxide particles in the reaction liquid is promoted by the effect of a solvent with a solubility in water falling within the predetermined range, and therefore, the filter is less likely to be clogged by filtration of the reaction liquid, and the time required for filtration is remarkably shorter than that in a conventional method for producing graphite oxide or its derivative. Accordingly, graphite oxide can be simply, efficiently separated from the reaction liquid using filtration as a method for separating a graphite oxide-containing composition.

The separation step may further optionally include an additional separation step that makes the graphite oxide-containing composition separated from the reaction liquid suitable for the subsequent reaction step, in addition to the step of separating the graphite oxide-containing composition after adding a solvent that has a solubility in water of 0.01% or higher and is not arbitrarily miscible with water to, for example, the reaction liquid containing graphite oxide. Examples of the additional separation step include washing with water.

The preferred embodiments of the concentration step may be applied to other preferred embodiments of the separation step as long as the effects of the present invention are achieved. For example, the preferred embodiments of the graphite oxide-containing composition after the separation step are the same as the preferred embodiments of the above-described graphite oxide-containing composition after the concentration step.

(Step of Oxidizing Graphite)

The step of oxidizing graphite may be performed by any method that oxidizes graphite. The method for oxidizing graphite may be one in any of the Hummers method, the Brodie method, and the Staudenmaier method. As described in the following examples, oxidation may be performed by adding a permanganate to the liquid mixture containing graphite and sulfuric acid utilizing the oxidation method in the Hummers method. It is one preferred embodiment of the present invention that the oxidation step is a step of adding a permanganate to the liquid mixture containing graphite and sulfuric acid.

In another preferred embodiment of the above-described method for producing a graphite oxide derivative, the graphite is oxidized using an acid in the oxidation step.

When the graphite is oxidized using an acid in the oxidation step, the acid is left in the graphite oxide-containing composition for use in the graphite oxide derivative preparation step because one or both of purification and drying of the graphite oxide-containing composition obtained in the oxidation step are skipped in the production method of the present invention. The acid stabilizes the oxygen functional group contained in the graphite oxide. In this case, a component derived from an oxidant used in the oxidation step or water used in the oxidation step or the reaction termination step may be left in the graphite oxide-containing composition for use in the graphite oxide derivative preparation step, and the modification reaction can be highly efficiently carried out. As a result, in the graphite oxide derivative preparation step, the graphite oxide-containing composition in which an oxygen functional group contained in the graphite oxide is stably present can be used in the modification reaction, and therefore the production method of the present invention can be more simplified and highly efficiently performed.

In particular, it is one preferred embodiment of the present invention that the oxidation step is a step of adding a permanganate to a liquid mixture containing graphite and sulfuric acid.

When the oxidation step is a step of adding a permanganate to a liquid mixture containing graphite and sulfuric acid, the amount of the sulfuric acid is preferably such that the mass ratio of sulfuric acid to graphite (sulfuric acid/graphite) is 25 to 60. When the mass ratio is 25 or more, an increase in viscosity of the reaction liquid (liquid mixture) is sufficiently prevented during the oxidation, leading to efficient production of graphite oxide. Further, when the mass ratio is 60 or less, the amount of waste liquid can be sufficiently reduced.

The mass ratio is more preferably 26 or more, still more preferably 27 or more, particularly preferably 28 or more. The mass ratio is more preferably 54 or less, still more preferably 48 or less, particularly preferably 42 or less.

The graphite used in the oxidation step preferably has an average particle size of 3 μm or greater and 80 μm or smaller.

The use of graphite with such an average particle size allows to efficiently proceed the oxidation reaction. The graphite more preferably has an average particle size of 3.2 μm or greater and 70 μm or smaller. The average particle size can be determined using a particle size distribution analyzer.

The graphite used in the oxidation step may be in any form, such as in the form of fine powder, powder, grains, granules, flakes, polyhedrons, rods, or particles with a curved surface. Particles with an average particle size falling within the above range can be produced by, for example, pulverizing particles with a pulverizer; sorting particles by size with a sieve; a combination of these; or a method for preparing particles with a desired particle size by optimizing the preparation conditions of the production of particles.

The amount of the graphite in the liquid mixture containing graphite and sulfuric acid is preferably 0.5% by mass or more, more preferably 1% by mass or more, still more preferably 1.5% by mass or more, particularly preferably 2% by mass or more for 100% by mass of the liquid mixture. The amount of the graphite is preferably 10% by mass or less, more preferably 8% by mass or less, still more preferably 7% by mass or less, particularly preferably 6% by mass or less.

In the oxidation step in the production method of the present invention, graphite may be used alone, or two or more graphites different in, for example, average particle size or shape, may be used.

When the oxidation step is a step of adding a permanganate to a liquid mixture containing graphite and sulfuric acid, the permanganate added in the oxidation step may be, for example, sodium permanganate, potassium permanganate, ammonium permanganate, silver permanganate, zinc permanganate, magnesium permanganate, calcium permanganate, or barium permanganate. One or two or more of these may be used. Preferred among these are sodium permanganate and potassium permanganate, and more preferred is potassium permanganate.

When the oxidation step is a step of adding a permanganate to a liquid mixture containing graphite and sulfuric acid, the total amount of the permanganate added in the oxidation step is preferably 50% to 500% by mass for 100% by mass of the graphite in the liquid mixture. In such a case, graphite oxide can be safely and efficiently produced. The amount of oxygen atoms to be introduced in the graphite oxide can be controlled by varying the total amount of the oxidant.

The total amount is more preferably 100% by mass or more, still more preferably 150% by mass or more, further preferably 200% by mass or more, particularly preferably 240% by mass or more. The total amount is more preferably 450% by mass or less, still more preferably 400% by mass or less, further preferably 350% by mass or less, particularly preferably 300% by mass or less.

When the oxidation step is a step of adding a permanganate to a liquid mixture containing graphite and sulfuric acid, a permanganate may be added at once, in multiple portions, or continuously, preferably added in multiple portions or continuously in the oxidation step. Thereby, the oxidation reaction is less likely to be carried out rapidly, and the reaction is more easily controlled. When the permanganate is added in multiple portions, it is added preferably in three or more portions, more preferably in five or more portions, still more preferably in seven or more portions, particularly preferably in nine or more portions.

When the permanganate is added in multiple portions, the amounts of the respective portions may be the same or different.

When the oxidation step is a step of adding a permanganate to a liquid mixture containing graphite and sulfuric acid, the permanganate is preferably added while the temperature of the liquid mixture is maintained within the range of 10° C. to 50° C. in the oxidation step. Within such a temperature range, the oxidation reaction can be sufficiently carried out under control of the reaction.

The temperature is maintained preferably at 12° C. or higher, more preferably at 15° C. or higher, still more preferably at 18° C. or higher, particularly preferably at 20° C. or higher.

When the oxidation step is a step of adding a permanganate to a liquid mixture containing graphite and sulfuric acid, the oxidation step is preferably a step of adding a permanganate while maintaining the temperature variation of the liquid mixture within 25° C. According to such an embodiment, the oxidation step can be performed more stably.

In the oxidation step, the temperature variation is maintained more preferably within 20° C., still more preferably within 15° C., particularly preferably within 10° C.

When the oxidation step is a step of adding a permanganate to a liquid mixture containing graphite and sulfuric acid, a permanganate is preferably added over 10 minutes to 10 hours in the oxidation step in order to stably perform the oxidation step. The permanganate is more preferably added over 30 minutes or longer, still more preferably added over 1 hour or longer, particularly preferably added over 2 hours or longer.

Further, in order to efficiently produce graphite oxide, the permanganate is more preferably added over 8 hours or shorter, still more preferably over 7 hours or shorter, particularly preferably over 6 hours or shorter.

The oxidation step is preferably performed under stirring, for example, using a known stirrer.

The oxidation step may be performed in the air or in an inert gas atmosphere, such as in a nitrogen, helium, or argon atmosphere. The pressure conditions are not limited in the oxidation step, and the oxidation step is preferably performed under, for example, atmospheric pressure.

The oxidation step is preferably performed for 0.5 to 120 hours, more preferably for 1 to 15 hours, still more preferably for 2 to 10 hours.

The oxidation step may be performed continuously or intermittently.

The liquid mixture can be obtained by mixing graphite, sulfuric acid, and optionally other component(s). The mixing can be appropriately performed by a known method. For example, the graphite is preferably homogeneously dispersed by ultrasonication or using a known disperser.

As long as the method for producing the graphite oxide derivative of the present invention includes the step of oxidizing graphite and the below-described graphite oxide derivative preparation step, and does not include between these steps the step of purifying the graphite oxide-containing composition and the step of drying the graphite oxide-containing composition, the method may optionally include other step(s) such as an aging step or a step of terminating (quenching) the oxidation reaction after the oxidation step.

In the aging step, the temperature at which the reaction liquid obtained in the oxidation step is aged and the time for aging the reaction liquid may be appropriately selected. The temperature of the reaction liquid is maintained preferably at 0° C. to 90° C., more preferably at 20° C. to 80° C.

The time for aging is preferably 0.1 to 24 hours, more preferably 0.5 to 5 hours.

The oxidation termination step may be performed in the air or in an inert gas atmosphere, such as in a nitrogen, helium, or argon atmosphere, or in a vacuum.

The oxidation termination step may be performed in such a way that, for example, the temperature of the reaction liquid is set at 5° C. to 15° C., water is added to the reaction liquid, followed by addition of a hydrogen peroxide solution as a reducing agent. Alternatively, the oxidation termination step may be performed by adding the reaction liquid to water or a hydrogen peroxide solution having a temperature of 5° C. to 25° C.

The time of the oxidation termination step may be, for example, 0.01 to 5 hours.

(Graphite Oxide Derivative Preparation Step)

In the production method of the present invention, the graphite oxide derivative is prepared by reacting graphite oxide in a graphite oxide-containing composition obtained in the oxidation step and a compound reactive with an oxygen-containing functional group of the graphite oxide. The compound reactive with an oxygen-containing functional group of the graphite oxide is, for example, preferably at least one selected from the group consisting of alcohols, silane compounds, fatty acids (salts), fatty acid esters, isocyanate compounds, and amines, more preferably an alcohol and/or an amine. The silane compounds having a siloxy group and/or an alkoxy group directly bonding to a silicon atom are preferred because such compounds have good reactivity to an oxygen-containing functional group of the graphite oxide. The production of the graphite oxide derivative is confirmed by measuring the infrared absorption spectrum according to the method in the examples.

The compound reactive with an oxygen-containing functional group of the graphite oxide preferably has a hydrocarbon group because such a compound enhances the dispersibility of the graphite oxide derivative in a non-polar dispersion medium. The number of carbon atoms of the hydrocarbon group is preferably 5 or more, more preferably 6 or more, still more preferably 7 or more, particularly preferably 8 or more. Further, in order to sufficiently increase the dispersion rate of the graphite oxide derivative in a non-polar dispersion medium or to suitably produce the graphite oxide derivative, the number of carbon atoms of the hydrocarbon group is preferably 50 or less, more preferably 36 or less, still more preferably 24 or less.

The hydrocarbon group is preferably a straight-chain hydrocarbon group. When the hydrocarbon group is a straight-chain hydrocarbon group, the straight-chain hydrocarbon group is likely to be introduced into the graphite oxide, which makes the production method of the present invention more efficient.

The hydrocarbon group is also preferably a branched-chain hydrocarbon group. When the hydrocarbon group is a branched-chain hydrocarbon group, the dispersibility of the graphite oxide derivative in a non-polar dispersion medium is more enhanced. Further, the raw material compound tends to be liquid at room temperature (25° C.), and in this case, the compound is easily handled in the production of the derivative.

In the graphite oxide derivative preparation step, the modification reaction of the graphite oxide in which the graphite oxide is allowed to react with the compound reactive with an oxygen-containing functional group of the graphite oxide and the reduction reaction of the graphite oxide itself simultaneously proceed and compete each other. In order to sufficiently prevent the reduction reaction and preferentially carry out the modification reaction of the graphite oxide, the compound reactive with an oxygen-containing functional group of the graphite oxide is preferably an alcohol and/or an amine. The alcohol is more preferably an aliphatic alcohol. The amine is more preferably an aliphatic amine.

Examples of the aliphatic alcohol include n-octyl alcohol, sec-octyl alcohol, n-nonyl alcohol, sec-nonyl alcohol, n-decyl alcohol, sec-decyl alcohol, n-undecyl alcohol, sec-undecyl alcohol, n-dodecyl alcohol, sec-dodecyl alcohol, n-tridecyl alcohol, sec-tridecyl alcohol, n-tetradecyl alcohol, sec-tetradecyl alcohol, n-hexadecyl alcohol, sec-hexadecyl alcohol, n-octadecyl alcohol, sec-octadecyl alcohol, n-eicosyl alcohol, sec-eicosyl alcohol, 2-octyldodecyl alcohol, n-docosyl alcohol, sec-docosyl alcohol, 2-octyltetradecyl alcohol, n-tetracosyl alcohol, sec-tetracosyl alcohol, 2-octylhexadecyl alcohol, n-hexacosyl alcohol, sec-hexacosyl alcohol, n-octacosyl alcohol, sec-octacosyl alcohol, n-triacontyl alcohol, sec-triacontyl alcohol, n-dotriacontyl alcohol, sec-dotriacontyl alcohol, n-tetratriacontyl alcohol, sec-tetratriacontyl alcohol, n-hexatriacontyl alcohol, and sec-hexatriacontyl alcohol. One or two or more of these may be used. When two or more aliphatic alcohols are used, they may be used in the form of a mixture.

Examples of the aliphatic amine include n-octylamine, sec-octylamine, n-nonylamine, sec-nonylamine, n-decylamine, sec-decylamine, n-undecylamine, sec-undecylamine, n-dodecylamine, sec-dodecylamine, n-tridecylamine, sec-tridecylamine, n-tetradecylamine, sec-tetradecylamine, n-hexadecylamine, sec-hexadecylamine, n-octadecylamine (stearylamine), sec-octadecylamine, n-eicosylamine, sec-eicosylamine, 2-octyldodecylamine, n-docosylamine, sec-docosylamine, 2-octyltetradecylamine, n-tetracosylamine, sec-tetracosylamine, 2-octylhexadecylamine, n-hexacosylamine, sec-hexacosylamine, n-octacosylamine, sec-octacosylamine, n-triacontylamine, sec-triacontylamine, n-dotriacontylamine, sec-dotriacontylamine, n-tetratriacontylamine, sec-tetratriacontylamine, n-hexatriacontylamine, and sec-hexatriacontylamine. One or two or more of these may be used. When two or more aliphatic amines are used, they may be used in the form of a mixture.

In the graphite oxide derivative preparation step, the liquid mixture may be prepared by mixing the graphite oxide-containing composition obtained in the oxidation step (in particular, preferably, the graphite oxide-containing composition after the concentration step), the compound reactive with an oxygen-containing functional group of the graphite oxide, and optionally other component(s) (for example, a solvent). The mixing can be appropriately performed by a known method. For example, the graphite oxide is preferably homogeneously dispersed by ultrasonication or using a known disperser.

The amount of the compound reactive with an oxygen-containing functional group of the graphite oxide used is preferably 300% to 10000% by mass for 100% by mass of the graphite oxide in the liquid mixture. The use of a very excessive amount of the compound reactive with an oxygen-containing functional group of the graphite oxide enables more efficient production of the graphite oxide derivative. In addition, in this case, the reduction reaction can be prevented and the modification reaction of the graphite oxide can be preferentially carried out.

The amount used is more preferably 350% by mass or more, still more preferably 400% by mass or more, further preferably 450% by mass or more, particularly preferably 500% by mass or more. Meanwhile, the amount used is more preferably 8000% by mass or less, still more preferably 6000% by mass or less, still more preferably 3000% by mass or less, particularly preferably 1000% by mass or less.

In the reaction of the graphite oxide and the compound reactive with an oxygen-containing functional group of the graphite oxide, a known catalyst can be applied, for example. It is a preferred embodiment of the present invention that the catalyst may be an acid catalyst such as sulfuric acid or a base catalyst such as an alkali metal hydroxide, an amine, or pyridine. When the compound reactive with an oxygen-containing functional group of the graphite oxide is an amine, the amine itself may be used as a catalyst.

When the compound reactive with an oxygen-containing functional group of the graphite oxide is a compound other than amines, and an acid catalyst is used as the catalyst in the graphite oxide derivative preparation step, the modification reaction can be more efficiently carried out by controlling the amount of the acid catalyst relative to the amount of the raw materials for reaction such as the graphite oxide and the compound reactive with an oxygen-containing functional group of the graphite oxide to fall within a suitable range.

In the graphite oxide-containing composition for use in the reaction in the graphite oxide derivative preparation step, the amount of the acid catalyst for 100% by mass of the graphite oxide is preferably, for example, 0.01% to 1000% by mass. With 0.01% by mass or more of the acid catalyst, the modification reaction can be efficiently carried out. Meanwhile, with 1000% by mass or less of the acid catalyst, the amount of waste (the amount of spent liquor) can be sufficiently reduced, and the modification reaction can be efficiently carried out. Here, acid residues such as sulfuric acid used in the oxidation step may be effectively used as the acid catalyst.

The amount of the acid catalyst contained is more preferably 0.1% by mass or more, still more preferably 1% by mass or more, further preferably 10% by mass or more, further more preferably 20% by mass or more, still further more preferably 30% by mass or more, particularly preferably 40% by mass or more, further particularly preferably 50% by mass or more. Meanwhile, the amount is more preferably 700% by mass or less, still more preferably 500% by mass or less, further preferably 200% by mass or less.

For example, when the acid of the acid catalyst is sulfuric acid, the graphite oxide-containing composition for use in the reaction in the graphite oxide derivative preparation step preferably contains 1% by mass or more and 1000% by mass or less of sulfuric acid for 100% by mass of the graphite oxide in the composition.

When the compound reactive with an oxygen-containing functional group of the graphite oxide is a compound other than amines, and an acid catalyst is used as the catalyst in the graphite oxide derivative preparation step, the graphite oxide-containing composition for use in the reaction in the graphite oxide derivative preparation step preferably contains 0.1% by mass or more and 50% by mass or less of the acid catalyst for 100% by mass of the compound reactive with an oxygen-containing functional group of the graphite oxide in the composition. With 0.1% by mass or more of the acid catalyst, the modification reaction can be efficiently carried out. Meanwhile, with 50% by mass or less of the acid catalyst, side reactions due to the acid catalyst can be sufficiently prevented. The amount of the acid catalyst is more preferably 0.5% by mass or more. Meanwhile, the amount of the acid catalyst is more preferably 20% by mass or less.

When the compound reactive with an oxygen-containing functional group of the graphite oxide is a compound other than amines, the graphite oxide itself is essentially an acidic substance, and allows the reaction to proceed autocatalytically. As described above, a catalyst is preferably used, but the autocatalytic reaction can proceed even without a catalyst.

When a base catalyst (including, for example, amine) is used as the catalyst in the graphite oxide derivative preparation step, the modification reaction can be more efficiently carried out by controlling the amount of the base catalyst relative to the amount of the raw materials for reaction such as the graphite oxide and the compound reactive with an oxygen-containing functional group of the graphite oxide to fall within a suitable range. A preferred amount of the base catalyst contained in the graphite oxide-containing composition for use in the graphite oxide derivative preparation step for 100% by mass of the graphite oxide is the same as the preferred amount of the acid contained in the above-described graphite oxide-containing composition for 100% by mass of the graphite oxide.

For example, when an alkali metal hydroxide and an amine are used as bases, the graphite oxide-containing composition for use in the reaction in the graphite oxide derivative preparation step preferably contains 1% by mass or more and 1000% by mass or less of the alkali metal hydroxide and the amine for 100% by mass of the graphite oxide in the composition. Here, the base catalyst is neutralized by an acid component in the graphite oxide-containing composition. Therefore, in the base catalyst used, the amount of a portion other than the neutralized portion preferably falls within the above range.

In another preferred embodiment (also referred to as a third preferred embodiment of the production method of the present invention) of the above-described method for producing a graphite oxide derivative, the reaction temperature of the graphite oxide derivative preparation step may be any temperature at which the reaction proceeds, and the method includes the step of preparing a graphite oxide derivative having a hydrocarbon group-containing functional group by reacting graphite oxide with an alcohol and/or an amine at a reaction temperature of 120° C. or higher. At a reaction temperature of 120° C. or higher, the reduction reaction is sufficiently prevented and the modification reaction can be preferentially carried out. Further, such a reaction temperature enables easy removal of oxygen, and thus is advantageous for reducing (eliminating) the sensitivity determined by the drop hammer test. Thus, in order to efficiently proceed the modification reaction and to reduce (eliminate) the sensitivity determined by the drop hammer test, the reaction temperature is more preferably 130° C. or higher, still more preferably 140° C. or higher, particularly preferably 150° C. or higher.

In order to suppress side reactions, the reaction temperature is preferably 200° C. or lower.

That is, the present inventors found that a high-quality graphite oxide derivative can be simply produced by the third preferred embodiment of the production method of the present invention, that is, by the method for producing a graphite oxide derivative that includes the step of preparing a graphite oxide derivative having a hydrocarbon group-containing functional group by reacting graphite oxide with an alcohol and/or an amine at a reaction temperature of 120° C. or higher.

Here, the first preferred embodiment of the production method of the present invention and the second preferred embodiment of the production method of the present invention more preferably includes the step of preparing a graphite oxide derivative having a hydrocarbon group-containing functional group by reacting graphite oxide with an alcohol and/or an amine at a reaction temperature of 120° C. or higher.

In the method for producing a graphite oxide derivative which includes the step of preparing a graphite oxide derivative having a hydrocarbon group-containing functional group by reacting graphite oxide and an alcohol at a reaction temperature of 120° C. or higher, the graphite oxide may be one prepared by purifying and drying the graphite oxide-containing composition that contains the graphite oxide obtained in the oxidation step. Preferably, one or both of purification and drying are skipped, more preferably, purification is skipped. By the production method, the reduction reaction can be sufficiently prevented so that the amount of alcohol and/or amine introduced into the graphite oxide can be increased, leading to highly efficient production of a high-quality graphite oxide derivative. The graphite oxide derivative obtained by the production method has high crystallinity due to the interaction between the hydrocarbon groups derived from an alcohol and/or an amine introduced. Although the crystallinity of the resulting graphite oxide derivative tends to be higher as the number of carbon atoms of the alcohol and/or the amine is greater in the production method, sufficiently many hydrocarbon groups can be introduced into the graphite oxide even if the number of carbon atoms of the alcohol and/or the amine is small, leading to the production of a high-quality graphite oxide derivative.

The above-described patent documents and non-patent documents do not disclose the preparation of a graphite oxide derivative having a hydrocarbon group-containing functional group by reacting graphite oxide with an alcohol and/or an amine at a reaction temperature of 120° C. or higher.

The present invention also relates to a graphite oxide derivative that contains an alkyl group and has a sensitivity grade of 8 determined by the drop hammer test set forth in JIS K 4810. For example, in the production method of the present invention, a high-quality graphite oxide derivative that contains an alkyl group and has a sufficiently reduced (eliminated) sensitivity determined by the drop hammer test can be produced by reacting graphite oxide with an alcohol and/or an amine at the above-described high reaction temperature.

The present invention also relates to a graphite oxide derivative that has an X-ray diffraction spectrum in which at least one peak is present within the range of 9° to 13° and at least one peak is present within the range of 21° to 24°, and has a crystallite diameter falling within the range of 100 Å or greater and 500 Å or smaller determined from the at least one peak within the range of 9° to 13° using the Scherrer equation. For example, in the production method of the present invention, a high-quality graphite oxide derivative that shows such peaks can be produced by reacting graphite oxide with an alcohol and/or an amine. The phrase "a crystallite diameter falling within the range of 100 Å or greater and 500 Å or smaller determined from the at least one peak within the range of 9° to 13° using the Scherrer equation" has only to mean that in the case where multiple peaks are present within the range of 9° to 13°, the crystallite diameter determined from any one of these peaks using the Scherrer equation falls within the range of 100 Å or greater and 500 Å or smaller. In particular, the X-ray diffraction spectrum of the graphite oxide derivative of the present invention preferably shows one peak within the range of 9° to 13° and one peak within the range of 21° to 24°. The crystallite diameter is more preferably 200 Å or greater. Further, the crystallite diameter is more preferably 400 Å or smaller.

The X-ray diffraction spectrum may be measured by the "method of measuring XRD" described in the examples.

The reaction time in the graphite oxide derivative preparation step is preferably, for example, 1 hour or longer, more preferably 3 hours or longer, still more preferably 5 hours or longer. In order to sufficiently prevent the reduction reaction and preferentially carry out the modification reaction, the reaction time is preferably 120 hours or shorter, more preferably 100 hours or shorter, still more preferably 80 hours or shorter.

The reaction step may be performed under stirring, for example, using a known stirrer.

The reaction step may be performed in the air or in an inert gas atmosphere, such as in a nitrogen, helium, or argon atmosphere. The pressure conditions are not limited in the reaction step, and the reaction step may be performed under pressure, atmospheric pressure, or reduced pressure, and is preferably performed, for example, under atmospheric pressure. Particularly in the case where a volatile flocculant is used in the concentration step, impurities such as flocculants are preferably distilled away by heating under reduced pressure before the reaction step. Thus, bumping of a flocculant or other components and side reactions can be sufficiently prevented in the reaction step, and therefore, the reaction step can be stably carried out.

The graphite oxide derivative obtained by the production method of the present invention has a functional group derived from the compound reactive with an oxygen-containing functional group of the graphite oxide (preferably, a hydrocarbon group-containing functional group). Examples of the functional group include, but are not limited to, oxygen-containing groups such as alkoxycarbonyl groups (—COOR) and alkoxyl groups (—OR); sulfur-containing groups; nitrogen-containing groups such as alkylamino groups (—NHR, —NRR') and alkyl amide groups (—CONHR, —CONRR'); and phosphorus-containing groups. Preferred are oxygen-containing groups such as alkoxycarbonyl groups (—COOR) and alkoxyl groups (—OR) and nitrogen-containing groups such as alkylamino groups (—NHR, —NRR') and alkyl amide groups (—CONHR, —CONRR'). R and R' are the same as or different from each other, and each represent an organic group, preferably a hydrocarbon group.

In the graphite oxide derivative obtained by reacting graphite oxide with an alcohol in the production method of the present invention, the amount of other atoms than carbon, hydrogen, and oxygen atoms, in 100% by mass of the graphite oxide derivative, is preferably 10% by mass or less, more preferably 7% by mass or less, still more preferably 5% by mass or less. Particularly preferably, no other atoms are contained in the graphite oxide derivative. In other words, the graphite oxide derivative preferably consists of only carbon, hydrogen, and oxygen atoms as constituent elements. Examples of the other atoms include nitrogen, phosphorus, and halogen atoms. In particular, in the graphite oxide derivative, the amount of nitrogen atoms in 100% by mass of the graphite oxide derivative is preferably 0.1% by mass or less.

In the graphite oxide derivative obtained by reacting graphite oxide with an amine in the production method of the present invention, the amount of other atoms than carbon, hydrogen, oxygen, and nitrogen atoms, in 100% by mass of the graphite oxide derivative, is preferably 10% by mass or less, more preferably 7% by mass or less, still more preferably 5% by mass or less. Particularly preferably, no other atoms are contained in the graphite oxide derivative. In other words, the graphite oxide derivative preferably consists of only carbon, hydrogen, oxygen, and nitrogen atoms as constituent elements. Examples of the other atoms include phosphorus and halogen atoms.

The average particle size of the graphite oxide derivative is preferably 0.01 µm or greater and 100 µm or smaller. The average particle size is more preferably 0.1 µm or greater, still more preferably 1 µm or greater, still more preferably 3 µm or greater. The average particle size is more preferably 60 µm or smaller.

The average particle size can be determined using a particle size distribution analyzer.

The graphite oxide derivative may be in any form, such as in the form of fine powder, powder, grains, granules, flakes, polyhedrons, rods, or particles with a curved surface. Particles with an average particle size falling within the above range can be produced by, for example, pulverizing particles with a ball mill, dispersing the coarse particles obtained by the pulverization in a dispersant to prepare particles with a desired size, and drying the particles into solids; sorting particles by size with a sieve; a combination of these; or optimizing the preparation conditions of the production of particles to provide (nano)particles with a desired particle size.

In another preferred embodiment of the method for producing a graphite oxide derivative of the present invention, the graphite oxide derivative has a functional group having a hydrocarbon group that contains 13 or more carbon atoms. This preferred embodiment may be applied to the first to third preferred embodiments.

The present invention also relates to a graphite oxide derivative which has a functional group having a hydrocarbon group that contains 13 or more carbon atoms.

The present inventors found that the graphite oxide derivative which has a functional group having a hydrocarbon group that contains 13 or more carbon atoms as a graphite oxide derivative is a novel graphite oxide derivative dispersible even in a simple alkane which is hardest to disperse hydrophilic substances and has not been reported to disperse graphite oxide or its derivative. It is considered that the use of the hydrocarbon group having a long chain containing 13 or more carbon atoms not only enhances the hydrophobicity but also greatly enhances the dispersibility in a non-polar dispersion medium because the hydrocarbon group covers from the outside the hydrophilic oxygen functional group remaining in the graphite oxide derivative. Thus, the dispersibility of the graphite oxide derivative in a non-polar dispersion medium seems to be enhanced more than expected.

The hydrocarbon group containing 13 or more carbon atoms may be, but is not limited to, a saturated aliphatic hydrocarbon group such as an alkyl or cycloalkyl group; an acyclic unsaturated aliphatic hydrocarbon group such as an alkynyl or alkenyl group; or an aromatic hydrocarbon group such as an aryl group. Among these, preferred is a saturated aliphatic hydrocarbon group, and more preferred is an alkyl group.

Examples of the alkyl group include n-tetradecyl, sec-tetradecyl, n-hexadecyl, sec-hexadecyl, n-octadecyl, sec-octadecyl, n-eicosyl, sec-eicosyl, 2-octyldodecyl, n-docosyl, sec-docosyl, 2-octyltetradecyl, n-tetracosyl, sec-tetracosyl, 2-octylhexadecyl, n-hexacosyl, sec-hexacosyl, n-octacosyl, sec-octacosyl, n-triacontyl, sec-triacontyl, n-dotriacontyl, sec-dotriacontyl, n-tetratriacontyl, sec-tetratriacontyl, n-hexatriacontyl, and sec-hexatriacontyl groups. One or two or more of these may be used.

In order to more enhance the dispersibility of the graphite oxide derivative of the present invention in a non-polar dispersion medium, the number of carbon atoms of the hydrocarbon group in the graphite oxide derivative of the present invention is preferably 14 or more, more preferably 16 or more, still more preferably 18 or more. In order to sufficiently increase the dispersion rate of the graphite oxide derivative of the present invention in a non-polar dispersion medium and suitably produce the graphite oxide derivative of the present invention, the number of carbon atoms of the hydrocarbon group of the graphite oxide derivative of the present invention is preferably 50 or less, more preferably 36 or less.

The number of carbon atoms of the hydrocarbon group of the graphite oxide derivative of the present invention is preferably 20 or more and 28 or less. In this case, the above-described effects can be achieved in a balanced manner. The number of carbon atoms is more preferably 21 or more, still more preferably 22 or more. The number of carbon atoms is more preferably 24 or less, most preferably 24.

The present invention also relates to a graphite oxide derivative which has a functional group having a C6-C10 hydrocarbon group.

The graphite oxide derivative which has a functional group having a C6-C10 hydrocarbon group is found to have an affinity for amphiphilic dispersion mediums such as ketone-based, ester-based, and amide-based solvents, leading to achievement of good dispersibility. The graphite oxide derivative is therefore applicable to an additive for various resins.

The C6-C10 hydrocarbon group may be, but is not limited to, a saturated aliphatic hydrocarbon group such as an alkyl or cycloalkyl group; an acyclic unsaturated aliphatic hydrocarbon group such as an alkynyl or alkenyl group; or an aromatic hydrocarbon group such as an aryl group. Among these, preferred is a saturated aliphatic hydrocarbon group, and more preferred is an alkyl group.

Examples of the alkyl group include n-hexyl, sec-hexyl, n-heptyl, sec-heptyl, n-octyl group, sec-octyl, n-nonyl, sec-nonyl, 2-octyldodecyl, n-decyl, and sec-decyl groups. One or two or more of these may be used.

In order to further enhance the dispersibility of the graphite oxide derivative of the present invention in an amphiphilic dispersion medium, the number of carbon atoms of the hydrocarbon group of the graphite oxide derivative of the present invention is more preferably 7 or more and 9 or less. In terms of this, the number of carbon atoms of the hydrocarbon group of the graphite oxide derivative of the present invention is most preferably 8.

The above-describes the graphite oxide derivative which has a functional group having a hydrocarbon group that contains 13 or more carbon atoms and the graphite oxide derivative which has a functional group having a C6-C10 hydrocarbon group. In both cases, the graphite oxide derivative of the present invention preferably has a hydrocarbon group-containing functional group as a terminal group.

The hydrocarbon group of the graphite oxide derivative of the present invention is preferably a straight-chain hydrocarbon group. A straight-chain hydrocarbon group is easily introduced into the graphite oxide, and thus the graphite oxide derivative of the present invention can be suitably obtained.

The hydrocarbon group of the graphite oxide derivative of the present invention is also preferably a branched-chain hydrocarbon group. The graphite oxide derivative of the present invention having a branched-chain hydrocarbon group has more enhanced dispersibility in a non-polar dispersion medium. Further, the hydrocarbon group-containing compound as a raw material tends to be liquid at room temperature (25° C.), and in this case, the compound is easily handled in the production of the derivative.

Examples of the functional group having a hydrocarbon group that contains 13 or more carbon atoms or the functional group having a C6-C10 hydrocarbon group include, but are not limited to, oxygen-containing groups such as alkoxycarbonyl groups (—COOR) and alkoxyl groups (—OR); sulfur-containing groups; nitrogen-containing groups such as alkylamino groups (—NHR, —NRR') and alkyl amide groups (—CONHR, —CONRR'); and phosphorus-containing groups. Preferred are oxygen-containing groups such as alkoxycarbonyl groups (—COOR) and alkoxyl groups (—OR) and nitrogen-containing groups such as alkylamino groups (—NHR, —NRR') and alkyl amide groups (—CONHR, —CONRR'). R and R' are the same as or different from each other, and each represent a hydrocarbon group containing 13 or more carbon atoms or a C6-C10 hydrocarbon group. That is, a moiety other than the hydrocarbon group of the functional group is preferably, for example, —COO—, —O—, —NH—, —N—, —CONH—, or —CON—.

A preferred amount of other atoms than carbon, hydrogen, and oxygen atoms in the graphite oxide derivative and a preferred amount of other atoms than carbon, hydrogen, oxygen, and nitrogen atoms in the graphite oxide derivative are the same as those in the graphite oxide derivative obtained by the above-described production method of the present invention.

The method for preparing particles of the graphite oxide derivative with a preferred average particle size, shape, or desired particle size is the same as the method for preparing particles of the graphite oxide derivative with a preferred average particle size, shape, or desired particle size by the above-described production method of the present invention.

The following briefly describes a particularly suitable method for producing a graphite oxide derivative of the present invention. The method described below can be suitably applied also to the above-described method for producing a graphite oxide derivative of the present invention.

The present invention also relates to a method for producing a graphite oxide derivative in which the graphite oxide derivative is obtained by reacting graphite oxide with a compound having a hydrocarbon group that contains 13 or more carbon atoms. The present invention also relates to a method for producing a graphite oxide derivative in which the graphite oxide derivative is obtained by reacting graphite oxide with a compound having a C6-C10 hydrocarbon group. Examples of the compound having a hydrocarbon group include amines, isocyanate group-containing compounds, carbonyl group-containing compounds (e.g. carboxylic halides), and alcohols. In the reaction, the modification reaction of the graphite oxide in which the graphite oxide is allowed to react with the compound having a hydrocarbon group that contains a specific number of carbon atoms and the reduction reaction of the graphite oxide itself simultaneously proceed and compete each other. In order to sufficiently prevent the reduction reaction and preferentially carry out the modification reaction of the graphite oxide, the hydrocarbon group-containing compound is preferably an alcohol and/or an amine. An alcohol corresponding to the above-described hydrocarbon group may appropriately be used as the alcohol. An amine corresponding to the above-described hydrocarbon group (a hydrocarbon group is bonded to a nitrogen atom) may appropriately be used as the amine. Any catalysts including known ones may be used in the reaction of graphite oxide with a hydrocarbon group-containing compound. It is a preferred embodiment of the present invention that a base catalyst such as sodium hydroxide, potassium hydroxide, calcium hydroxide, amine, or pyridine or an acid catalyst such as sulfuric acid may be used as the catalyst.

The production of the graphite oxide derivative of the present invention is confirmed by measurement of the infrared absorption spectrum according to the method described in the examples.

In another preferred embodiment of the above-described method for producing a graphite oxide derivative, in the case where a base catalyst is used in the reaction step, the amount of the base catalyst used is 0.01% to 1000% by mass for 100% by mass of the graphite oxide in the liquid mixture for use in the reaction step. According to such an embodiment, the graphite oxide derivative can be efficiently produced.

The amount of the base catalyst used is more preferably 0.1% by mass or more, still more preferably 1% by mass or more. The amount is more preferably 500% by mass or less.

Herein, the amount of the base catalyst used refers to the amount of the base catalyst supplied for preparation of the liquid mixture.

In the case where an acid catalyst is used in the reaction step, the amount of the acid catalyst used is the same as the preferred amount of the acid catalyst for 100% by mass of the graphite oxide in the above-described graphite oxide-containing composition.

Herein, the amount of the acid catalyst used refers to the amount of the acid catalyst supplied for preparation of the liquid mixture.

The graphite oxide itself is essentially an acid substance, and allows the reaction to proceed autocatalytically. As described above, the catalyst is more preferably added, but the autocatalytic reaction can proceed even without a catalyst.

In another preferred embodiment of the above-described method for producing a graphite oxide derivative, a preferred amount of the compound having a hydrocarbon group that contains 13 or more carbon atoms and a preferred amount of the compound having a C6-C10 hydrocarbon group used in the reaction step are each the same as the above-described preferred amount of the compound reactive with an oxygen-containing functional group of the graphite oxide in the present invention.

Herein, the amount of the compound having a hydrocarbon group that contains 13 or more carbon atoms and the amount of the compound having a C6-C10 hydrocarbon group in the liquid mixture refer to the amount of the compound having a hydrocarbon group that contains 13 or more carbon atoms and the amount of the compound having a C6-C10 hydrocarbon group used to prepare the liquid mixture, respectively.

The liquid mixture may be prepared by mixing the graphite oxide, the hydrocarbon group-containing compound such as alcohol, the catalyst, and so on. The graphite oxide, the hydrocarbon group-containing compound, and the catalyst may be obtained by known methods, or may be commercial products. The mixing can be appropriately performed by a known method. For example, the graphite oxide is preferably homogeneously dispersed by ultrasonication or using a known disperser.

The reaction step may be suitably performed by the same method as the above-described production method of the present invention.

The reaction temperature has only to be, for example, 60° C. or higher. At a reaction temperature of 60° C. or higher, the reaction efficiently proceeds. Preferably, the reaction temperature is the same as that in the above-described production method of the present invention. The same applies to the reaction time.

In order to produce the graphite oxide derivative of the present invention, other step(s) may be appropriately performed after the reaction step.

The graphite oxide derivative of the present invention, when having a functional group having a hydrocarbon group that contains 13 or more carbon atoms, has excellent dispersibility in a non-polar dispersion medium, and therefore can be used particularly suitably as, for example, an additive for machinery lubricant oil or an additive for resin.

The graphite oxide derivative of the present invention, when having a functional group having a C6-C10 hydrocarbon group, has excellent dispersibility in an amphiphilic dispersion medium, and therefore can be used particularly suitably as an additive for various resins.

<Dispersion>

The present invention also relates to a dispersion in which the graphite oxide derivative is dispersed in a dispersion medium.

The dispersion of the present invention may be obtained by dispersing the graphite oxide derivative of the present invention in a dispersion medium such as a non-polar dispersion medium.

Examples of the non-polar dispersion medium include C6-C14 aromatic hydrocarbon-type dispersion mediums such as benzene, xylene, toluene, cyclohexylbenzene, dihydrobenzofuran, trimethylbenzene, tetramethylbenzene, naphthalene, and anthracene; C4-C6 aromatic heterocyclic compound-type dispersion mediums such as pyridine, pyrazine, furan, pyrrole, and thiophene; and dispersion mediums of aliphatic hydrocarbon containing 5 or more carbon atoms such as pentane, hexane, heptane, octane, decane, dodecane, tetradecane, hexadecane, octadecane, and cyclohexane. In addition, mineral oil or synthesis oil may be used as a dispersion medium, for example. One of these or a combination of two or more of these may be used.

Also, the dispersion of the present invention may be obtained by dispersing the graphite oxide derivative of the present invention in a dispersion medium such as an amphiphilic dispersion medium.

Examples of the amphiphilic dispersion medium include alcohol-based dispersion mediums such as methanol, ethanol, and propanol; amide- or lactam-type dispersion mediums such as N,N-dimethylformamide (DMF) and N-methylpyrrolidone (NMP); ketone-based dispersion mediums such as acetone, butanone, and pentanone; and glycol- or glycol ether-based dispersion mediums such as ethylene glycol, ethylene glycol methyl ether, propylene glycol, and propylene glycol methyl ether. One of these or a combination of two or more of these may be used.

The dispersing may be carried out using a known stirrer or a known ultrasonic generator, for example. For example, preferably, a mixture of the graphite oxide derivative and a dispersion medium is sonicated for 30 minutes to 2 hours to prepare a dispersion.

In the dispersion of the present invention, the mass proportion of the graphite oxide derivative for 100% by mass of the dispersion medium is preferably 0.0001% by mass or more, more preferably 0.001% by mass or more.

The mass proportion is preferably 10% by mass or less, more preferably 1% by mass or less, still more preferably 0.1% by mass or less.

(Reduced Graphite Oxide)

Instead of the derivatization reaction, the above-described graphite oxide may be further reduced to eliminate a hydrophilic functional group. Thus, more highly hydrophobic reduced graphite oxide is obtained. That is, the present invention also relates to a method for producing reduced graphite oxide, the production method including the steps of oxidizing graphite and preparing reduced graphite oxide by reducing graphite oxide in a graphite oxide-containing composition obtained in the oxidation step, the method not including the step of purifying and drying the graphite oxide-containing composition between the oxidation step and the reduced graphite oxide preparation step. Thus, the reduced graphite oxide can be simply produced.

The same steps as the oxidation step and the separation step in the above-described method for producing a graphite oxide derivative of the present invention can be applied to the production of the reduced graphite oxide, and reduced graphite oxide can be more efficiently produced using these steps.

The method for producing reduced graphite oxide, that is, a method for producing reduced graphite oxide that is prepared by reducing graphite oxide is another aspect of the present invention. The production method includes the steps of oxidizing graphite, separating graphite oxide or a graphite oxide-containing composition obtained in the oxidation step, and reducing graphite oxide obtained in the separation step, the separation step including the step of adding a solvent that has a solubility in water of 0.01% or higher and is not arbitrarily miscible with water to a reaction liquid containing graphite oxide and then separating the graphite oxide or the graphite oxide-containing composition.

In the method for producing reduced graphite oxide of the present invention, the graphite oxide may be reduced by any method as long as it is reduced by elimination of hydrophilic functional groups therefrom. For example, a known reducing agent such as $NaBH_4$, $LiAlH_4$, or L-ascorbic acid may be used or electrolytic reduction may be performed. Preferably, the graphite oxide is reduced by heating.

The graphite oxide is heated preferably at 100° C. or higher, more preferably at 120° C. or higher. The upper limit of the heating temperature of the graphite oxide is not limited. The graphite oxide is usually heated at 2000° C. or lower. The graphite oxide is heated preferably for 0.1 to 100 hours, more preferably for 0.2 to 50 hours.

The graphite oxide may be heated in the air or in an inert gas atmosphere, such as in a nitrogen, helium, or argon atmosphere. The graphite oxide may be heated also in a vacuum.

The preferred embodiments of the step of oxidizing graphite and the step of separating graphite oxide or a graphite oxide-containing composition obtained in the oxidation step in the method for producing reduced graphite oxide of the present invention are the same as the preferred embodiments of the corresponding steps in the above-described method for producing a graphite oxide derivative of the present invention.

The method for producing reduced graphite oxide of the present invention may optionally include other step(s) as long as the method includes the steps of oxidizing graphite, separating graphite oxide or a graphite oxide-containing composition obtained in the oxidation step, and reducing graphite oxide obtained in the separation step. Examples of the other step(s) include the above-described oxidation termination step.

The graphite oxide derivatives obtained according to the first to third preferred embodiments of the production method of the present invention and the graphite oxide derivative of the present invention are suitably used as catalysts, electrode active substances for cells and capacitors, thermoelectric conversion materials, conductive materials, light emitting materials, lubricant additives, additives for polymers, permeable membrane materials, antimicrobial materials, water repellent materials, and adsorption materials. For example, the graphite oxide derivative of the present invention to which a hydrocarbon group containing 13 or more carbon atoms is introduced h has excellent dispersibility in a non-polar dispersion medium, and therefore can be particularly suitably used as an additive for machinery lubricant oil or an additive for resin, for example. The graphite oxide derivative of the present invention to which a C6-C10 hydrocarbon group is introduced has excellent dispersibility in an amphiphilic dispersion medium, and therefore can be particularly suitably used as an additive for various resins, for example.

Examples of the cells include lithium ion secondary cells, polymer electrolyte fuel cells, and metal-air cells.

Examples of thermoelectric conversion apparatus using the thermoelectric conversion materials include geothermal/hot spring geothermal generators, solar power generators, waste heat generators for, for example, factories or vehicles, generators such as body heat generators, and a variety of electric products, electric motors, and satellites equipped with the generator as at least one power source.

The graphite oxide obtained by the method for producing graphite oxide of the present invention and the reduced graphite oxide obtained by the method for producing reduced graphite oxide of the present invention are also suitably used for the above-listed uses.

EXAMPLES

The present invention is described based on examples in more detail below. They are, however, by no means limitative of the scope of the invention. Unless otherwise mentioned, the term "part(s)" means "part(s) by mass" and "%" means "% by mass".

The following describes analyses and evaluations in examples and comparative examples.

<Method of Measuring XRD>

XRD measurement was performed using a fully automatic horizontal X-ray diffraction system (produced by Rigaku Corporation, SMART LAB) under the following conditions.
CuKα1 line: 0.15406 nm
Scanning area: 5° to 45°
X-ray output setting: 45 kV-200 mA
Step size: 0.010°
Scanning speed: 0.5° $min^{-1}$ to 4° $min^{-1}$ A sample was loaded into an airtight sample stand in a glove box and XRD measurement was performed in an inert atmosphere.

<Method of Measuring XPS>

XPS measurement was performed using a photoelectron spectrometer (JPS-9000MX, produced by JEOL). Regarding the C1s narrow scanning, background correction was performed by the Shirley method, and peak separation was performed by peak fitting with the Gaussian-Lorentzian function as a fitting function.

<Method of Measuring FT-IR>

A graphite oxide derivative was mixed with KBr and pelletized, and the measurement was performed using Nicolet NEXUS670 FTIR produced by Thermo Fisher Scientific K.K. The measurement was performed within the range of 900 to 4000 $cm^{-1}$, and the resolution was set at 1 $cm^{-1}$.

<Analysis of Sulfuric Acid Concentration>

The sulfuric acid concentration in the graphite oxide-containing composition was determined by neutralization titration of a graphite oxide aqueous dispersion with an aqueous sodium hydroxide solution.

<Analysis of Water Content>

The concentration of water in the graphite oxide-containing composition was determined using a trace water meter AQV-2200A produced by Hiranuma Sangyo Corporation.

<Analysis of Oxygen Content>

The amount of oxygen in the graphite oxide or its derivative was determined using JPS-9000MX produced by JEOL. The results were expressed by the ratio relative to carbon (C/O ratio).

It is considered that the smaller the carbon-to-oxygen ratio (C/O ratio) in the graphite oxide, the larger the number of oxygen functional groups maintained in the graphite oxide. It is considered that the larger the carbon-to-oxygen ratio (C/O ratio) in the graphite oxide derivative, the more the number of hydrocarbon groups sufficiently introduced in the graphite oxide derivative.

<Method of Measuring FT-IR>

A graphite oxide derivative was mixed with KBr and pelletized, and the measurement was performed using Nicolet NEXUS670 FTIR produced by Thermo Fisher Scientific K.K. The measurement was performed within the range of 900 to 4000 $cm^{-1}$, and the resolution was set at 1 $cm^{-1}$.

<Method of Evaluating Dispersibility>

The change over time of the light transmittance of a 0.1 mg/mL dispersion liquid of a graphite oxide derivative was measured at a wavelength of 660 nm using a colorimeter AP-1000M produced by APEL. The cases were evaluated as good dispersibility where the duration for which light transmission was observed (the duration for which light transmittance increased from 0% to 1%) was 1 hour or longer. The measurement was performed up to 6 hours.

<Elementary Analysis Method>

The mass concentrations of C, H, N, and O were determined using various EL cube CHNS produced by Elementer.

<Drop Hammer Test>

The drop hammer test set forth in JIS K 4810 was performed.

(Synthesis of Graphite Oxide)

Graphite oxide was synthesized in the following steps. A reaction vessel was charged with graphite (produced by Ito Graphite Co., Ltd., Z-5F, 5.76 g) and sulfuric acid (produced by Wako Pure Chemical Industries, Ltd., 167 mL) in advance. To the vessel was added potassium permanganate (produced by Wako Pure Chemical Industries, Ltd., 14.4 g) while the temperature was controlled at 25° C. After the addition, the contents were warmed to 35° C. over 30 minutes and allowed to react for 2 hours. After the reaction, 890 mL of water and a 30% hydrogen peroxide solution (produced by Wako Pure Chemical Industries, Ltd., 88 mL) were added thereto while the reaction vessel was cooled in an ice bath to terminate the reaction. Thus, a graphite oxide-containing composition (reaction liquid containing graphite oxide) was obtained.

Preparation Example 1-1

The resulting reaction liquid containing graphite oxide was put in a centrifuge tube, and was centrifuged at 10000 G for 10 minutes. After the centrifugation, a supernatant was removed to give a graphite oxide-containing composition. The amount of the sulfuric acid in the composition was 300% of the amount of the graphite oxide. The carbon-to-oxygen ratio (C/O ratio) in the resulting graphite oxide was 1.37.

The sulfuric acid concentration can be easily controlled by appropriately adding water before centrifugation.

Preparation Example 1-2

The graphite oxide-containing composition prepared in Preparation Example 1-1 was subjected to a series of centrifugation, removal of the supernatant, and redispersion in water eight times. Thus, purified graphite oxide was obtained. The amount of the sulfuric acid in the composition was 0.01% of the amount of the graphite oxide. The carbon-to-oxygen ratio (C/O ratio) in the resulting graphite oxide was 1.59. Comparison with Preparation Example 1-1 shows that the amount of oxygen was reduced by purification. FIG. 1 is a FT-IR chart of the graphite oxide prepared in Preparation Example 1-2.

Preparation Example 1-3

The graphite oxide-containing composition obtained in Preparation Example 1-2 was dried for 1 hour under reduced pressure. The amount of water in the composition was 10% of the amount of the graphite oxide. The carbon-to-oxygen ratio (C/O ratio) in the resulting graphite oxide was 1.62. Comparison with Preparation Example 1-2 shows that the amount of oxygen was not significantly reduced by drying and the oxygen functional group was stabilized owing to the presence of water.

Preparation Example 1-4

The graphite oxide-containing composition obtained in Preparation Example 1-2 was dried for 2 days under reduced pressure at 50° C. The amount of water in the composition was less than 3% of the amount of the graphite oxide. The carbon-to-oxygen ratio (C/O ratio) in the resulting graphite oxide was 2.60. Comparison with Preparation Example 1-2 shows that the amount of oxygen was significantly reduced by heat-drying.

Preparation Example 1-5

To the resulting reaction liquid containing graphite oxide were added 95% of water and 16% of 1-butanol (produced by Wako Pure Chemical Industries, Ltd.) as a flocculant. The aggregated graphite oxide-containing composition was concentrated by filtration to give a paste-like graphite oxide-containing composition. The amount of the sulfuric acid in the composition was 3% of the amount of the graphite oxide. The carbon-to-oxygen ratio (C/O ratio) in the resulting graphite oxide was 1.42. Concentration by aggregation was found to be suitable as a technique for maintaining the oxygen functional group. The sulfuric acid concentration can be easily controlled by appropriately adding water before aggregation.

Preparation Example 1-6

The graphite oxide-containing composition obtained in Preparation Example 1-5 was dried for 2 days under reduced pressure at 50° C. The amount of water in the composition was less than 3% of the amount of the graphite oxide. The carbon-to-oxygen ratio (C/O ratio) in the resulting graphite oxide was 2.24. Comparison with Preparation Example 1-5 shows that the amount of oxygen was reduced by heat-drying.

(Production of Graphite Oxide Derivative)

The graphite oxide derivative was produced in the following steps.

Example 1-1

Figure 2:
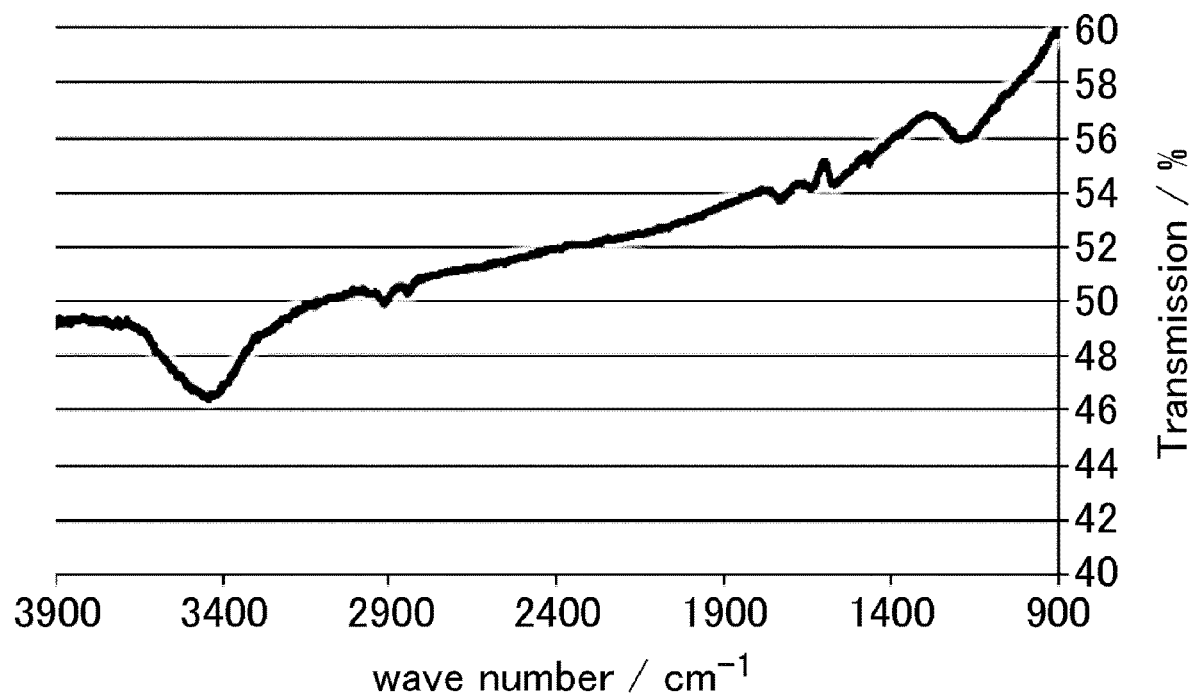
FIG. 2 is a FT-IR chart of the graphite oxide derivative A prepared in Example 1-1.
Figure 3:
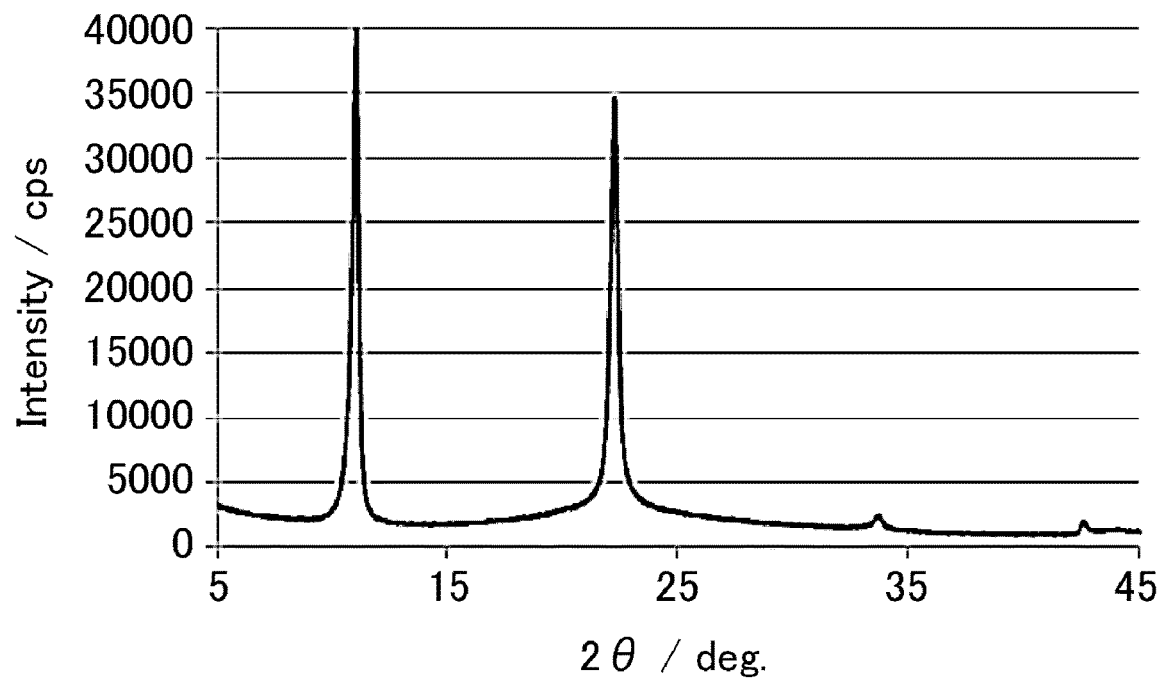
FIG. 3 is an XRD chart of the graphite oxide derivative A prepared in Example 1-1.

The graphite oxide-containing composition obtained in Preparation Example 1-5 was transferred to a reaction vessel, and 2-decyl-1-tetradecanol (produced by New Japan Chemical Co., Ltd., NJCOL 240A) in an amount of 500% of the graphite oxide was added thereto. The contents were allowed to react at 150° C. for 5 hours. After the reaction, hexane was poured therein, and the liquid was filtered. The residue was washed with water, followed by acetone. The resulting solid was vacuum-dried at 100° C. Thus, a graphite oxide derivative A was obtained. The carbon-to-oxygen ratio (C/O ratio) in the graphite oxide derivative A was 8.5. Further, the graphite oxide derivative A was found to have good dispersibility in chloroform, acetone, DMF, ethanol, and decane. The sensitivity grade determined by the drop hammer test was 8. FIG. 2 is a FT-IR chart of the graphite oxide derivative A prepared in Example 1-1. FIG. 3 is an XRD chart of the graphite oxide derivative A prepared in Example 1-1. The graphite oxide derivative A had an X-ray diffraction spectrum as shown in FIG. 3 in which one peak is present within the range of 9° to 13° and one peak is present within the range of 21° to 24°, and had a crystallite diameter of 313 Å determined from the peak within the range of 9° to 13° using the Scherrer equation.

Example 1-2

Figure 4:
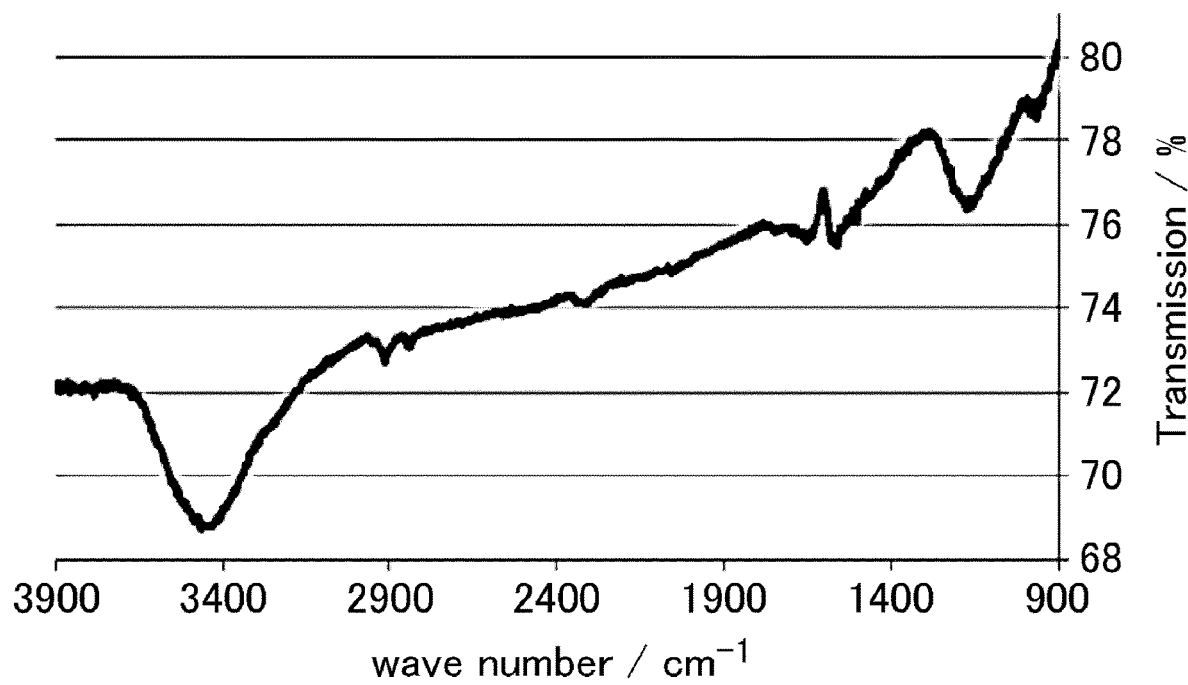
FIG. 4 is a FT-IR chart of the graphite oxide derivative B prepared in Example 1-2.

A graphite oxide derivative B was obtained in the same manner as in Example 1-1 except that the graphite oxide obtained in Preparation Example 1-2 was used as a raw material graphite oxide and sulfuric acid in an amount of 10% of the graphite oxide was added as a catalyst. The carbon-to-oxygen ratio (C/O ratio) in the graphite oxide derivative B was 7.5. Comparison with Example 1-1 shows that the modification amount was low and the C/O ratio was low as expected. This is presumably because the oxygen functional group was reduced by purification, and the modification amount was therefore reduced to smaller than that in Example 1-1. FIG. 4 is a FT-IR chart of the graphite oxide derivative B prepared in Example 1-2.

Example 1-3

Figure 5:
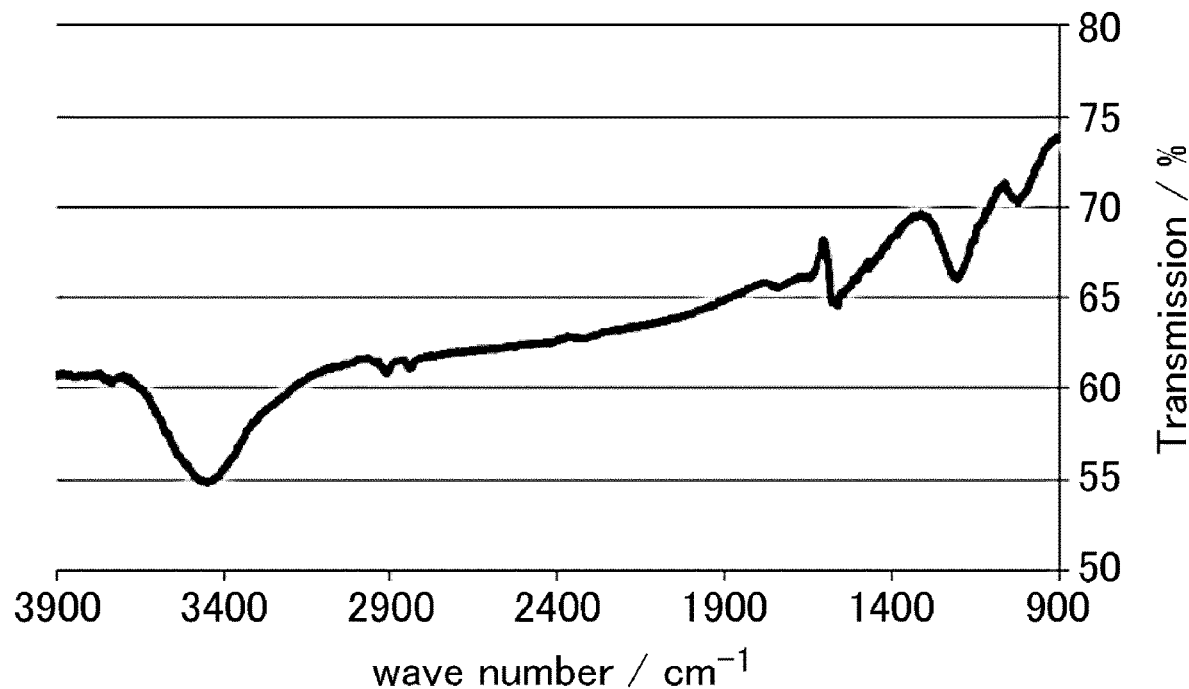
FIG. 5 is a FT-IR chart of the graphite oxide derivative C prepared in Example 1-3.

A graphite oxide derivative C was obtained in the same manner as in Example 1-1 except that the graphite oxide obtained in Preparation Example 1-4 was used as a raw material graphite oxide and sulfuric acid in an amount of 10% of the graphite oxide was added as a catalyst. The carbon-to-oxygen ratio (C/O ratio) in the graphite oxide derivative C was 7.1. Comparison with Example 1-1 shows that the modification amount was low and the C/O ratio was low as expected. This is presumably because the oxygen functional group was reduced by purification and drying, and the modification amount was therefore reduced to smaller than that in Example 1-1. FIG. 5 is a FT-IR chart of the graphite oxide derivative C prepared in Example 1-3.

Example 1-4

Figure 6:
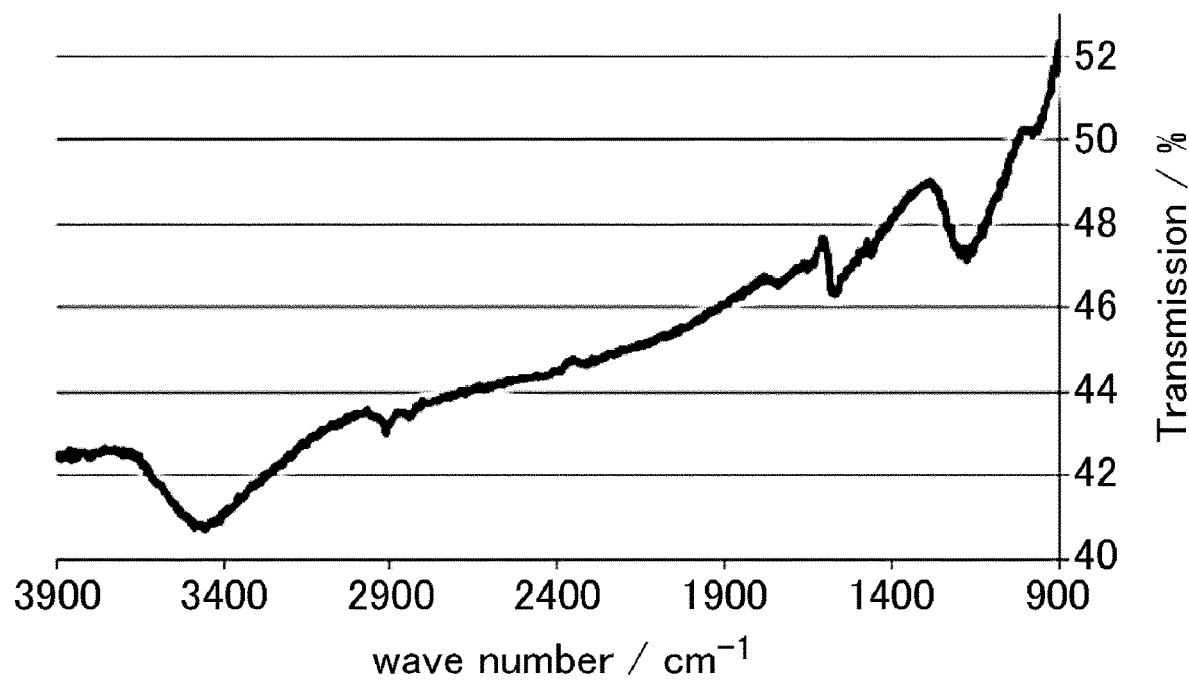
FIG. 6 is a FT-IR chart of the graphite oxide derivative D prepared in Example 1-4.

A graphite oxide derivative D was obtained in the same manner as in Example 1-1 except that the graphite oxide obtained in Preparation Example 1-6 was used as a raw material graphite oxide and sulfuric acid in an amount of 10% of the graphite oxide was added as a catalyst. The carbon-to-oxygen ratio (C/O ratio) in the graphite oxide derivative D was 7.3. Comparison with Example 1-1 shows that the modification amount was low and the C/O ratio was low as expected. This is presumably because oxygen functional group was reduced by drying, and the modification amount was therefore reduced to smaller than that in Example 1-1. FIG. 6 is a FT-IR chart of the graphite oxide derivative D prepared in Example 1-4.

Example 1-5

Figure 7:
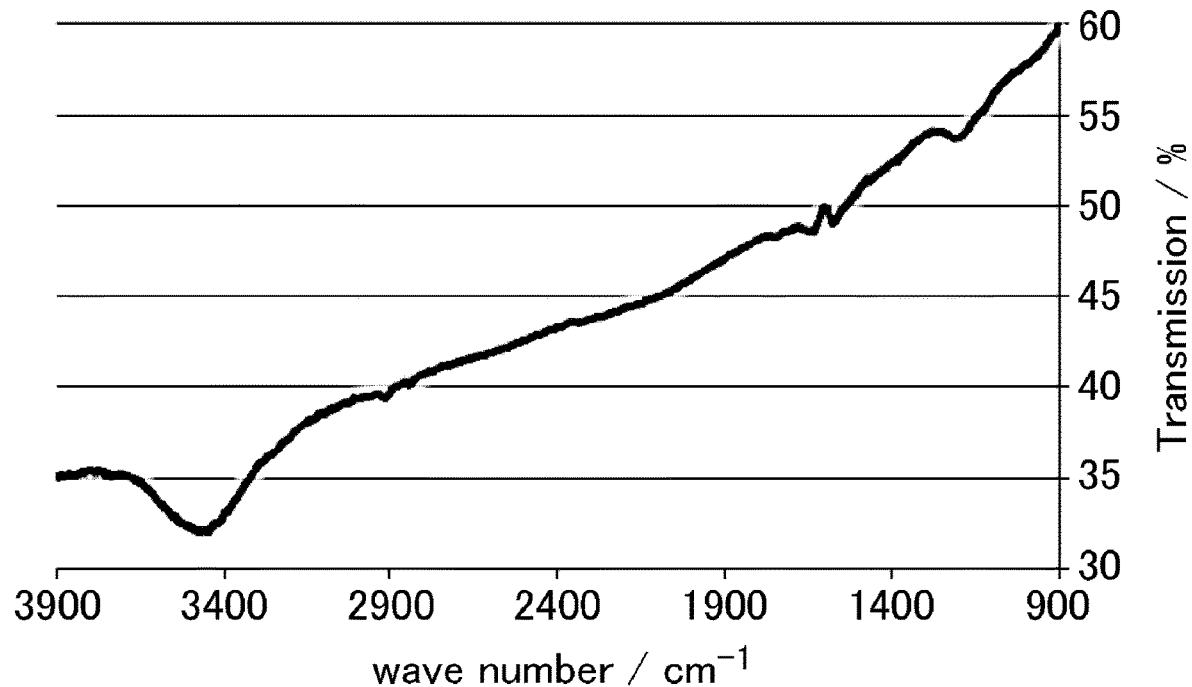
FIG. 7 is a FT-IR chart of the graphite oxide derivative E prepared in Example 1-5.
Figure 8:
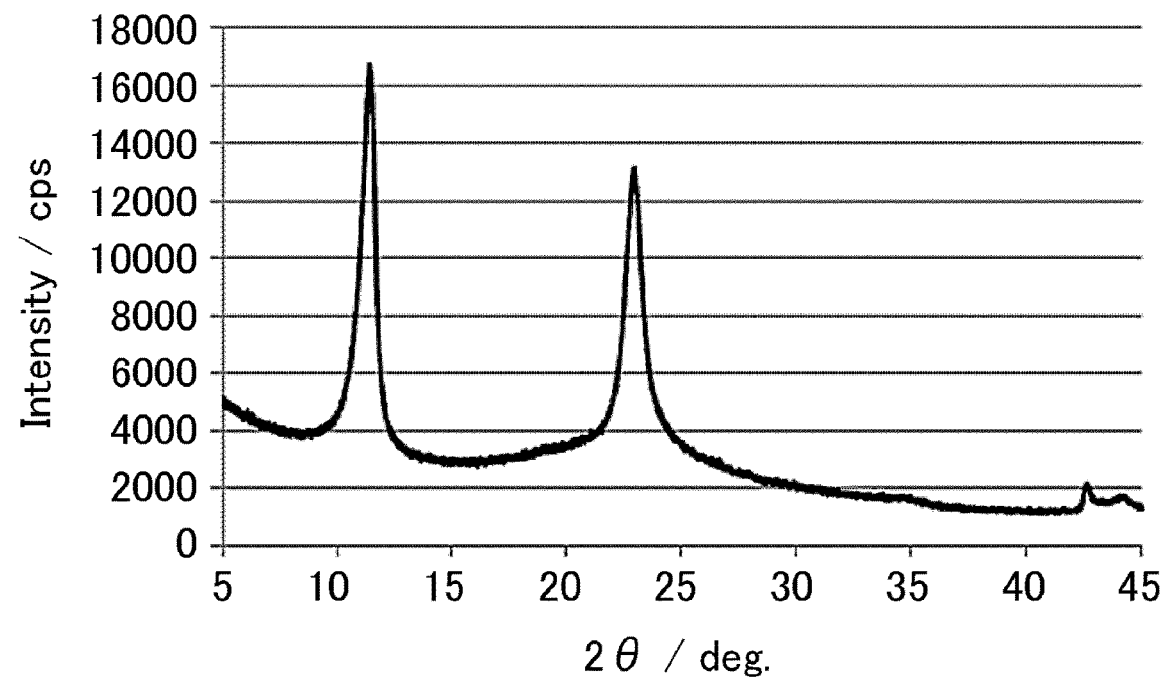
FIG. 8 is an XRD chart of the graphite oxide derivative E prepared in Example 1-5.

A graphite oxide derivative E was obtained in the same manner as in Example 1-1 except that 2-ethyl-1-hexanol (produced by Wako Pure Chemical Industries, Ltd.) was used instead of 2-decyl-1-tetradecanol. The carbon-to-oxygen ratio (C/O ratio) in the graphite oxide derivative E was 6.8. Further, the graphite oxide derivative E was found to have good dispersibility in chloroform, acetone, DMF, ethanol, and decane. The sensitivity grade determined by the drop hammer test was 8. FIG. 7 is a FT-IR chart of the graphite oxide derivative E prepared in Example 1-5. FIG. 8 is an XRD chart of the graphite oxide derivative E prepared in Example 1-5. The graphite oxide derivative E had an X-ray diffraction spectrum as shown in FIG. 8 in which one peak is present within the range of 9° to 13° and one peak is present within the range of 21° to 24°, and had a crystallite diameter of 111.6 Å determined from the peak within the range of 9° to 13° using the Scherrer equation.

Example 1-6

Figure 9:
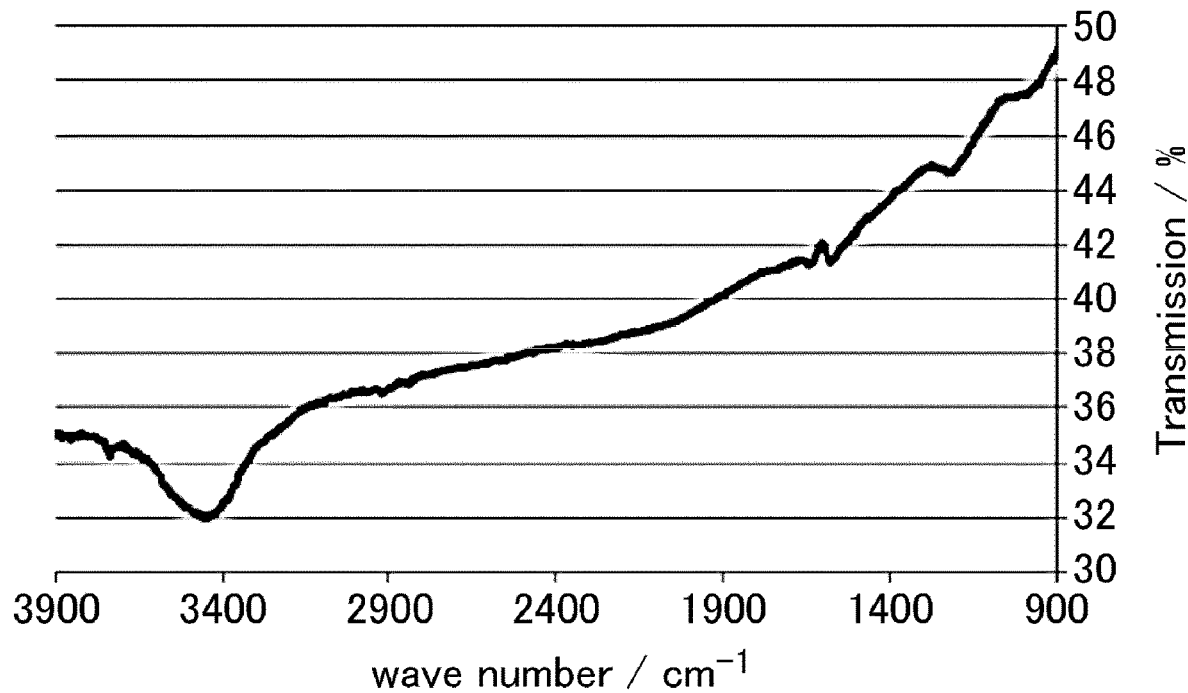
FIG. 9 is a FT-IR chart of the graphite oxide derivative F prepared in Example 1-6.

A graphite oxide derivative F was obtained in the same manner as in Example 1-2 except that 2-ethyl-1-hexanol (produced by Wako Pure Chemical Industries, Ltd.) was used instead of 2-decyl-1-tetradecanol. The carbon-to-oxygen ratio (C/O ratio) in the graphite oxide derivative F was 6.2. Comparison with Example 1-5 shows that the modification amount was low and the C/O ratio was low as expected. This is presumably because oxygen functional group was reduced by purification, and the modification amount was therefore reduced to smaller than that in Example 1-5. FIG. 9 is a FT-IR chart of the graphite oxide derivative F prepared in Example 1-6.

Example 1-7

Figure 10:
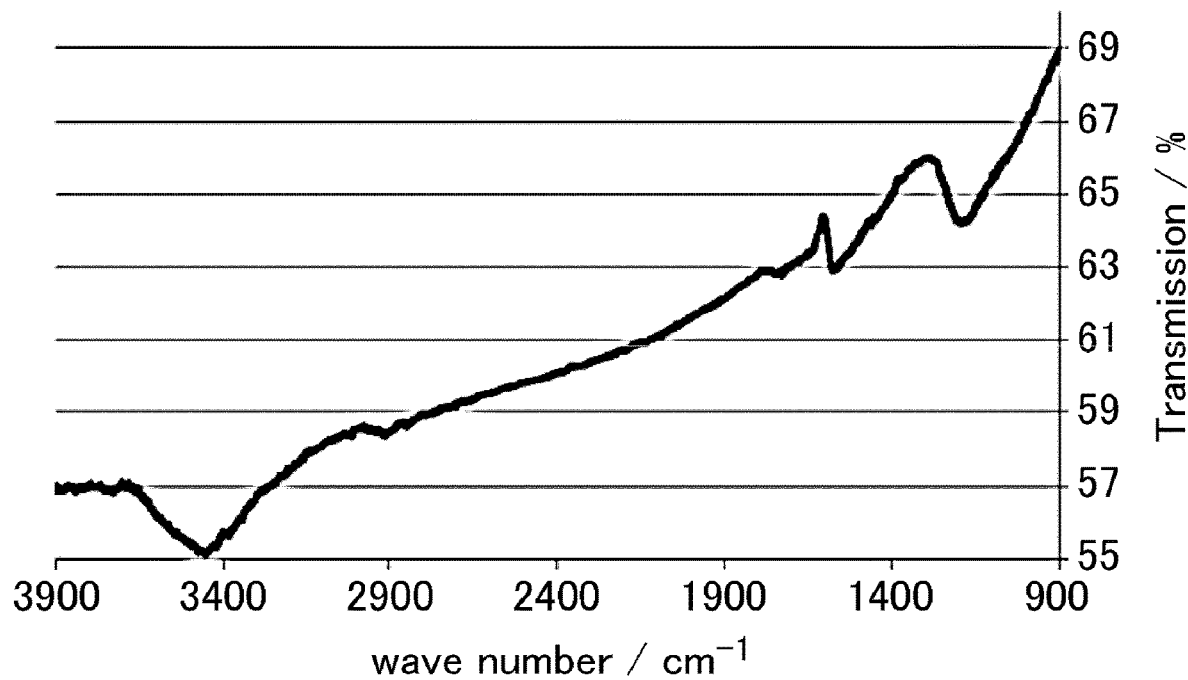
FIG. 10 is a FT-IR chart of the graphite oxide derivative G prepared in Example 1-7.

A graphite oxide derivative G was obtained in the same manner as in Example 1-3 except that 2-ethyl-1-hexanol (produced by Wako Pure Chemical Industries, Ltd.) was used instead of 2-decyl-1-tetradecanol. The carbon-to-oxygen ratio (C/O ratio) in the graphite oxide derivative G was 6.0. Comparison with Example 1-5 shows that the modification amount was low and the C/O ratio was low as expected. This is presumably because oxygen functional group was reduced by purification and drying, and the modification amount was therefore reduced to smaller than that in Example 1-5. FIG. 10 is a FT-IR chart of the graphite oxide derivative G prepared in Example 1-7.

Example 1-8

Figure 11:
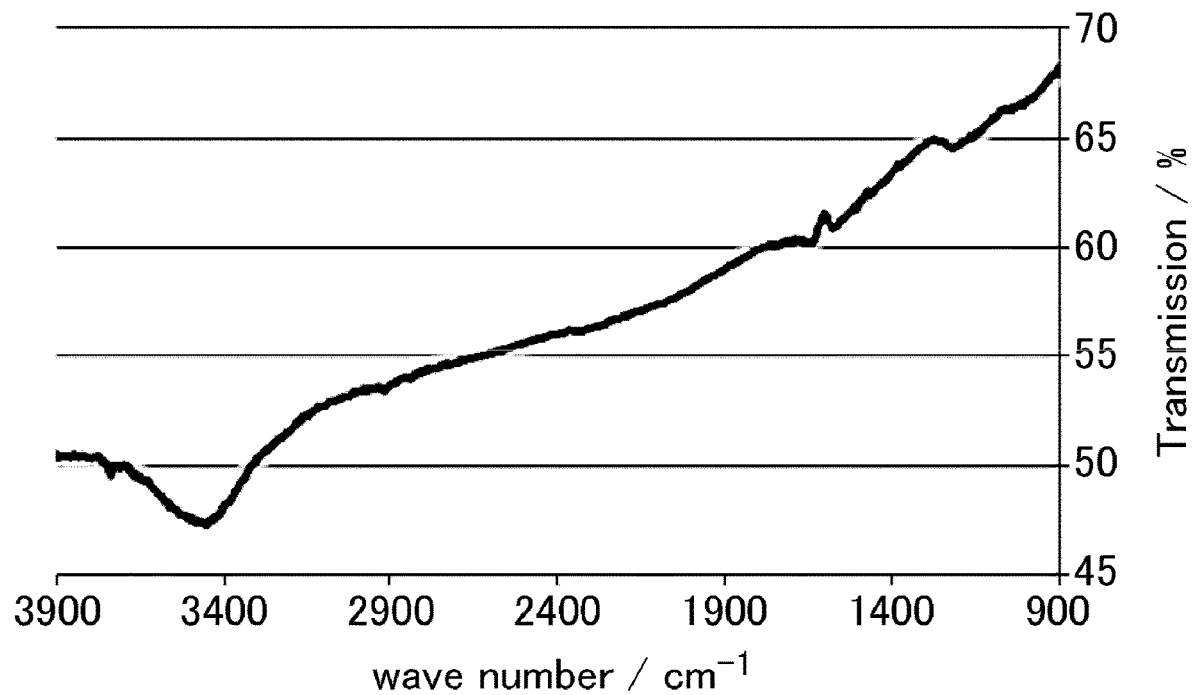
FIG. 11 is a FT-IR chart of the graphite oxide derivative H prepared in Example 1-8.

A graphite oxide derivative H was obtained in the same manner as in Example 1-4 except that 2-ethyl-1-hexanol (produced by Wako Pure Chemical Industries, Ltd.) was used instead of 2-decyl-1-tetradecanol. The carbon-to-oxygen ratio (C/O ratio) in the graphite oxide derivative H was 6.1. Comparison with Example 1-5 shows that the modification amount was low and the C/O ratio was low as expected. This is presumably because oxygen functional group was reduced by drying, and the modification amount was therefore reduced to smaller than that in Example 1-5. FIG. 11 is a FT-IR chart of the graphite oxide derivative H prepared in Example 1-8.

Example 1-9

Figure 12:
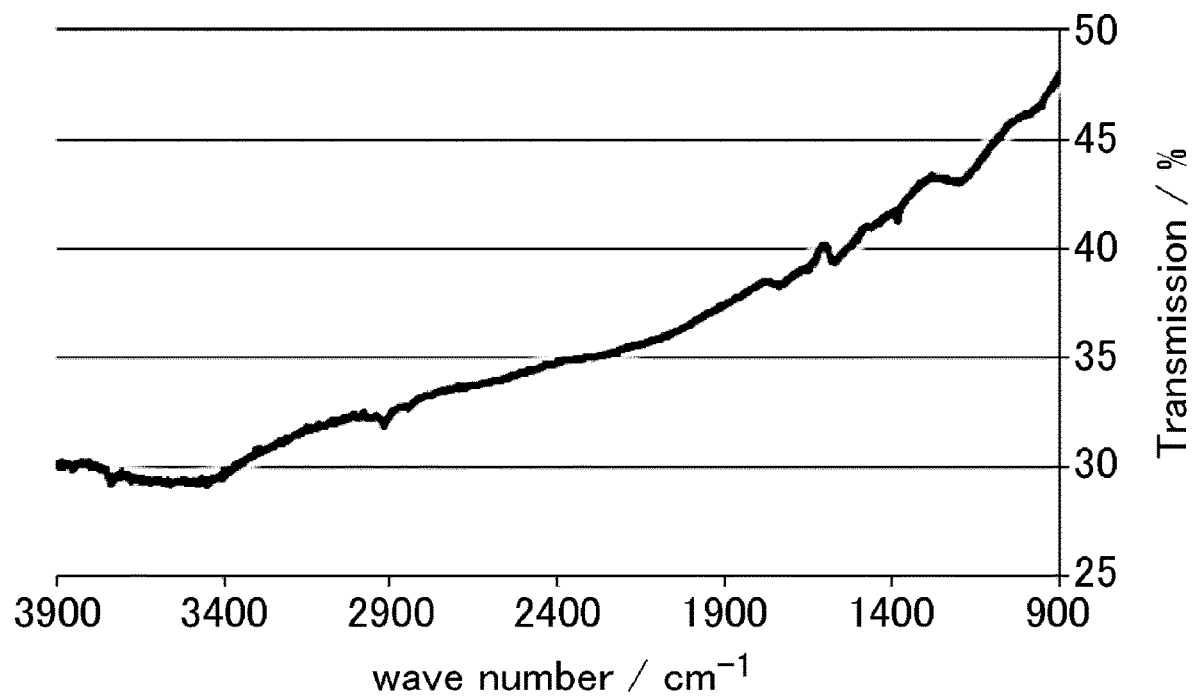
FIG. 12 is a FT-IR chart of the graphite oxide derivative I prepared in Example 1-9.
Figure 13:
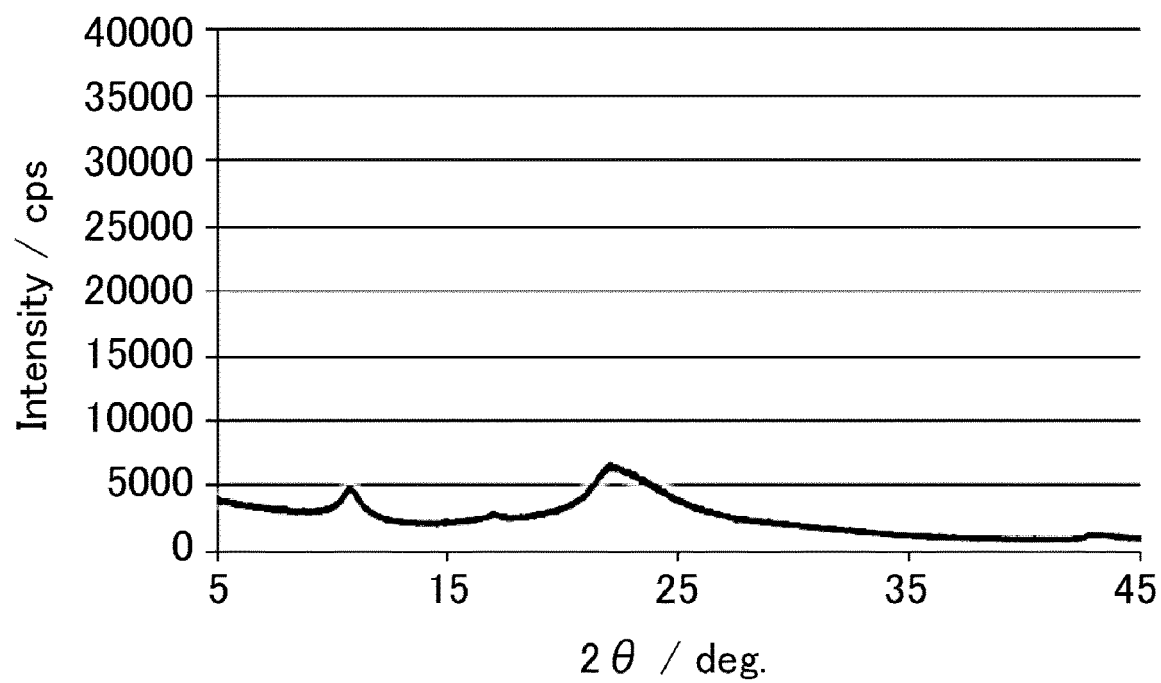
FIG. 13 is an XRD chart of the graphite oxide derivative I prepared in Example 1-9.

A graphite oxide derivative I was obtained in the same manner as in Example 1-1 except that the reaction temperature was set at 100° C. and the reaction time was set at 24 hours. The carbon-to-oxygen ratio (C/O ratio) in the graphite oxide derivative I was 7.1. Comparison between the XRD patterns of Examples 1-1 and 1-9 shows that the peaks for the graphite oxide derivative A in Example 1-1 are sharper than those for the graphite oxide derivative I in Example 1-9, which indicates that the graphite oxide derivative A was more highly crystalline. The sensitivity grade determined by the drop hammer test was 7. FIG. 12 is a FT-IR chart of the graphite oxide derivative I prepared in Example 1-9. FIG. 13 is an XRD chart of the graphite oxide derivative I prepared in Example 1-9. The graphite oxide derivative I had an X-ray diffraction spectrum as shown in FIG. 13 in which one peak is present within the range of 9° to 13° and one peak is present within the range of 21° to 24°, and had a crystallite diameter of 61.8 Å determined from the peak within the range of 9° to 13° using the Scherrer equation.

Example 1-10

Figure 14:
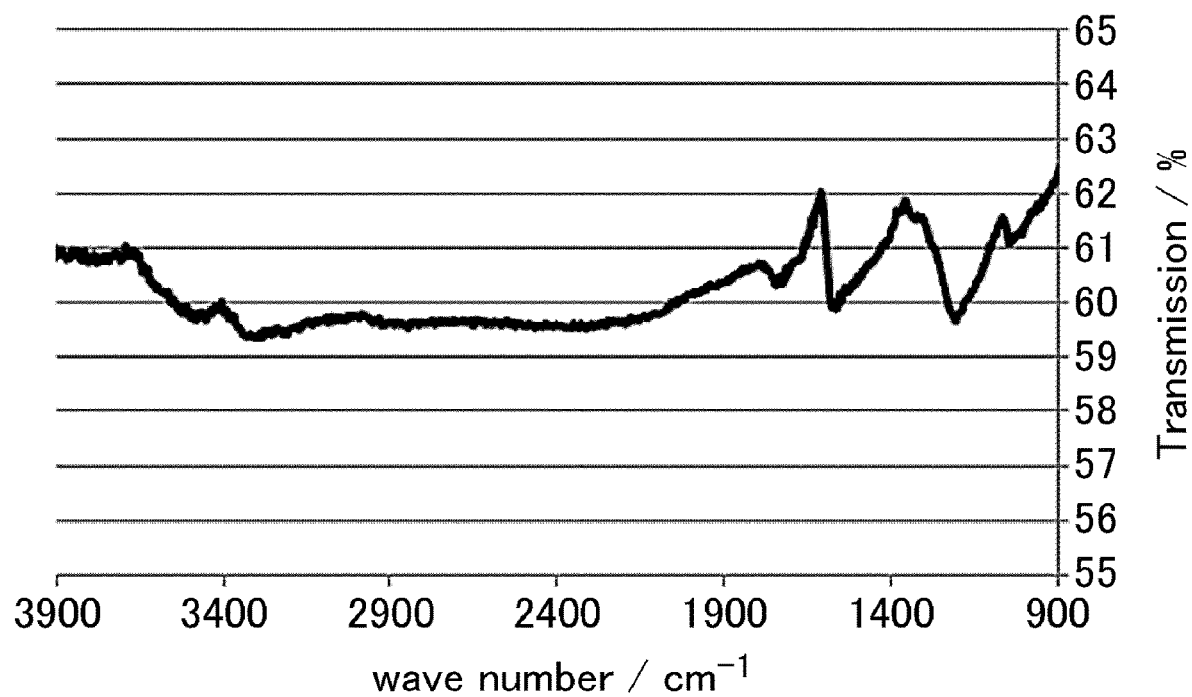
FIG. 14 is a FT-IR chart of the graphite oxide derivative J prepared in Example 1-10.
Figure 15:
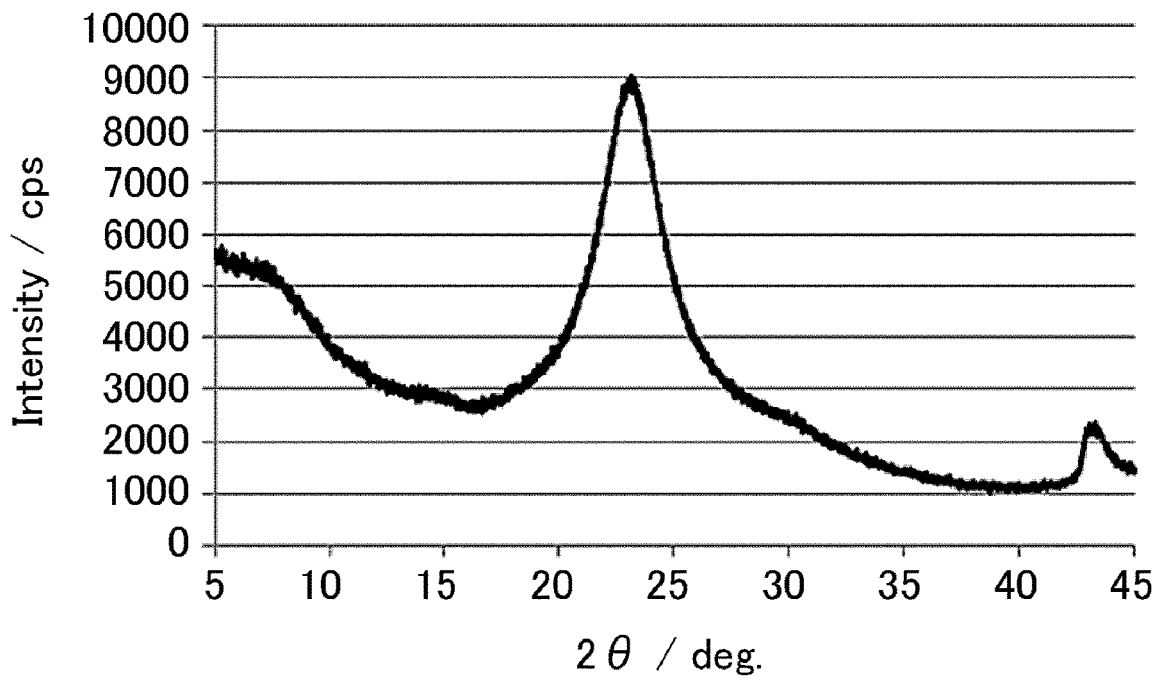
FIG. 15 is an XRD chart of the graphite oxide derivative J prepared in Example 1-10.

A graphite oxide derivative J was obtained in the same manner as in Example 1-5 except that the reaction temperature was set at 100° C. and the reaction was carried out for 24 hours. The carbon-to-oxygen ratio (C/O ratio) in the graphite oxide derivative J was 6.1. Comparison between the XRD patterns of Examples 1-5 and 1-10 shows that the peaks for the graphite oxide derivative E in Example 1-5 are sharper than those for the graphite oxide derivative J in Example 1-10, which indicates that the graphite oxide derivative E was more highly crystalline. The sensitivity grade determined by the drop hammer test was 7. The above comparison between Example 1-1 and Example 1-9 and comparison between Example 1-5 and Example 1-10 demonstrate that the sensitivity determined by the drop hammer test is able to be eliminated at a reaction temperature of 150° C. FIG. 14 is a FT-IR chart of the graphite oxide derivative J prepared in Example 1-10. FIG. 15 is an XRD chart of the graphite oxide derivative J prepared in Example 1-10. The graphite oxide derivative J had an X-ray diffraction spectrum as shown in FIG. 15 in which one peak is present within the range of 21° to 24° but no peak is present within the range of 9° to 13°.

Example 1-11

The graphite oxide-containing composition obtained in Preparation Example 1-5 was transferred to a reaction vessel. To the vessel was added 2-decyl-1-tetradecanol (produced by New Japan Chemical Co., Ltd., NJCOL 240A) in an amount of 500% of the graphite oxide. Then, water and 1-butanol were distilled away at 100° C. under reduced pressure. Thereafter, the contents were heated and allowed to react at 150° C. for 5 hours. After the reaction, hexane was poured therein, and the liquid was filtered. The residue was washed with water, followed by acetone. The resulting solid was vacuum-dried at 100° C. Thus, a graphite oxide derivative X was obtained. The carbon-to-oxygen ratio (C/O ratio) in the graphite oxide derivative X was 8.7. Further, the graphite oxide derivative X was found to have good dispersibility in chloroform, acetone, DMF, ethanol, and decane. The sensitivity grade determined by the drop hammer test was 8.

Example 1-12

A graphite oxide derivative Y was obtained in the same manner as in Example 1-11 except that 2-ethyl-1-hexanol (produced by Wako Pure Chemical Industries, Ltd.) was used instead of 2-decyl-1-tetradecanol. The carbon-to-oxygen ratio (C/O ratio) in the graphite oxide derivative Y was 6.9. Further, the graphite oxide derivative Y was found to have good dispersibility in chloroform, acetone, DMF, ethanol, and decane. According to the results of Examples 1-11 and 1-12, it is also a preferred embodiment that a volatile compound such as 1-butanol used as a flocculant is distilled off under reduced pressure in advance. The sensitivity grade determined by the drop hammer test was 8.

Example 1-13

A graphite oxide derivative A-A was obtained in the same manner as in Example 1-1 except that stearylamine (produced by Tokyo Chemical Industry Co., Ltd.) was used instead of 2-decyl-1-tetradecanol. The carbon-to-oxygen ratio (C/O ratio) in the graphite oxide derivative A-A was 8.0. Further, the graphite oxide derivative A-A was found to have good dispersibility in chloroform, acetone, DMF, ethanol, and decane. The sensitivity grade determined by the drop hammer test was 8.

Example 1-14

A graphite oxide derivative A-B was obtained in the same manner as in Example 1-13 except that the graphite oxide obtained in Preparation Example 1-2 was used as a raw material graphite oxide. The carbon-to-oxygen ratio (C/O ratio) in the graphite oxide derivative A-B was 7.2. Comparison with Example 1-13 shows that the modification amount was low and the C/O ratio was low as expected. This is presumably because oxygen functional group was reduced by purification, and the modification amount was therefore reduced to smaller than that in Example 1-13.

Example 1-15

A graphite oxide derivative A-C was obtained in the same manner as in Example 1-13 except that the graphite oxide obtained in Preparation Example 1-4 was used as a raw material graphite oxide. The carbon-to-oxygen ratio (C/O ratio) in the graphite oxide derivative A-C was 6.6. Comparison with Example 1-13 shows that the modification amount was low and the C/O ratio was low. This is presumably because oxygen functional group was reduced by purification and drying, and the modification amount was therefore reduced to smaller than that in Example 1-13.

Example 1-16

A graphite oxide derivative A-D was obtained in the same manner as in Example 1-13 except that the graphite oxide obtained in Preparation Example 1-6 was used as a raw material graphite oxide. The carbon-to-oxygen ratio (C/O ratio) in the graphite oxide derivative A-D was 6.9. Comparison with Example 1-13 shows that the modification amount was low and the C/O ratio was low as expected. This is presumably because oxygen functional group was reduced by drying, and the modification amount was therefore reduced to smaller than that in Example 1-13.

Example 1-17

A graphite oxide derivative A-E was obtained in the same manner as in Example 1-1 except that 2-ethylhexylamine (produced by Tokyo Chemical Industry Co., Ltd.) was used instead of 2-decyl-1-tetradecanol. The carbon-to-oxygen ratio (C/O ratio) in the graphite oxide derivative A-E was 6.7. Further, the graphite oxide derivative A-E was found to have good dispersibility in chloroform, acetone, DMF, ethanol, and decane. The sensitivity grade determined by the drop hammer test was 8.

Example 1-18

A graphite oxide derivative A-F was obtained in the same manner as in Example 1-17 except that the graphite oxide obtained in Preparation Example 1-2 was used as a raw material graphite oxide. The carbon-to-oxygen ratio (C/O ratio) in the graphite oxide derivative A-F was 6.2. Comparison with Example 1-17 shows that the modification amount was low and the C/O ratio was low as expected. This is presumably because oxygen functional group was reduced by purification, and the modification amount was therefore reduced to smaller than that in Example 1-17.

Example 1-19

A graphite oxide derivative A-G was obtained in the same manner as in Example 1-17 except that the graphite oxide obtained in Preparation Example 1-4 was used as a raw material graphite oxide. The carbon-to-oxygen ratio (C/O ratio) in the graphite oxide derivative A-G was 6.0. Comparison with Example 1-17 shows that the modification amount was low and the C/O ratio was low. This is presumably because oxygen functional group was reduced by purification and drying, and the modification amount was therefore reduced to smaller than that in Example 1-17.

Example 1-20

A graphite oxide derivative A-H was obtained in the same manner as in Example 1-17 except that the graphite oxide obtained in Preparation Example 1-6 was used as a raw material graphite oxide. The carbon-to-oxygen ratio (C/O ratio) in the graphite oxide derivative A-H was 6.1. Comparison with Example 1-17 shows that the modification amount was low and the C/O ratio was low as expected. This is presumably because oxygen functional group was reduced by drying, and the modification amount was therefore reduced to smaller than that in Example 1-17.

Example 1-21

A graphite oxide derivative A-I was obtained in the same manner as in Example 1-1 except that NMP in an amount of 10000% of the graphite oxide was added as a reaction solvent and dispersed by ultrasonication and stearylamine (produced by Tokyo Chemical Industry Co., Ltd.) was used instead of 2-decyl-1-tetradecanol. The carbon-to-oxygen ratio (C/O ratio) in the graphite oxide derivative A-I was 8.3. Further, the graphite oxide derivative A-I was found to have good dispersibility in chloroform, acetone, DMF, ethanol, and decane. The sensitivity grade determined by the drop hammer test was 8.

Example 1-22

A graphite oxide derivative A-J was obtained in the same manner as in Example 1-1 except that NMP in an amount of 10000% of the graphite oxide was added as a reaction solvent and dispersed by ultrasonication and 2-ethylhexylamine (produced by Tokyo Chemical Industry Co., Ltd.) was used instead of 2-decyl-1-tetradecanol. The carbon-to-oxygen ratio (C/O ratio) in the graphite oxide derivative A-J was 7.0. Further, the graphite oxide derivative A-J was found to have good dispersibility in chloroform, acetone, DMF, ethanol, and decane. The sensitivity grade determined by the drop hammer test was 8.

Example 1-23

Figure 16:
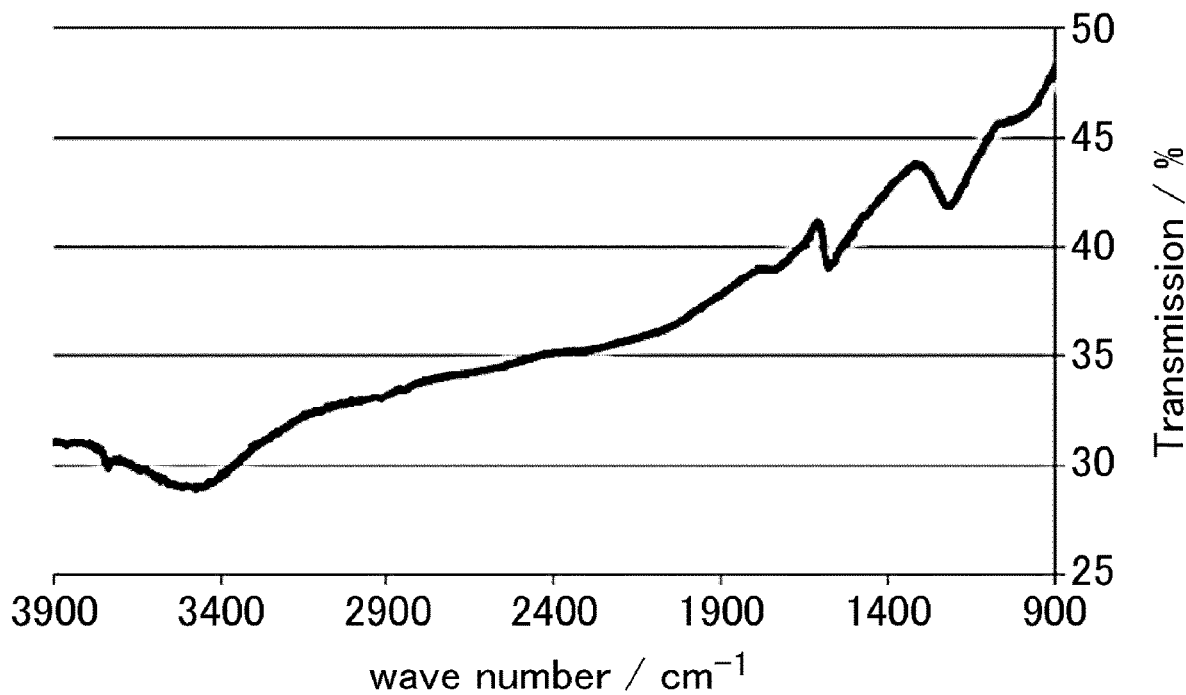
FIG. 16 is a FT-IR chart of the graphite oxide derivative K prepared in Example 1-23.

A graphite oxide derivative K was obtained in the same manner as in Example 1-3 except that the reaction temperature was set at 100° C. and the reaction time was set at 24 hours. The carbon-to-oxygen ratio (C/O ratio) in the graphite oxide derivative K was 6.0. The modification amount was found to be smaller than those in Examples 1-1 to 1-4. FIG. 16 is a FT-IR chart of the graphite oxide derivative K prepared in Example 1-23. The graphite oxide derivative in Example 1-23 prepared by adding 2-decyl-1-tetradecanol containing 24 carbon atoms is dispersible in a non-polar dispersion medium.

Example 1-24

Figure 17:
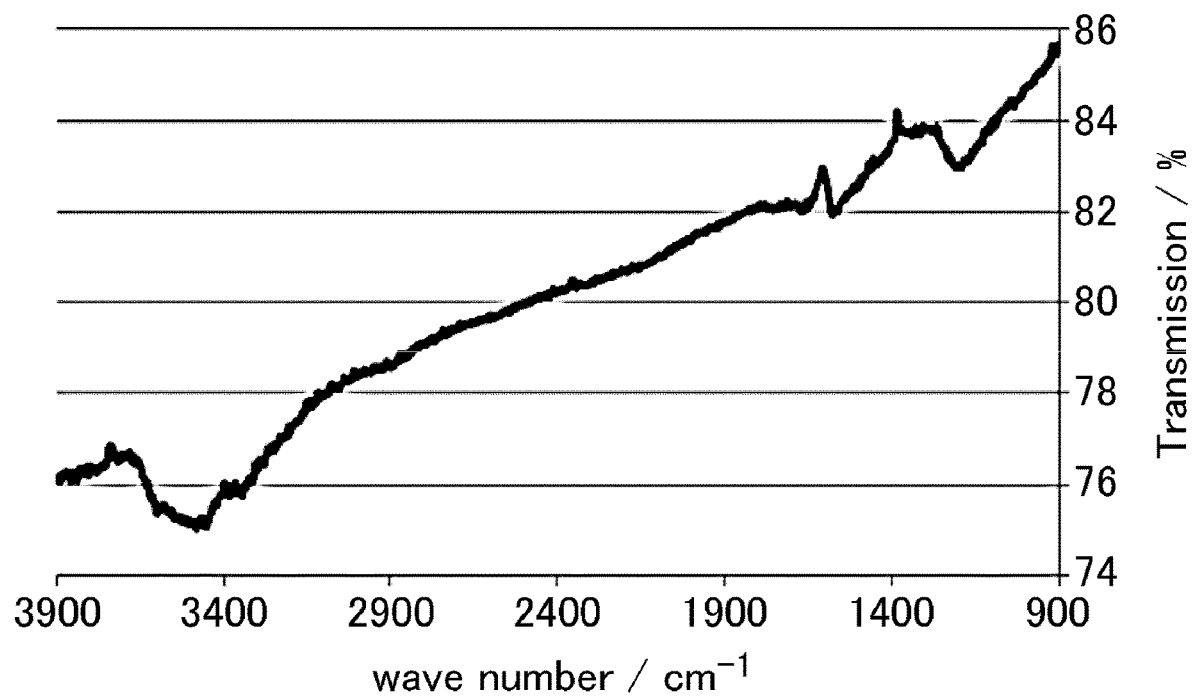
FIG. 17 is a FT-IR chart of the graphite oxide derivative L prepared in Example 1-24.

A graphite oxide derivative L was obtained in the same manner as in Example 1-7 except that the reaction temperature was set at 100° C. and the reaction time was set at 24 hours. The carbon-to-oxygen ratio (C/O ratio) in the graphite oxide derivative L was 5.6. The modification amount was found to be smaller than those in Examples 1-5 to 1-8. FIG. 17 is a FT-IR chart of the graphite oxide derivative L prepared in Example 1-24. The graphite oxide derivative in Example 1-24 prepared by adding 2-ethyl-1-hexanol containing 8 carbon atoms is dispersible in an amphiphilic dispersion medium.

The results of Examples 1-1 to 1-24 are shown in Table 1 below.

TABLE 1

| | Graphite oxide | | Reaction temperature of derivatization | Graphite oxide derivative | | Drop hammer test |
|---|---|---|---|---|---|---|
| | Preparation Example | Purification/Drying | | Symbol | C/O ratio | |
| Example 1-1 | 1-5 | None | 150° C. | A | 8.5 | Grade 8 |
| Example 1-2 | 1-2 | Only purification | 150° C. | B | 7.5 | |
| Example 1-3 | 1-4 | Purification + drying | 150° C. | C | 7.1 | |

TABLE 1-continued

| Preparation Example | Graphite oxide Purification/Drying | Reaction temperature of derivatization | Graphite oxide derivative Symbol | C/O ratio | Drop hammer test |
|---|---|---|---|---|---|
| Example 1-4 | 1-6 | Only drying | 150° C. | D | 7.3 | |
| Example 1-5 | 1-5 | None | 150° C. | E | 6.8 | Grade 8 |
| Example 1-6 | 1-2 | Only purification | 150° C. | F | 6.2 | |
| Example 1-7 | 1-4 | Purification + drying | 150° C. | G | 6.0 | |
| Example 1-8 | 1-6 | Only drying | 150° C. | H | 6.1 | |
| Example 1-9 | 1-5 | None | 100° C. | I | 7.1 | Grade 7 |
| Example 1-10 | 1-5 | None | 100° C. | J | 6.1 | Grade 7 |
| Example 1-11 | 1-5 | None | 150° C. | X | 8.7 | Grade 8 |
| Example 1-12 | 1-5 | None | 150° C. | Y | 6.9 | Grade 8 |
| Example 1-13 | 1-5 | None | 150° C. | A-A | 8.0 | Grade 8 |
| Example 1-14 | 1-2 | Only purification | 150° C. | A-B | 7.2 | |
| Example 1-15 | 1-4 | Purification + drying | 150° C. | A-C | 6.6 | |
| Example 1-16 | 1-6 | Only drying | 150° C. | A-D | 6.9 | |
| Example 1-17 | 1-5 | None | 150° C. | A-E | 6.7 | Grade 8 |
| Example 1-18 | 1-2 | Only purification | 150° C. | A-F | 6.2 | |
| Example 1-19 | 1-4 | Purification + drying | 150° C. | A-G | 6.0 | |
| Example 1-20 | 1-6 | Only drying | 150° C. | A-H | 6.1 | |
| Example 1-21 | 1-5 | None | 150° C. | A-I | 8.3 | Grade 8 |
| Example 1-22 | 1-5 | None | 150° C. | A-J | 7.0 | Grade 8 |
| Example 1-23 | 1-4 | Purification + drying | 100° C. | K | 6.0 | |
| Example 1-24 | 1-4 | Purification + drying | 100° C. | L | 5.6 | |

Preparation Example 2-1

A corrosion-resistant reaction vessel was charged with 28.75 parts of concentrated sulfuric acid (special grade, produced by Wako Pure Chemical Industries, Ltd.) and 1.00 part of natural graphite (Z-5F, flaky graphite, produced by Ito Graphite Co., Ltd.) to prepare a liquid mixture. Potassium permanganate (special grade, produced by Wako Pure Chemical Industries, Ltd.) was added to the liquid mixture in 20 portions at 15-minute intervals while the liquid mixture was stirred. The amount of the potassium permanganate in each portion was 0.125 parts, and the total amount of the potassium permanganate added was 2.50 parts. After the addition of the potassium permanganate, the liquid mixture was warmed to 35° C., and aged for 2 hours while the temperature thereof was maintained. Thereafter, 63.45 parts of ion exchange water and 1.77 parts of a 30% hydrogen peroxide solution (special grade, produced by Wako Pure Chemical Industries, Ltd.) were added to the liquid mixture while the temperature of the liquid mixture was maintained at 60° C. or lower to terminate the reaction. Hereinafter, the graphite oxide-containing slurry obtained by such a method is referred to as "post-reaction slurry".

Comparative Example 2-1

A 30-g portion of the post-reaction slurry (containing 0.45 g of graphite oxide) was filtered using an aspirator with a diameter of 55 mm to separate graphite oxide. Teflon (registered trademark) filter paper (produced by ADVANTEC, PF050) was used as a filter paper. It took 104 seconds for a cake of a graphite oxide layer to be exposed in the aspirator.

Example 2-1

Graphite oxide was separated under the same conditions as in Comparative Example 2-1 except that 0.13 g of cyclohexanone (special grade, produced by Wako Pure Chemical Industries, Ltd., solubility in water: 5% by weight) was added to 30 g of the post-reaction slurry (containing 0.45 g of graphite oxide) and they were shaken well. The filtering took 65 seconds, which demonstrates that addition of cyclohexanone remarkably accelerates the filtration. The graphite oxide-containing composition (subjected to neither the purification step nor the drying step) left on the filter paper was dispersed in 30 g of NMP, followed by addition of 1.5 g of stearylamine. The contents were allowed to react at 120° C. for 5 hours. After the reaction, the reaction liquid was filtered. The residue was washed with water, followed by acetone, and dried. Thus, 1 g of a graphite oxide derivative was obtained. The resulting graphite oxide derivative showed good dispersibility in a non-polar solvent such as decane or liquid paraffin.

Example 2-2

Graphite oxide was separated under the same conditions as in Comparative Example 2-1 except that 0.39 g of cyclohexanone (special grade, produced by Wako Pure Chemical Industries, Ltd., solubility in water: 5% by weight) was added to 30 g of the post-reaction slurry and they were shaken well. The filtering took 73 seconds, which demonstrates that addition of cyclohexanone remarkably accelerates the filtration. The graphite oxide-containing composition (subjected to neither the purification step nor the drying step) left on the filter paper was dispersed in 30 g of NMP, followed by addition of 1.5 g of stearylamine. The contents were allowed to react at 120° C. for 5 hours. After the reaction, the reaction liquid was filtered. The residue was washed with water, followed by acetone, and dried. Thus, 1 g of a graphite oxide derivative was obtained. The resulting graphite oxide derivative showed good dispersibility in a non-polar solvent such as decane or liquid paraffin.

Example 2-3

Graphite oxide was separated under the same conditions as in Comparative Example 2-1 except that 1.30 g of cyclohexanone (special grade, produced by Wako Pure Chemical Industries, Ltd., solubility in water: 5% by weight) was added to 30 g of the post-reaction slurry and they were shaken well. The filtering took 47 seconds, which demonstrates that addition of cyclohexanone remarkably accelerates the filtration. The graphite oxide-containing composition (subjected to neither the purification step nor the drying step) left on the filter paper was dispersed in 30 g of NMP, followed by addition of 1.5 g of stearylamine. The contents were allowed to react at 120° C. for 5 hours. After the reaction, the reaction liquid was filtered. The residue was washed with water, followed by acetone, and dried. Thus, 1 g of a graphite oxide derivative was obtained. The resulting graphite oxide derivative showed good dispersibility in a non-polar solvent such as decane or liquid paraffin.

Example 2-4

Graphite oxide was separated under the same conditions as in Comparative Example 2-1 except that 0.39 g of 1-butanol (special grade, produced by Wako Pure Chemical Industries, Ltd., solubility in water: 6.4% by weight) was added to 30 g of the post-reaction slurry and they were shaken well. The filtering took 80 seconds, which demonstrates that addition of 1-butanol remarkably accelerates the filtration. The graphite oxide-containing composition (subjected to neither the purification step nor the drying step) left on the filter paper was dispersed in 30 g of NMP, followed by addition of 1.5 g of stearylamine. The contents were allowed to react at 120° C. for 5 hours. After the reaction, the reaction liquid was filtered. The residue was washed with water, followed by acetone, and dried. Thus, 1.1 g of a graphite oxide derivative was obtained. The resulting graphite oxide derivative showed good dispersibility in a non-polar solvent such as decane or liquid paraffin.

Example 2-5

Graphite oxide was separated under the same conditions as in Comparative Example 2-1 except that 1.3 g of 1-butanol (special grade, produced by Wako Pure Chemical Industries, Ltd., solubility in water: 6.4% by weight) was added to 30 g of the post-reaction slurry and they were shaken well. The filtering took 70 seconds, which demonstrates that addition of 1-butanol remarkably accelerates the filtration. The graphite oxide-containing composition (subjected to neither the purification step nor the drying step) left on the filter paper was dispersed in 30 g of NMP, followed by addition of 1.5 g of stearylamine. The contents were allowed to react at 120° C. for 5 hours. After the reaction, the reaction liquid was filtered. The residue was washed with water, followed by acetone, and dried. Thus, 1.1 g of a graphite oxide derivative was obtained. The resulting graphite oxide derivative showed good dispersibility in a non-polar solvent such as decane or liquid paraffin.

Example 2-6

Graphite oxide was separated under the same conditions as in Comparative Example 2-1 except that 1.9 g of 1-butanol (special grade, produced by Wako Pure Chemical Industries, Ltd., solubility in water: 6.4% by weight) was added to 30 g of the post-reaction slurry and they were shaken well. The filtering took 18 seconds, which demonstrates that addition of 1-butanol remarkably accelerates the filtration. The graphite oxide-containing composition (subjected to neither the purification step nor the drying step) left on the filter paper was dispersed in 30 g of NMP, followed by addition of 1.5 g of stearylamine. The contents were allowed to react at 120° C. for 5 hours. After the reaction, the reaction liquid was filtered. The residue was washed with water, followed by acetone, and dried. Thus, 1.1 g of a graphite oxide derivative was obtained. The resulting graphite oxide derivative showed good dispersibility in a non-polar solvent such as decane or liquid paraffin.

Example 2-7

Graphite oxide was separated under the same conditions as in Comparative Example 2-1 except that 2.6 g of 1-butanol (special grade, produced by Wako Pure Chemical Industries, Ltd., solubility in water: 6.4% by weight) was added to 30 g of the post-reaction slurry and they were shaken well. The filtering took 1 second, which demonstrates that addition of 1-butanol remarkably accelerates the filtration. The graphite oxide-containing composition (subjected to neither the purification step nor the drying step) left on the filter paper was dispersed in 30 g of NMP, followed by addition of 1.5 g of stearylamine. The contents were allowed to react at 120° C. for 5 hours. After the reaction, the reaction liquid was filtered. The residue was washed with water, followed by acetone, and dried. Thus, 1.2 g of a graphite oxide derivative was obtained. The resulting graphite oxide derivative showed good dispersibility in a non-polar solvent such as decane or liquid paraffin.

Comparative Example 2-2

Graphite oxide was separated under the same conditions as in Comparative Example 2-1 except that 1.3 g of 2-propanol (special grade, produced by Wako Pure Chemical Industries, Ltd., arbitrarily miscible with water) was added to 30 g of the post-reaction slurry and they were shaken well. The filtering took 146 seconds.

Comparative Example 2-3

Graphite oxide was separated under the same conditions as in Comparative Example 2-1 except that 1.3 g of hexane (special grade, produced by Wako Pure Chemical Industries, Ltd., insoluble in water) was added to 30 g of the post-reaction slurry and they were shaken well. The filtering took 586 seconds.

Reference Example 2-1

Figure 18:
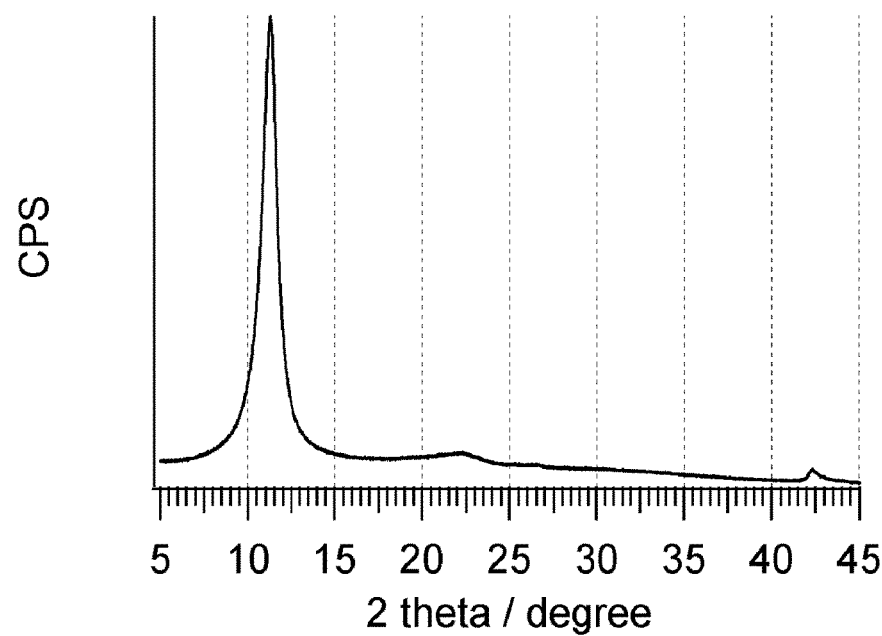
FIG. 18 shows the result of XRD measurement of the graphite oxide powder obtained in Reference Example 2-1.

Graphite oxide was separated under the same conditions as in Example 2-3, then washed with a small amount of ion exchange water, and dried at 50° C. under vacuum overnight. Thus, a graphite oxide dry powder was obtained. The result of XRD measurement is shown in FIG. 18. FIG. 18 shows the result of XRD measurement of the graphite oxide powder obtained in Reference Example 2-1. The presence of a typical signal derived from the layered structure of the graphite oxide demonstrates that the graphite oxide can be separated by this separation technique without any difficulty.

Reference Example 2-2

Figure 19:
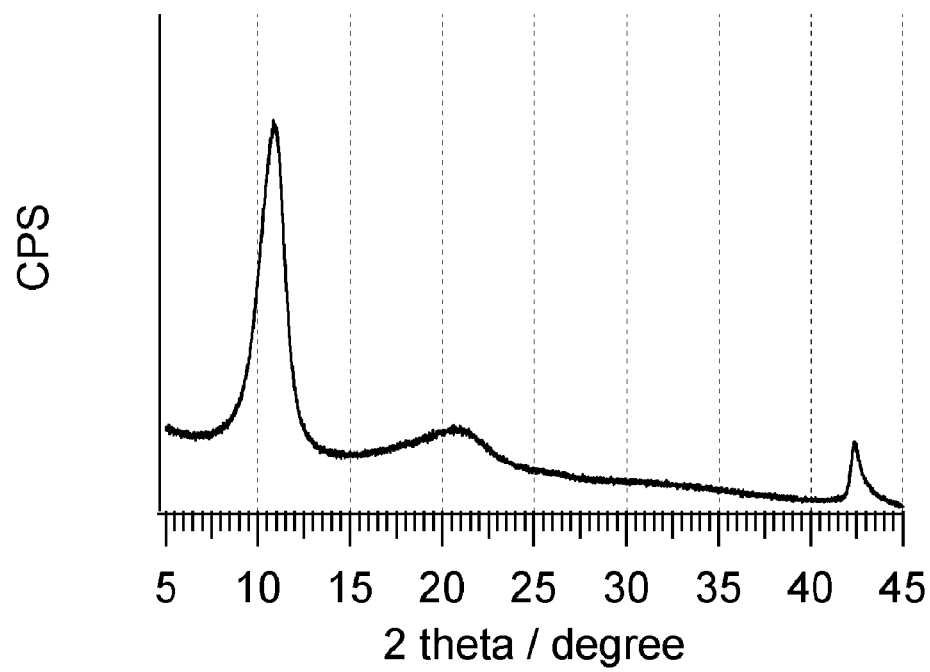
FIG. 19 shows the result of XRD measurement of the graphite oxide powder obtained in Reference Example 2-2.

Graphite oxide was separated under the same conditions as in Example 2-7, then washed with a small amount of ion exchange water, and dried at 50° C. under vacuum overnight. Thus, a graphite oxide dry powder was obtained. The result of XRD measurement is shown in FIG. 19. FIG. 19 shows the result of XRD measurement of the graphite oxide powder obtained in Reference Example 2-2. The presence of a typical signal derived from the layered structure of the graphite oxide demonstrates that the graphite oxide can be separated by this purification technique without any difficulty.

Reference Example 2-3

Figure 20:
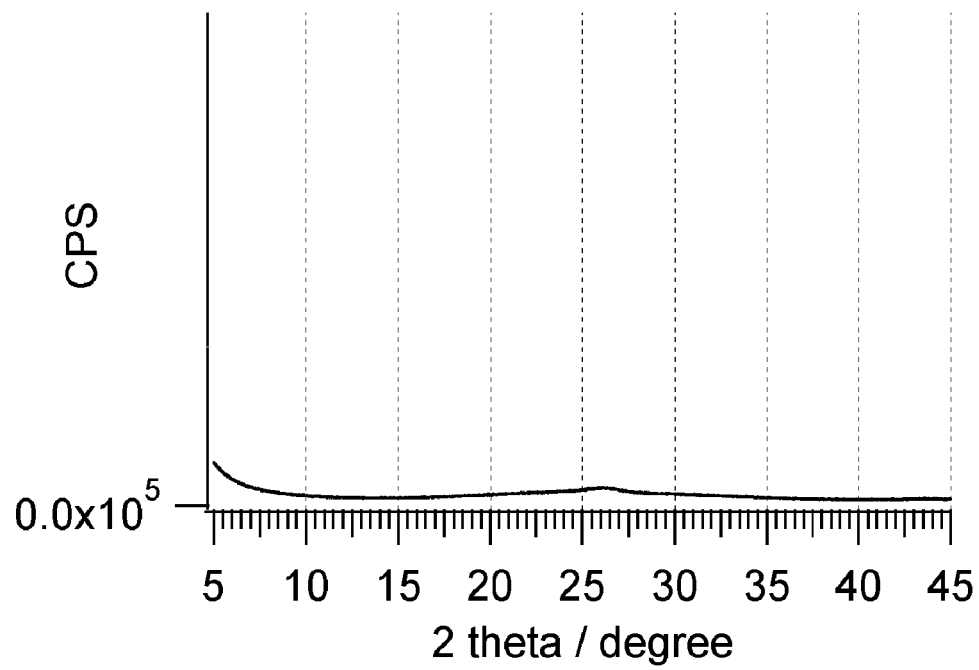
FIG. 20 shows the result of XRD measurement of the reduced graphite oxide powder obtained in Reference Example 2-3.

The graphite oxide dry powder obtained in Reference Example 2-1 was heated to 800° C. at a temperature rise rate of 10° C./min, and was burned under nitrogen flow for 5 hours. The result of XRD measurement of the resulting powder is shown in FIG. 20. FIG. 20 shows the result of XRD measurement of the reduced graphite oxide powder obtained in Reference Example 2-3. Table 2 shows the result of C1s XPS measurement before and after burning. As shown in FIG. 20, a peak derived from the layered structure of the graphite oxide disappears, and the bonds derived from the oxygen-containing functional group remarkably disappeared due to burning. This indicates the generation of reduced graphite oxide.

TABLE 2

|  | Proportion (%) | | |
| --- | --- | --- | --- |
|  | C—C | C—O | C=O |
| Before burning | 43 | 42 | 15 |
| After burning | 63 | 25 | 8 |

Reference Example 2-4

Figure 21:
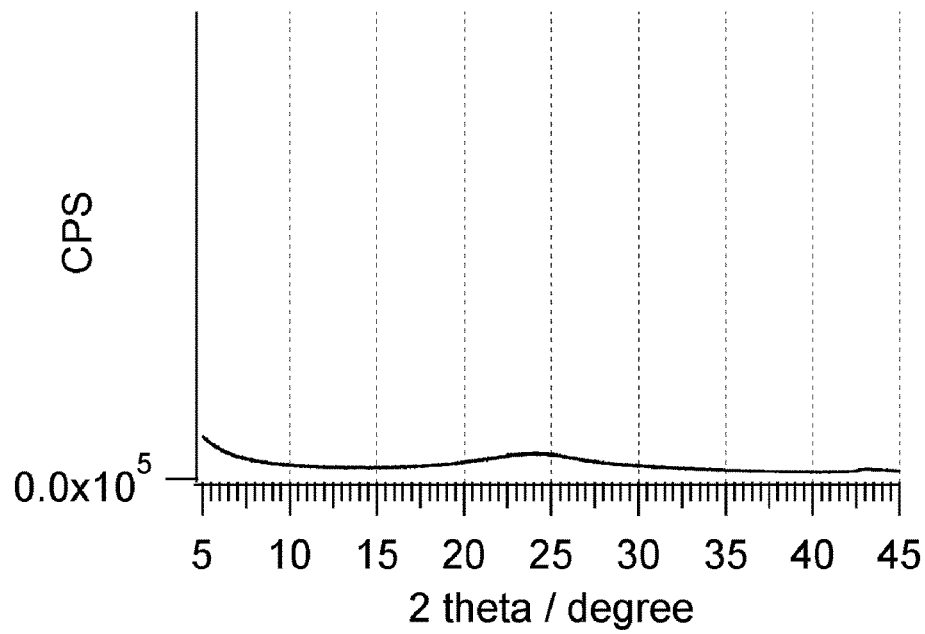
FIG. 21 shows the result of XRD measurement of the reduced graphite oxide powder obtained in Reference Example 2-4.

The graphite oxide dry powder obtained in Reference Example 2-2 was heated to 800° C. at a temperature rise rate of 10° C./min, and was burned under nitrogen flow for 5 hours. The result of XRD measurement of the resulting powder is shown in FIG. 21. FIG. 21 shows the result of XRD measurement of the reduced graphite oxide powder obtained in Reference Example 2-4. Table 3 shows the result of C1s XPS measurement before and after burning. As shown in FIG. 21, no peak derived from the layered structure of the graphite oxide is observed, and the bonds derived from the oxygen-containing functional group remarkably disappeared due to burning. This indicates the generation of reduced graphite oxide.

TABLE 3

|  | Proportion (%) | | |
| --- | --- | --- | --- |
|  | C—C | C—O | C=O |
| Before burning | 45 | 40 | 15 |
| After burning | 66 | 26 | 8 |

Example 3-1

[Synthesis of OGO20-B]

Raw material graphite oxide was synthesized by reference to the method disclosed in a non-patent document (Karthikeyan K, et al., Carbon, 53, (2013), 38-49). The graphite oxide (200 mg), 2-octyl-1-dodecanol (produced by Tokyo Chemical Industry Co., Ltd., 10 mL), and sulfuric acid (produced by Wako Pure Chemical Industries, Ltd., 200 mg) were mixed, and the mixture was allowed to react at 100° C. for 24 hours. After the reaction, acetone was poured in the reaction liquid, and the liquid was filtered. The resulting solid was dispersed in hexane, followed by washing with water. The organic layer was filtered to give OGO20-B. The resulting solid was added to hexadecane and sonicated for 1 hour, and then the dispersibility was evaluated. In the evaluation, the light transmission was observed for 6 hours or longer, which indicates good dispersibility. Separately, the resulting solid was added to a hexane-methanol solvent mixture and sonicated for 1 hour, and then whether the solid was dispersed in a hexane layer or in a methanol layer was examined. As a result, the solid was dispersed in the hexane layer. This indicates that the solid has very good hydrophobicity.

Figure 22:
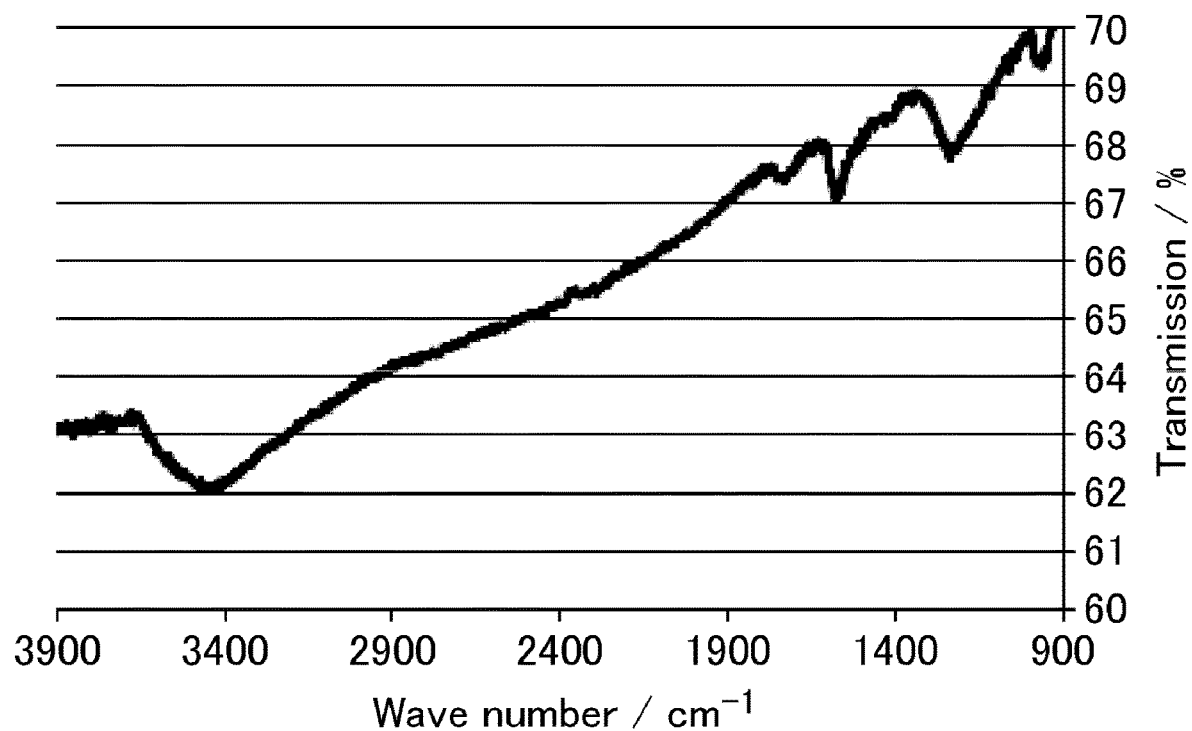
FIG. 22 is a FT-IR chart of raw material graphite oxide.
Figure 23:
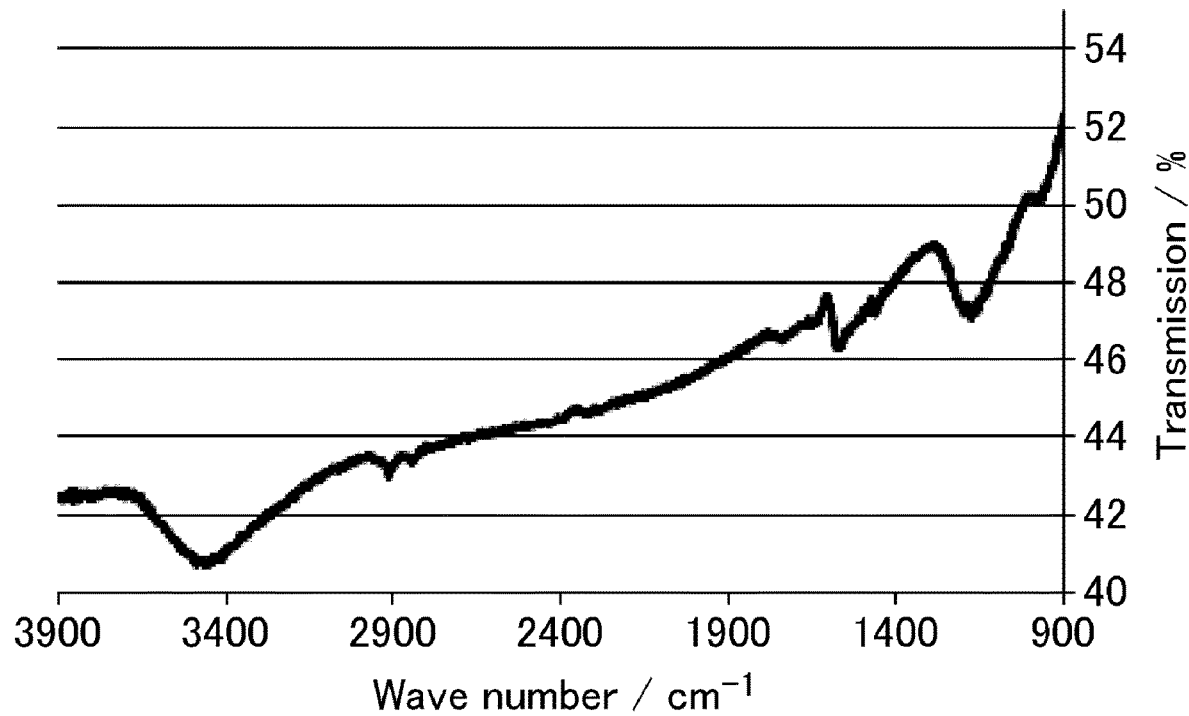
FIG. 23 is a FT-IR chart of the graphite oxide derivative prepared in Example 3-1.

The FT-IR chart is shown in FIG. 23. This chart was compared with the FT-IR chart of the raw material (FIG. 22). The comparison shows the presence of a peak derived from C—H (in the vicinity of 2900 cm$^{-1}$) and a shift of the peak derived from C—O—C (in the vicinity of 1200 cm$^{-1}$), which indicates introduction of alcohol. Here, FIG. 22 is a FT-IR chart of raw material graphite oxide, and FIG. 23 is a FT-IR chart of the graphite oxide derivative prepared in Example 3-1.

The results of the elementary analysis show that the sum of the mass concentrations of C, H, and O was 95.66%, and the mass concentration of N was 0.01%.

Example 3-2

[Synthesis of OGO20-S]

Graphite oxide (200 mg), 1-eicosanol (produced by Tokyo Chemical Industry Co., Ltd., 8 g), and sulfuric acid (200 mg) were mixed, and the mixture was allowed to react. Then, hexane warmed to 50° C. was added to the reaction liquid, and the liquid was subjected to hot filtration. The resulting solid was dispersed in hexane, and the liquid was washed with water. The organic layer was filtered to give OGO20-S. The resulting solid was added to hexadecane, and was sonicated for 1 hour, and then the dispersibility was evaluated. In the evaluation, the light transmission was observed for 6 hours or longer, which indicates good dispersibility. Separately, the resulting solid was added to a hexane-methanol solvent mixture and sonicated for 1 hour, and then whether the solid was dispersed in a hexane layer or in a methanol layer was examined. As a result, the solid was dispersed in the hexane layer. This indicates that the solid has very good hydrophobicity.

Figure 24:
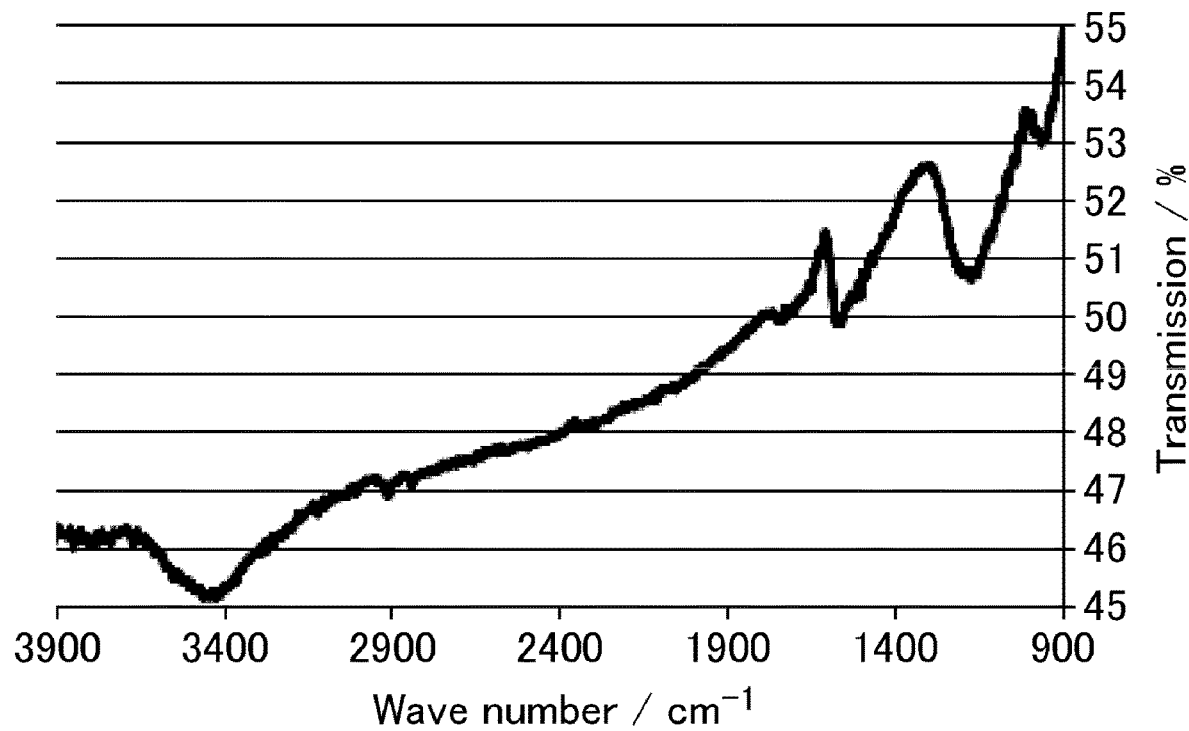
FIG. 24 is a FT-IR chart of the graphite oxide derivative prepared in Example 3-2.

The FT-IR chart is shown in FIG. 24. FIG. 24 is a FT-IR chart of the graphite oxide derivative prepared in Example 3-2.

The results of the elementary analysis show that the sum of the mass concentrations of C, H, and O was 96.12%, and the mass concentration of N was 0.00%.

Example 3-3

[Synthesis of OGO14-S]

OGO14-S was synthesized in the same manner as in Example 3-1 except that 1-tetradecanol (produced by Tokyo Chemical Industry Co., Ltd., 10 mL) was used as alcohol instead of 2-octyl-1-dodecanol. The resulting solid was added to hexadecane and sonicated for 1 hour, and then the dispersibility was evaluated. In the evaluation, the light transmission was observed for 6 hours or longer, which indicates good dispersibility. Separately, the resulting solid was added to a hexane-methanol solvent mixture and sonicated for 1 hour, and then whether the solid was dispersed in a hexane layer or in a methanol layer was examined. As a result, the solid was dispersed in the hexane layer. This indicates that the solid has very good hydrophobicity.

Figure 25:
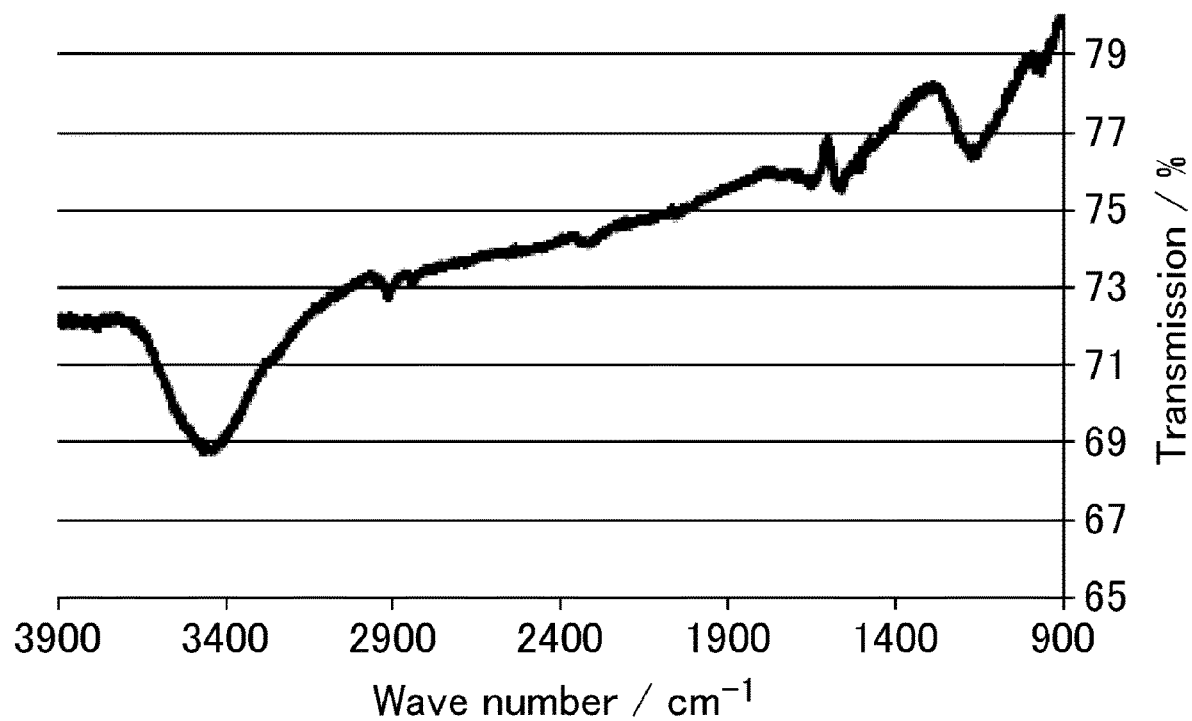
FIG. 25 is a FT-IR chart of the graphite oxide derivative prepared in Example 3-3.

The FT-IR chart is shown in FIG. 25. FIG. 25 is a FT-IR chart of the graphite oxide derivative prepared in Example 3-3.

The results of the elementary analysis show that the sum of the mass concentrations of C, H, and O was 96.95%, and the mass concentration of N was 0.00%.

Example 3-4

[Synthesis of OGO20-B-BA]

Graphite oxide (200 mg), 2-octyl-1-dodecanol (produced by Tokyo Chemical Industry Co., Ltd., 10 mL), and potassium hydroxide (produced by Wako Pure Chemical Industries, Ltd., 200 mg) were mixed, and the mixture was allowed to react at 100° C. for 24 hours. After the reaction, acetone was poured in the reaction liquid, and the liquid was filtered. The resulting solid was dispersed in hexane, and the liquid was washed with 1% sulfuric acid water. The resulting solid was added to hexadecane, and was sonicated for 1 hour, and then the dispersibility was evaluated. In the evaluation, the light transmission was observed for 6 hours or longer, which indicates good dispersibility. The organic layer was filtered to give OGO20-B-BA.

Figure 26:
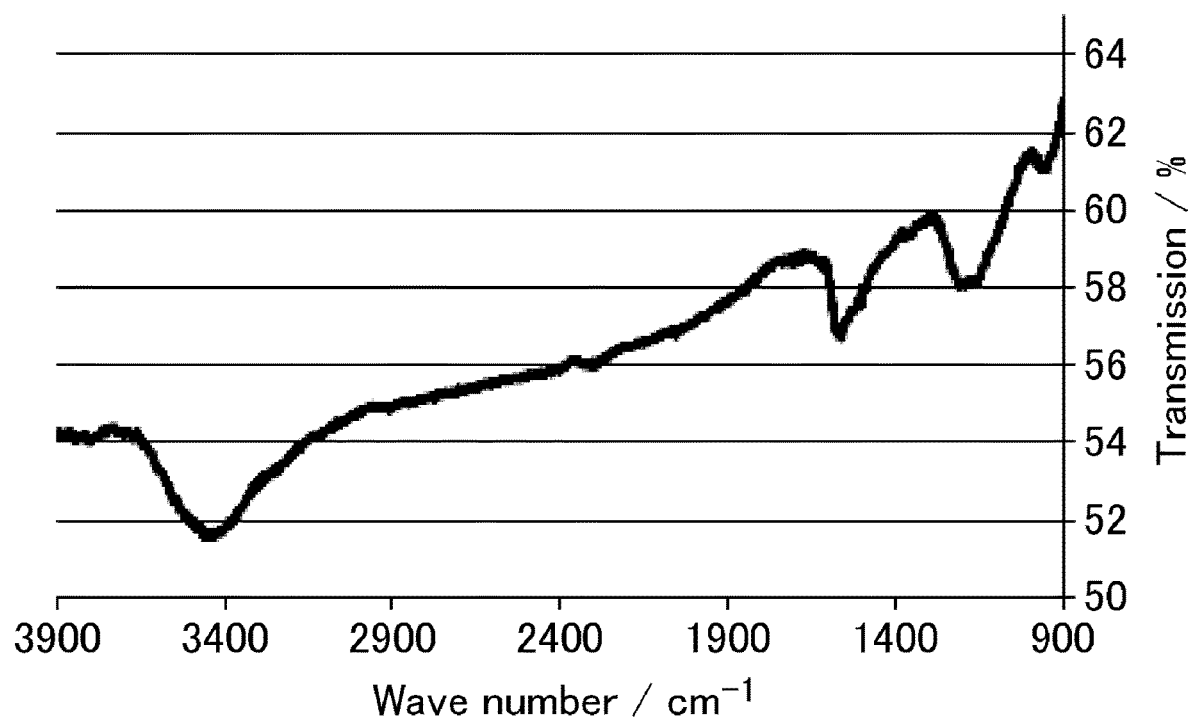
FIG. 26 is a FT-IR chart of the graphite oxide derivative prepared in Example 3-4.

The FT-IR chart is shown in FIG. 26. FIG. 26 is a FT-IR chart of the graphite oxide derivative prepared in Example 3-4.

The results of the elementary analysis show that the sum of the mass concentrations of C, H, and O was 95.51%, and the mass concentration of N was 0.01%.

Comparative Example 3-1

[Synthesis of OGO12-S]

OGO12-S was synthesized in the same manner as in Example 3-1 except that 1-dodecanol (produced by Tokyo Chemical Industry Co., Ltd., 10 mL) was used as alcohol instead of 2-octyl-1-dodecanol. The resulting solid was added to hexadecane and sonicated for 1 hour, and then the dispersibility was evaluated. In the evaluation, the light transmission was observed for 6 hours or longer, which indicates good dispersibility. Separately, the resulting solid was added to a hexane-methanol solvent mixture and sonicated for 1 hour, and then whether the solid was dispersed in a hexane layer or in a methanol layer was examined. As a result, an emulsion was formed, which was not immediately separated into two layers, and the solid was not well dispersed in the hexane layer and a film was formed at the interface due to its insufficient hydrophobicity. This indicates that the hydrophobicity of the solid is lower than those in Examples 3-1 and 3-3. In this respect, particularly comparison between Example 3-3 and Comparative Example 3-1 demonstrates that the hydrophobicity is greatly different between the case of a C14 hydrocarbon group and the case of a C12 hydrocarbon group. Separately, the resulting solid was added to NMP and sonicated for 1 hour, and then the dispersibility was evaluated. In the evaluation, the light transmission was observed for 10 minutes or less, which indicates insufficient dispersibility in an amphiphilic dispersion medium.

Figure 27:
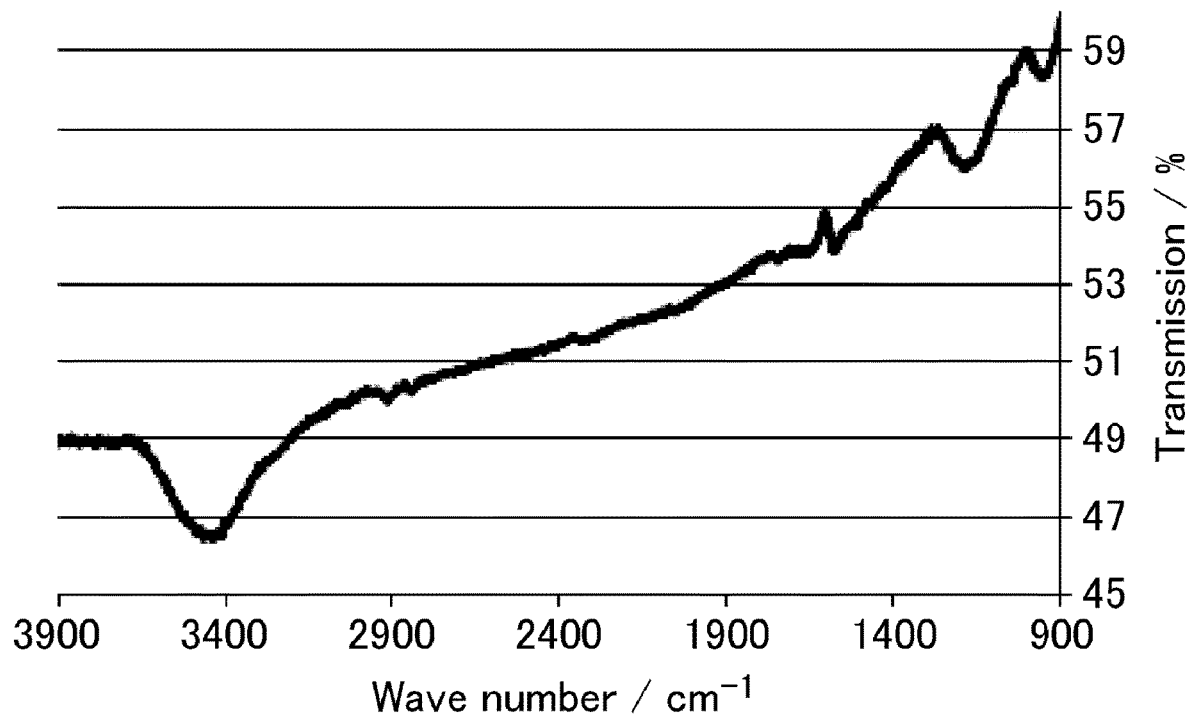
FIG. 27 is a FT-IR chart of the graphite oxide derivative prepared in Comparative Example 3-1.

The FT-IR chart is shown in FIG. 27. FIG. 27 is a FT-IR chart of the graphite oxide derivative prepared in Comparative Example 3-1.

Figure 29:
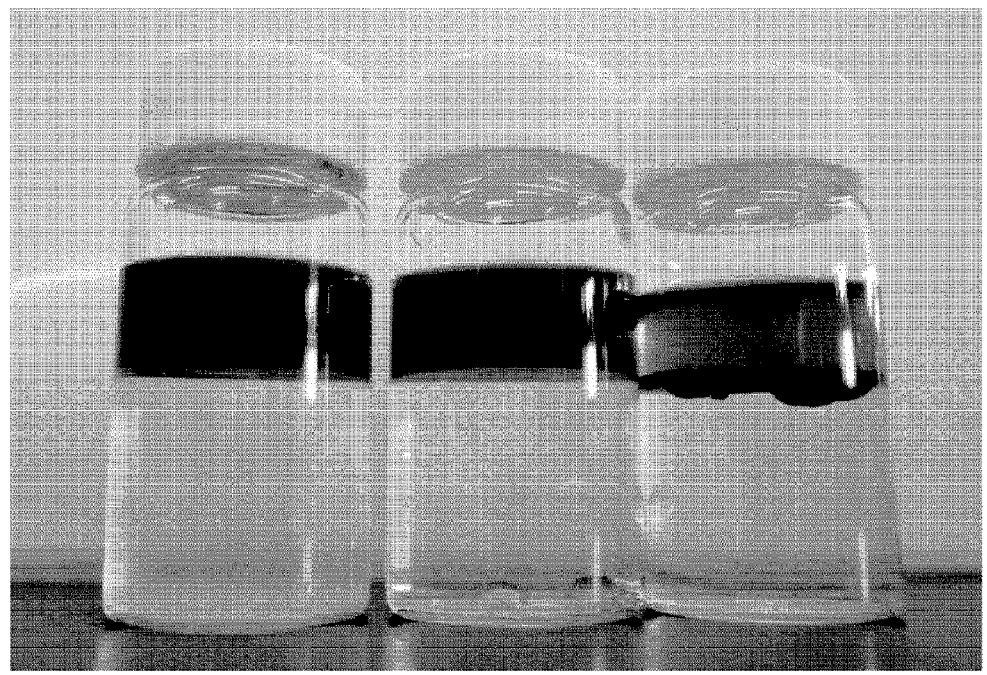
FIG. 29 is an actual image of hexane-methanol separation in Examples 3-1 and 3-3 and Comparative Example 3-1 (from the left, Example 3-1, Example 3-3, and Comparative Example 3-1 are shown).

FIG. 29 shows an actual image of hexane-methanol separation. That is, FIG. 29 shows an actual image of hexane-methanol separation in Examples 3-1 and 3-3 and Comparative Example 3-1. The image shows that no dispersibility in the hexane layer is observed only in the case of Comparative Example 3-1. In addition, a bubble-like film is formed at the interface, which suggests that the hydrophobicity is low (the upper portion is a hexane layer and the lower portion is a methanol layer; from the left, Example 3-1, Example 3-3, and Comparative Example 3-1 are shown).

The results of the elementary analysis show that the sum of the mass concentrations of C, H, and O was 97.47%, and the mass concentration of N was 0.00%.

Comparative Example 3-2

[Synthesis of rGO]

rGO was synthesized in the same manner as in Example 3-1 except that hexadecane (produced by Tokyo Chemical Industry Co., Ltd., 10 mL) was used instead of alcohol. The resulting solid was added to hexadecane and sonicated for 1 hour, and then the dispersibility was evaluated. In the evaluation, the light transmission was observed for 20 minutes, which indicates poor dispersibility.

Figure 28:
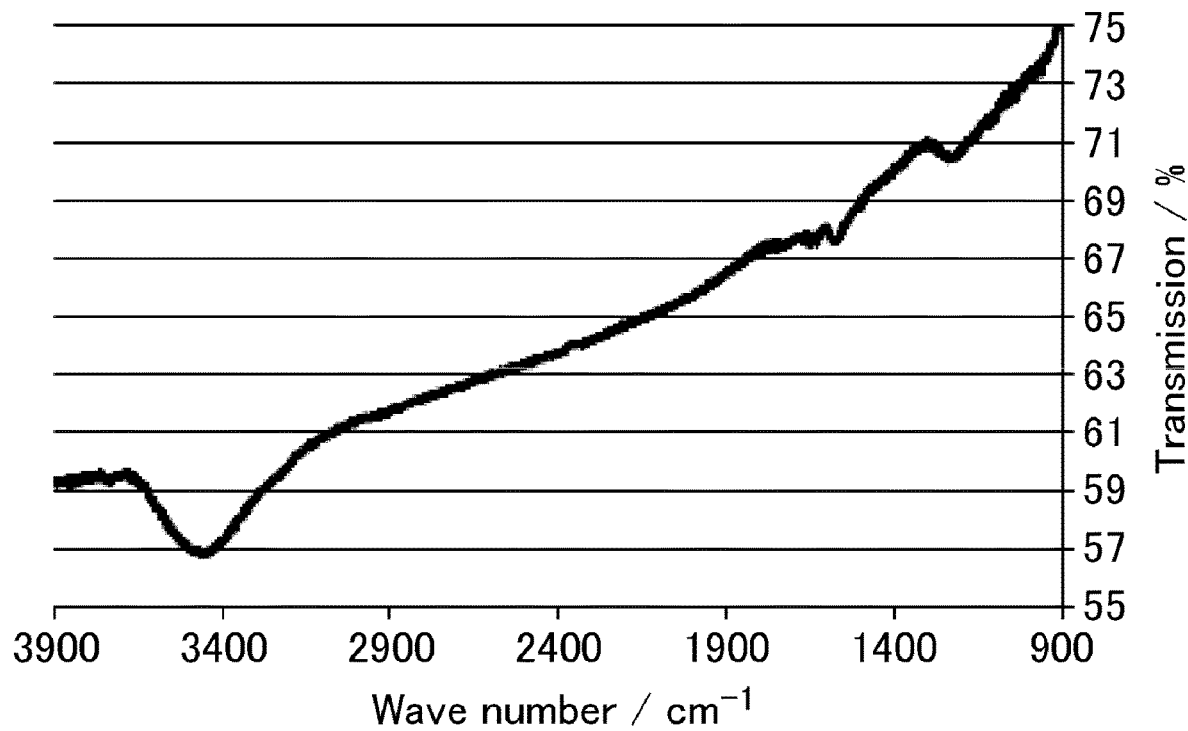
FIG. 28 is a FT-IR chart of the graphite oxide derivative prepared in Comparative Example 3-2.

The FT-IR chart is shown in FIG. 28. FIG. 28 is a FT-IR chart of the graphite oxide derivative prepared in Comparative Example 3-2.

The results of the elementary analysis show that the sum of the mass concentrations of C, H, and O was 96.94%, and the mass concentration of N was 0.01%.

Example 3-5

[Synthesis of OGO24-B-100]

Graphite oxide (2 g), 2-decyl-1-tetradecanol (produced by New Japan Chemical Co., Ltd., 10 g), and sulfuric acid (produced by Wako Pure Chemical Industries, Ltd., 2 g) were mixed, and the mixture was allowed to react at 100° C. for 24 hours. After the reaction, hexane was poured in the reaction liquid, and the liquid was filtered. The resulting solid was dispersed in hexane, and the liquid was washed with water. The organic layer was filtered to give OGO24-B-100. The resulting solid was added to hexadecane and sonicated for 1 hour, and then the dispersibility was evaluated. In the evaluation, the light transmission was observed for 6 hours or longer, which indicates good dispersibility.

Figure 30:
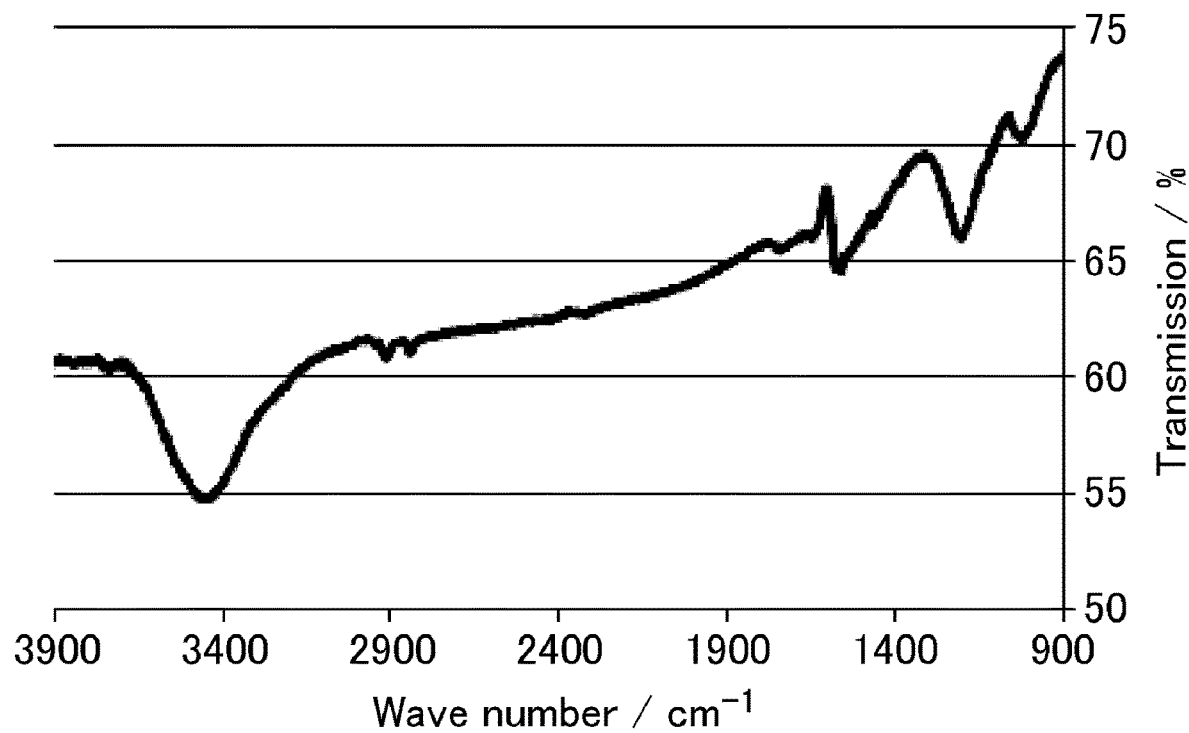
FIG. 30 is a FT-IR chart of the graphite oxide derivative prepared in Example 3-5.

The FT-IR chart is shown in FIG. 30. FIG. 30 is a FT-IR chart of the graphite oxide derivative prepared in Example 3-5.

The results of the elementary analysis show that the sum of the mass concentrations of C, H, and O was 96.73%, and the mass concentration of N was 0.00%.

Example 3-6

[Synthesis of OGO24-B-150]

Graphite oxide (2 g), 2-decyl-1-tetradecanol (produced by New Japan Chemical Co., Ltd., 10 g), and sulfuric acid (produced by Wako Pure Chemical Industries, Ltd., 2 g) were mixed, and the mixture was allowed to react at 150° C. for 5 hours. After the reaction, hexane was poured in the reaction liquid, and the liquid was filtered. The resulting solid was dispersed in hexane, and the liquid was washed with water. The organic layer was filtered to give OGO24-B-150. The resulting solid was added to hexadecane and sonicated for 1 hour, and then the dispersibility was evaluated. In the evaluation, the light transmission was observed for 6 hours or longer, which indicates good dispersibility.

Figure 31:
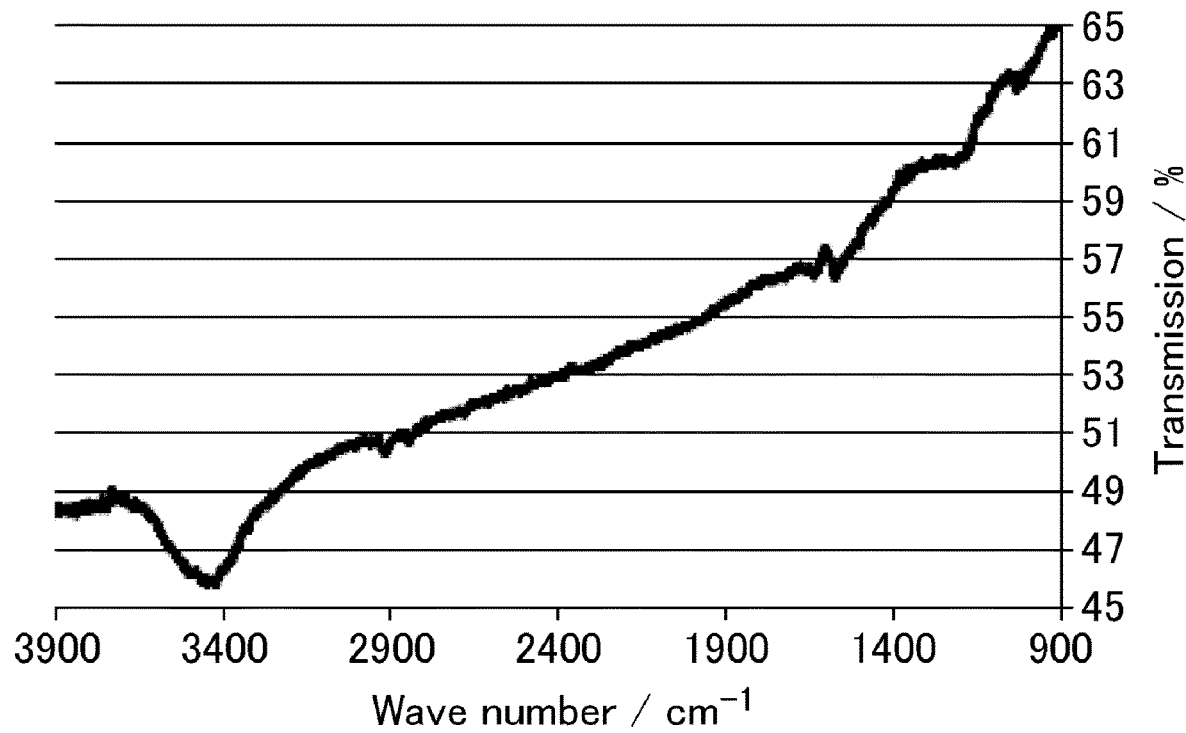
FIG. 31 is a FT-IR chart of the graphite oxide derivative prepared in Example 3-6.

The FT-IR chart is shown in FIG. 31. FIG. 31 is a FT-IR chart of the graphite oxide derivative prepared in Example 3-6.

The results of the elementary analysis show that the sum of the mass concentrations of C, H, and O was 96.30%, and the mass concentration of N was 0.00%.

Example 3-7

[Synthesis of OGO8-B-150]

Graphite oxide (2 g), 2-ethyl-1-hexanol (produced by Wako Pure Chemical Industries, Ltd., 10 g), and sulfuric acid (produced by Wako Pure Chemical Industries, Ltd., 2 g) were mixed, and the mixture was allowed to react at 150° C. for 5 hours. After the reaction, hexane was poured in the reaction liquid, and the liquid was filtered. The resulting solid was dispersed in hexane, and the liquid was washed with water. The organic layer was filtered to give OGO8-B-150. The resulting solid was added to NMP and sonicated for 1 hour, and then the dispersibility was evaluated. In the evaluation, the light transmission was observed for 6 hours or longer, which indicates good dispersibility. Comparison with Comparative Example 3-1 demonstrates that a shorter alkyl chain contributes to enhancement of the dispersibility in an amphiphilic dispersion medium. In this respect, particularly comparison between Example 3-7 and Comparative Example 3-1 demonstrates that the dispersibility in an amphiphilic dispersion medium is greatly different between the cases of a C12 hydrocarbon group and a C8 hydrocarbon group.

Figure 32:
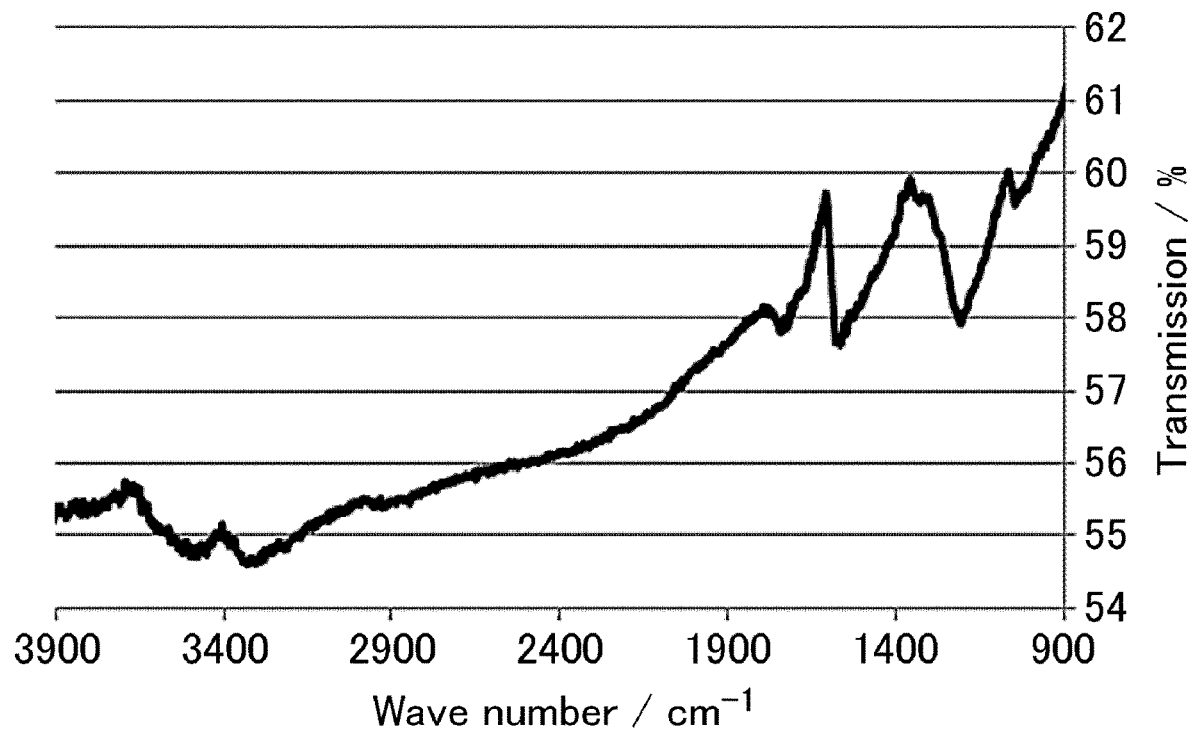
FIG. 32 is a FT-IR chart of the graphite oxide derivative prepared in Example 3-7.

The FT-IR chart is shown in FIG. 32. FIG. 32 is a FT-IR chart of the graphite oxide derivative prepared in Example 3-7.

The results of the elementary analysis show that the sum of the mass concentrations of C, H, and O was 96.66%, and the mass concentration of N was 0.00%.

The FT-IR charts seem to show that alcohol is introduced into the carboxyl group, epoxy group, or hydroxy group of the graphite oxide to form an alkoxycarbonyl group or an alkoxy group in Examples 3-1 to 3-7 and Comparative Example 3-1 described above. In particular, comparison between Example 3-3 and Comparative Example 3-1 demonstrates that the hydrophobicity is greatly different between the case of a C14 hydrocarbon group and the case of a C12 hydrocarbon group. Further, comparison between Example 3-7 and Comparative Example 3-1 demonstrates that the dispersibility in an amphiphilic dispersion medium is greatly different between the case of a C12 hydrocarbon group and the case of a C8 hydrocarbon group.

The graphite oxide derivatives obtained in Examples 3-1 to 3-6, which are sufficiently dispersible in an non-polar dispersion medium, can be suitably used as an additive for machinery lubricant oil or an additive for resin that can be combined with various resins, for example. The graphite oxide derivative obtained in Example 3-7, which is sufficiently dispersible in an amphiphilic dispersion medium, can be suitably used as an additive for resin that can be combined with various resins.

The graphite oxide derivatives obtained in Examples 3-1 to 3-7 were made using a raw material graphite oxide that had been prepared through a purification step and a drying step requiring a long time. When such production of the graphite oxide derivatives was compared with the first preferred embodiment of the production method of the present invention, this production has room for improvement in efficient preparation of a high-quality raw material. In fact, for example, it is almost impossible to prepare a large amount of graphite oxide as a raw material for use in the production of a graphite oxide derivative through a purification step and a drying step on an industrial scale. However, when the method described in the first preferred embodiment of the production method of the present invention in which one or both of the step of purifying the graphite oxide and the step of drying the graphite oxide are skipped is used for producing a graphite oxide derivative which has a functional group having a hydrocarbon group that contains a specific number of carbon atoms, such as the graphite oxide derivative of the present invention, a high-quality graphite oxide can be simply obtained as described in the examples of the first preferred embodiment of the production method of the present invention. Thus obtained graphite oxide is particularly suitable for producing a graphite oxide derivative on an industrial scale.

The invention claimed is:

1. A method for producing a graphite oxide derivative, the method comprising the steps of:
    oxidizing graphite using sulfuric acid; and
    preparing a graphite oxide derivative by reacting graphite oxide in a graphite oxide-containing composition obtained in the oxidation step and a compound reactive with an oxygen-containing functional group of the graphite oxide,
    the method not comprising a step of purifying the graphite oxide-containing composition between the oxidation step and the graphite oxide derivative preparation step, wherein a sulfuric acid concentration is 1% by mass or more of the mass of the graphite oxide during the oxidation step and the graphite oxide derivative preparation step.

2. The method for producing a graphite oxide derivative according to claim 1, the method further comprising, between the oxidation step and the graphite oxide derivative preparation step:
    the steps of adding a solvent that has a solubility in water of 0.01% or higher and is not arbitrarily miscible with water to the graphite oxide-containing composition and then separating the graphite oxide-containing composition.

3. The method for producing a graphite oxide derivative according to claim 1,
    wherein the compound reactive with an oxygen-containing functional group of the graphite oxide is an alcohol and/or an amine.

4. The method for producing a graphite oxide derivative according to claim 1,
    wherein the graphite oxide derivative preparation step includes the step of reacting the graphite oxide and the compound reactive with an oxygen-containing functional group of the graphite oxide at a reaction temperature of 120° C. or higher.

5. The method for producing a graphite oxide derivative according to claim 1,
    wherein the graphite oxide-containing composition for use in the reaction in the graphite oxide derivative preparation step contains sulfuric acid in an amount of 1% by mass or more and 1000% by mass or less for 100% by mass of the graphite oxide in the composition.

6. The method for producing a graphite oxide derivative according to claim 1,
    wherein the graphite oxide-containing composition for use in the reaction in the graphite oxide derivative preparation step contains water in an amount of 3% by mass or more and 10000% by mass or less for 100% by mass of the graphite oxide in the composition.

7. The method for producing a graphite oxide derivative according to claim 3,
    wherein the alcohol is an aliphatic alcohol and the amine is an aliphatic amine.

8. The method for producing a graphite oxide derivative according to claim 2,
    wherein the solvent has a solubility in water of 0.5% or higher.

9. The method for producing a graphite oxide derivative according to claim 2,
    wherein the solvent is added in an amount of 1% to 1000% by mass for 100% by mass of the graphite oxide in the graphite oxide-containing composition.

10. The method for producing a graphite oxide derivative according to claim 2,
    wherein the graphite oxide-containing composition is separated by any of filtration, decantation, centrifugation, and separation extraction.

11. The method for producing a graphite oxide derivative according to claim 10,
    wherein the graphite oxide-containing composition is separated by filtration.

12. The method for producing a graphite oxide derivative according to claim 1,
    wherein the oxidation step is a step of adding a permanganate to a liquid mixture containing graphite and sulfuric acid.

* * * * *